US012758440B2

(12) United States Patent
Lacasse et al.

(10) Patent No.: US 12,758,440 B2
(45) Date of Patent: Oct. 13, 2026

(54) PATIENT SUPPORT APPARATUS

(71) Applicant: UMANO MEDICAL INC., L'Islet (CA)

(72) Inventors: Sylvain Lacasse, Québec (CA); Montassar Ben-Abdallah, Lévis (CA); Florimond Laporte, St-Augustin-de-Desmaures (CA); Bruno Désaulniers, Québec (CA); Franck Renaud Jocelyn Moreliere, Lévis (CA)

(73) Assignee: UMANO MEDICAL INC., L'Islet (CA)

( * ) Notice: Subject to any disclaimer, the term of this patent is extended or adjusted under 35 U.S.C. 154(b) by 722 days.

(21) Appl. No.: 18/003,635

(22) PCT Filed: Jul. 2, 2021

(86) PCT No.: PCT/IB2021/055961
§ 371 (c)(1),
(2) Date: Dec. 28, 2022

(87) PCT Pub. No.: WO2022/003644
PCT Pub. Date: Jan. 6, 2022

(65) Prior Publication Data

US 2023/0255839 A1 Aug. 17, 2023

Related U.S. Application Data

(60) Provisional application No. 63/047,601, filed on Jul. 2, 2020.

(51) Int. Cl.
*A61G 1/02* (2006.01)
*A61G 7/05* (2006.01)

(52) U.S. Cl.
CPC ......... *A61G 1/0268* (2013.01); *A61G 7/0528* (2016.11)

(58) Field of Classification Search
CPC ...... A61G 1/0268; A61G 1/0275; A61G 1/08; A61G 7/0528; A61G 1/02; B60B 19/003; B60B 33/06; B60B 33/066
(Continued)

(56) References Cited

U.S. PATENT DOCUMENTS 3,304,116 A * 2/1967 Stryker .................... A61G 7/00 5/81.1 R
6,286,165 B1 * 9/2001 Heimbrock .......... A61G 1/0275 280/98
(Continued)

FOREIGN PATENT DOCUMENTS

CZ 308076 B6 * 12/2019 ......... B60B 33/0015
TW 201534425 A * 9/2015
(Continued)

OTHER PUBLICATIONS

Communication pursuant to Article 94(3) EPC, from European Patent Application No. 21832634.6, Mar. 19, 2026, 7 pages.

*Primary Examiner* — S. Joseph Morano
*Assistant Examiner* — Eva L Comino
(74) *Attorney, Agent, or Firm* — STEPTOE LLP; Scott Richey

(57) ABSTRACT

The invention relates to a wheel assembly for a patient support apparatus comprising a fixed portion, a pivoting portion attached to the fixed portion and a wheel operatively connected to the pivoting portion, the wheel, which can be motorized, being movable between a first deployed position and a second retracted position. The wheel assembly has a spring assembly for urging the wheel in the first deployed position and an actuator to raise the wheel in the second retracted position. The invention also relates to a control handle for a motorized bed comprising a handle member having an actuatable trigger for controlling propelling of the
(Continued)

bed, the handle member further comprising a user interface configured for providing bed information to the operator.

34 Claims, 37 Drawing Sheets

(58) Field of Classification Search
USPC ........................................................ 296/20, 19
See application file for complete search history.

(56) References Cited

U.S. PATENT DOCUMENTS

| | | | | |
|---|---|---|---|---|
| 7,644,457 | B2 * | 1/2010 | Hensley | A61G 7/0507<br>5/186.1 |
| 7,882,582 | B2 * | 2/2011 | Kappeler | A61G 7/08<br>5/510 |
| 8,442,738 | B2 | 5/2013 | Patmore | |
| 9,707,143 | B2 * | 7/2017 | Thodupunuri | A61G 7/018 |
| 2004/0139545 | A1 * | 7/2004 | Reinke | A61G 1/0268<br>5/86.1 |
| 2011/0277241 | A1 * | 11/2011 | Schejbal | A61G 7/018<br>5/510 |
| 2012/0198620 | A1 * | 8/2012 | Hornbach | A61G 7/0524<br>5/510 |
| 2014/0230149 | A1 * | 8/2014 | Schejbal | A61G 7/0528<br>5/510 |
| 2018/0168897 | A1 * | 6/2018 | Jönsson | A61G 1/0281 |
| 2018/0250178 | A1 * | 9/2018 | Paul | A61G 7/0528 |
| 2019/0167494 | A1 * | 6/2019 | Patmore | A61G 1/0268 |

FOREIGN PATENT DOCUMENTS

| | | | | |
|---|---|---|---|---|
| WO | WO-0185084 | A1 * | 11/2001 | A61G 7/0513 |
| WO | WO-2024215211 | A1 * | 10/2024 | B62B 5/005 |

* cited by examiner

PATIENT SUPPORT APPARATUS

CROSS-REFERENCE TO RELATED APPLICATIONS

The present application is a 371 of International Application PCT/IB2021/055961 filed on Jul. 2, 2021, which claims benefit to the U.S. Provisional Patent Application Ser. No. 63/047,601 filed on Jul. 2, 2020, these applications being incorporated herein by reference.

TECHNICAL FIELD

The invention generally relates to patient support apparatuses such as hospital beds, and more specifically to patient support apparatuses with at least one auxiliary wheel for improved maneuverability.

BACKGROUND OF THE ART

Hospital beds or other types of patient support apparatuses are often provided with wheels or casters to facilitate their displacement in different rooms of health care facilities.

In order to ease such displacements, some of the prior art hospital beds that have been proposed are provided with a motorized auxiliary wheel. This auxiliary wheel is generally mounted to the base of the bed and is driven by a motor connected thereto.

In some prior art beds, the motorized auxiliary wheel is a retractable wheel selectively positionable relative to the floor surface. More particularly, such a auxiliary wheel can be raised (retracted) to clear the floor, or lowered (deployed) to engage the floor surface, by activation of control elements. Such a retractable auxiliary wheel tends to be advantageous in many instances since, when it is retracted, it provides with the clearance under the base of the bed that is generally required for ease of use of a wheeled patient table whose base is generally positioned under the base of the bed.

Beds equipped with such retractable auxiliary wheels however tend to present some significant drawbacks. For instance, such hospital beds typically require complex and cumbersome mechanical arrangements and controls thereof.

Such hospital beds may sometimes be used on an uneven floor surface which may have discontinuities such as bumps and holes for example. The floor surface may also be in the form of a ramp, with changes in grade of the floor surface. This may lead to the fact that the auxiliary wheel loses contact with the floor surface, with associated difficulties related to sudden deceleration and/or acceleration of the bed as non-limitative examples.

To overcome this difficulty, several complex arrangements have been designed to prevent the auxiliary wheel from losing contact with the floor surface and still maintains contact with the floor surface even if the floor surface is uneven or has a lower surface where the auxiliary wheel is positioned relative to the other wheels.

Such arrangements are also generally designed to absorb shocks that may be generated by a bump or obstacle under the auxiliary wheel. This may mitigate discomfort for the patient lying in the bed.

Complex and cumbersome spring-based arrangements are typically used to urge the auxiliary wheel in contact with the floor surface when in the lowered position, while still being adapted to absorb shocks generated by bumps.

Various control devices have been proposed in the art to enable a caregiver or operator to safely maneuver and drive a motorized hospital bed. Some prior art control devices use one or two movable handles that can be pushed or pulled to drive the bed forwards or backwards, which requires complex mechanical arrangements. Other control devices require that the caregiver uses both hands to provide the necessary input data through several controls, which can be complex to use and expensive to implement.

Therefore, it would be advantageous to be provided with a hospital bed which would overcome at least one of the above-identified drawbacks.

SUMMARY

According to a first aspect, there is provided a wheel assembly connectable to a base of a patient support apparatus having a plurality of casters. The wheel assembly has a fixed portion securable to the base and a pivoting portion pivotally attached to the fixed portion. The wheel assembly also has a wheel operatively connected to the pivoting portion, the wheel being movable between a first deployed position when the pivoting portion is pivoted in a first direction and a second retracted position when the pivoting portion is pivoted in a second opposed direction. The wheel assembly is further provided with a spring assembly mounted between the fixed portion and the pivoting portion for urging the pivoting portion in the first direction to urge the wheel in the first deployed position. The wheel assembly also has an actuator operatively coupled to the fixed portion and to the pivoting portion, the actuator being actuatable between an extended position to urge the pivoting portion in the second direction against an action of the spring assembly to thereby raise the wheel in the second retracted position and a retracted position wherein the actuator allows the action of the spring assembly to urge the pivoting portion in the first direction.

In one embodiment, when the wheel assembly is connected to the base of the patient support apparatus, the first deployed position of the wheel is in contact with the floor and the second retracted position is spaced apart from the floor.

In one embodiment, the wheel assembly further has a motor assembly operatively connected to the wheel for driving the wheel along the floor when extending in the first deployed position. In a further embodiment, the motor assembly is mounted perpendicularly to an axle of the wheel.

In one embodiment, the wheel assembly is further provided with a control device for driving the motor in response to an operator request.

In one embodiment, the fixed portion has a mounting plate securable to the base and two spaced apart flanges extending therefrom and defining a compartment therebetween. The pivoting portion comprises an elongated rotating shaft rotatably mounted between the two flanges and a pivoting arm having a first end secured to the elongated rotating shaft and a second distal end, the second distal end having a wheel mounting portion adapted for receiving an axle of the wheel therethrough.

In one embodiment, the second distal end of the pivoting arm is further provided with a projecting member, the spring assembly being mounted between the fixed portion and the projecting member.

In one embodiment, the actuator comprises a linear actuator, the linear actuator being mounted to push against the projecting member when actuated in the extended position.

In one embodiment, the spring assembly comprises a telescopic tubing and a linear compression spring mounted therewith, the telescoping tubing being secured to the fixed portion.

In one embodiment, the linear actuator has a body and an elongated rod having a distal end. The body is pivotally mounted to the fixed portion, the distal end of the elongated rod being further provided with a support arm having a first end pivotally connected thereto and a second end pivotally connected to the pivoting portion for movably supporting the linear actuator.

In one embodiment, the first end of the support arm connected to the distal end of the elongated rod has a surface projecting therefrom adapted for cooperating with the pivoting portion only when the actuator is actuated in the extended position.

In one embodiment, the wheel has at least one omnidirectional wheel.

According to another embodiment, there is also provided a patient support apparatus provided with a frame, a base having a plurality of casters for supporting the frame on a floor and a wheel assembly connected to the base. The wheel assembly is provided with a fixed portion secured to the base and a pivoting portion pivotally attached to the fixed portion. The wheel assembly is also provided with a wheel operatively connected to the pivoting portion, the wheel being movable between a first deployed position in contact with the floor when the pivoting portion is pivoted in a first direction and a second retracted position spaced apart from the floor when the pivoting portion is pivoted in a second opposed direction. The wheel assembly also has a spring assembly mounted between the fixed portion and the pivoting portion for urging the pivoting portion in the first direction to urge the wheel in the first deployed position in contact with the floor. The wheel assembly further has an actuator operatively coupled to the fixed portion and to the pivoting portion, the actuator being actuatable between an extended position to urge the pivoting portion in the second direction against an action of the spring assembly to thereby raise the wheel in the second retracted position and a retracted position wherein the actuator allows the action of the spring assembly to urge the pivoting portion in the first direction. The patient support apparatus has a motor assembly operatively connected to the wheel for driving the wheel along the floor when in the first deployed position and a control device for driving the motor in response to an operator request.

According to a second aspect, there is provided a wheel assembly connectable to a base of a patient support apparatus having a plurality of casters. The wheel assembly has a supporting structure securable to the base. The wheel assembly also has an actuator mounted to the supporting structure and having a distal end, the actuator being actuatable between a retracted position and an extended position. The wheel assembly further has a wheel operatively connected to the distal end of the actuator, the wheel being movable between a first deployed position when the actuator extends in the extended position, and a second raised position when the actuator extends in the retracted position. The wheel assembly is also provided with a spring assembly operatively mounted between the supporting structure and the wheel for urging the wheel in the first deployed position.

In one embodiment, when the wheel assembly is connected to the base of the patient support apparatus, the first deployed position of the wheel is in contact with the floor and the second retracted position is spaced apart from the floor.

In one embodiment, the supporting structure has an elongated transverse member securable to the base and a mounting plate secured to the elongated transverse member, the actuator being mounted to the mounting plate.

In one embodiment, the actuator comprises a linear actuator.

In one embodiment, the linear actuator has a body secured to the support structure and an elongated rod extending substantially horizontally in a longitudinal direction of the patient support apparatus.

In one embodiment, the wheel assembly further has an intermediate connecting structure pivotally mounted between an axle of the wheel and the supporting structure for operatively connecting the wheel to the supporting structure.

In one embodiment, the spring assembly comprises at least one linear compression spring.

In one embodiment, the spring assembly has a first and a second linear compression springs, a first mounting arrangement for mounting a first end of each of the first and second linear compression springs to the supporting structure and a second mounting arrangement for mounting a second opposed end of each of the first and second linear compression springs to an axle of the wheel.

In one embodiment, the wheel assembly further has a control device operatively connected to the actuator, the control device being actuatable by an operator for selectively moving the actuator between the retracted position and the extended position to thereby move the wheel between the first deployed position and the second retracted position.

According to another embodiment, there is also provided a patient support apparatus provided with a frame, a base having a plurality of casters for supporting the frame on a floor and a wheel assembly connected to the base. The wheel assembly has a supporting structure secured to the base; an actuator mounted to the supporting structure and having a distal end, the actuator being actuatable between a retracted position and an extended position; a wheel operatively connected to the distal end of the actuator, the wheel being movable between a first deployed position in contact with the floor when the actuator extends in the extending position, and a second raised or retracted position spaced apart from the floor when the actuator extends in the retracted position; and a spring assembly operatively mounted between the supporting structure and the wheel for urging the wheel in the first deployed position. The patient support apparatus is also provided with a control device operatively connected to the actuator, the control device being actuatable by an operator for selectively moving the actuator between the retracted position and the extended position to thereby move the wheel between the first deployed position and the second retracted position.

According to a third aspect, in embodiments, there is provided a control handle for a motorized bed having an elongated post provided with a proximal end and a distal end and a connecting element for connecting the proximal end of the elongated post to the bed. The connecting element is configured to enable moving the elongated post between a substantially vertically deployed operative position and a stowed inactive position. The control handle has a handle member secured to the distal end of the elongated post, the handle member having an actuatable trigger for controlling propelling of the bed when the elongated post extends in the deployed operative position.

In one embodiment, the handle member is further provided with a user interface mounted thereto, the user interface being configured for providing bed information to the operator when the elongated post extends in the deployed operative position.

In one embodiment, the user interface is inactivated in the stowed inactive position of the elongated post.

According to a fourth aspect, there is provided a control system for a motorized bed. The control system has a control handle connected to the bed, the control handle having a trigger actuatable between a rest position and a fully actuated position, the trigger further having a first predetermined position between the rest position and the fully actuated position. The control system is also provided with a controller operatively connected to the control handle and a motorized wheel assembly of the bed. The controller is configured to propel the bed when the trigger is activated between the first predetermined position and the fully activated position, the controller propelling the bed at a variable speed according to a current position of the trigger. The controller further prevents propelling of the bed when the trigger is activated below the first predetermined position.

According to a fifth aspect, there is provided a control for a handle of a bed having a trigger operatively mounted with the handle and actuatable between a rest position and a fully actuated position. The control for a handle has a position sensor connected to the trigger for sensing position thereof and providing an output representative of a current position of the trigger. The control for a handle also has a shutter secured to the trigger, the shutter comprising a projecting member moving with the trigger. The control for a handle is further provided with an optical sensor having an optical path and mounted within the handle proximate a distal end of the projecting member of the shutter such that the distal end extends away of the optical path when the trigger extends in the rest position and the distal end extends through the optical path when the trigger is actuated from at least a first predetermined actuated position until the fully actuated position to thereby interrupt the optical path. The optical sensor provides an output representative of a current state of the optical path. The control for a handle is further provided with a controller for controlling a component of the bed according to the output of the position sensor and the output of the optical sensor.

In one embodiment, the controlled component of the bed is a motorized wheel assembly.

According to a sixth aspect, there is provided a user interface for a handle of a motorized patient support apparatus. The user interface has an operating visual indicator mounted on the handle for indicating a current status of the patient support apparatus, the current status being one of an inactive status, a propelled forward status and a propelled backward status. The user interface also has at least one additional visual indicator for indicating at least one initial condition to be executed by the operator.

In one embodiment, the operating visual indicator comprises a set of LEDs mounted adjacent according to a given shape, the LEDs being lid according to a predetermined sequence representative of forward or backward movement of the patient support apparatus.

In one embodiment, the user interface for a handle further has a backwards direction control for enabling backwards movement of the patient support apparatus.

BRIEF DESCRIPTION OF THE DRAWINGS

Having thus generally described the nature of the invention, reference will now be made to the accompanying drawings, showing by way of illustration example embodiments thereof and in which.

DETAILED DESCRIPTION

Figure 1:
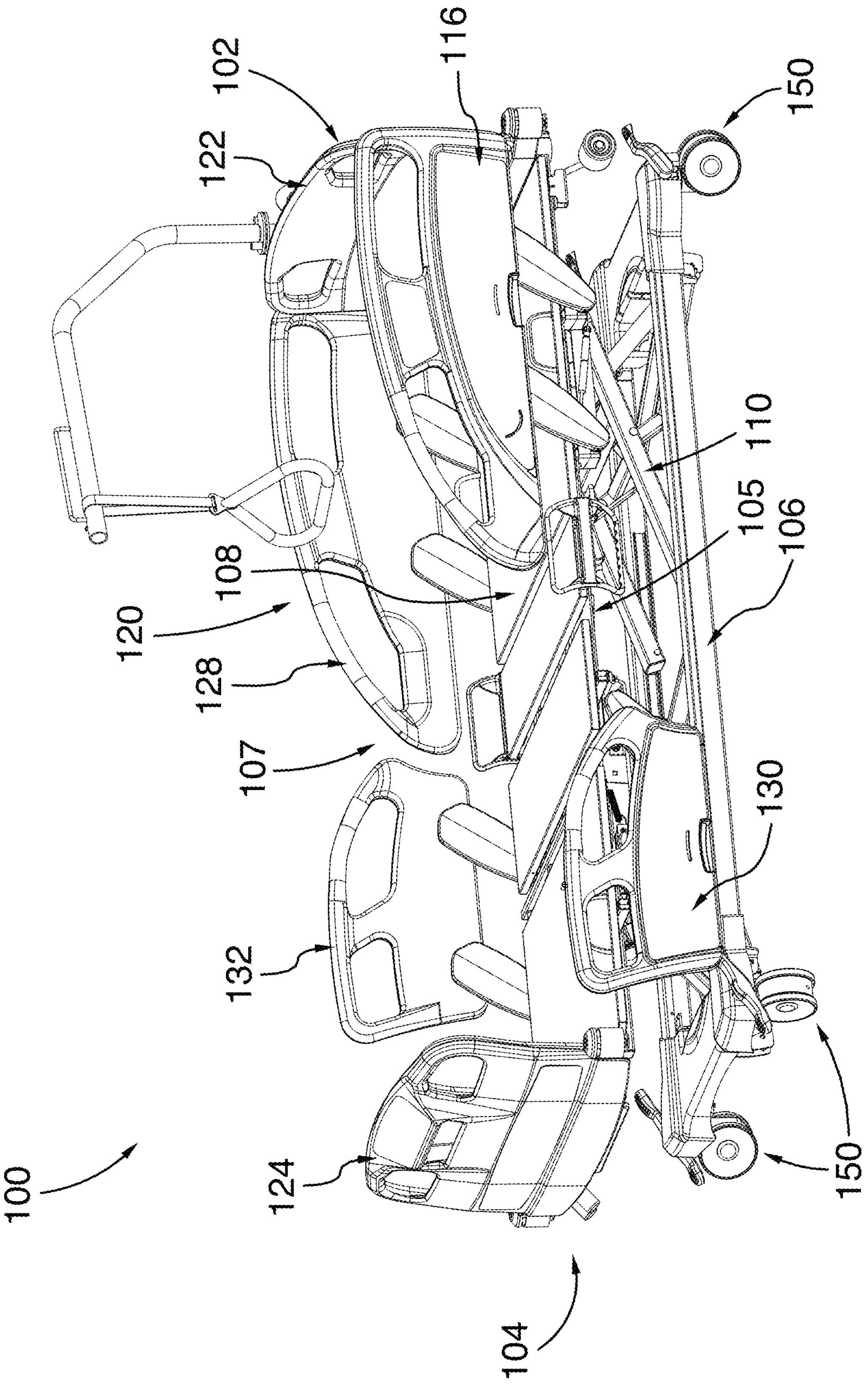
FIG.1 (Prior Art)
FIG. 1 (PRIOR ART) is a top perspective view of a hospital bed of the prior art.

Referring to FIG. 1 (PRIOR ART), there is shown a hospital bed 100 of the prior art. The bed 100 comprises a head end 102, an opposite foot end 104 and spaced-apart left and right sides 105, 107 extending between the head end 102 and the foot end 104.

Some of the structural components of the beds 100, 200 or 600 will be designated hereinafter as “right”, “left”, “head” and “foot” from the reference point of an individual lying on his/her back on the support surface of the mattress provided on the bed 100, 200 or 600 with his/her head oriented toward the head end 102 of the bed 100 and the his/her feet oriented toward the foot end 104 of the bed 100. As it will be appreciated, in this context, the “left” and “right” of beds 100 or 200 are respectively on the “right” and “left” of a caregiver or health care professional positioned at the foot end 104 of the bed 100 (or at the food end of beds 200 or) and looking at the individual lying on the bed 100 (i.e. looking towards the head end 102 of the bed 100).

The bed 100 includes a base 106, a patient support assembly 108 and an elevation system 110 operatively coupling the patient support assembly 108 to the base 106. In the illustrated embodiment, the base 106 is provided with a plurality of casters 150 mounted to the base 106 by pivots (not shown), as known in the art. These casters 150 allow the bed 100 to be moved and maneuvered along a floor, for instance the floor of a health care facility such as a hospital.

The patient support assembly 108 of the bed 100 includes a frame 160 and a patient support surface 162 supported by the frame 160, where the patient support surface 162 is provided with a plurality of adjacent body surfaces for supporting various parts of the body of the patient which can be angled relative to each other, as known in the art. A lying surface such as a mattress or the like (not shown) is typically provided on the patient support surface 162 for receiving the patient thereon.

The bed 100 further includes a patient support barrier system 120 generally disposed around the patient support assembly 108. The barrier system 120 includes a plurality of barriers which extend generally vertically around the patient support assembly 108. The plurality of barriers includes a headboard 122 located at the head end 102 and a footboard 124 disposed generally parallel to the headboard 122 and located at the foot end 104 of the bed 100. The plurality of barriers further includes spaced-apart left and right head siderails 116, 128 which are located adjacent the headboard 122 and spaced-apart left and right foot siderails 130, 132 which are respectively located between the left and right head siderails 116, 128 and the foot end 104 of the bed 100. Each one of the plurality of barriers is moveable between an extended or raised position for preventing the patient lying on the bed 100 from moving laterally out of the bed 100, and a retracted or lowered position for allowing the patient to move or be moved laterally out of the bed 100, as known in the art.

The bed 100 may further include a control interface (not shown) for controlling features of the bed 100. The control interface could be integrated into the footboard 124, into the headboard 122 or into one or more of the siderails 116, 128, 130, 132. Alternatively, the control interface could be provided as a separate unit located near the bed 100 or even at a location remote from the bed 100.

Referring now to FIGS. 2 to 16, there is shown an embodiment of a patient support apparatus 200 such as a hospitable bed or a bariatric bed, provided with a wheel assembly 220. As it will become apparent to the skilled addressee upon reading of the present description, such a wheel assembly 220 may provide improved maneuverability to an operator operating the hospital bed 200. As further detailed below, in one embodiment, the wheel assembly 220 is further provided with a motor for propelling the wheel. In embodiments, such wheel assembly 220 may also be used as a fifth wheel enabling ease of direction without any propelling means.

Figure 2:
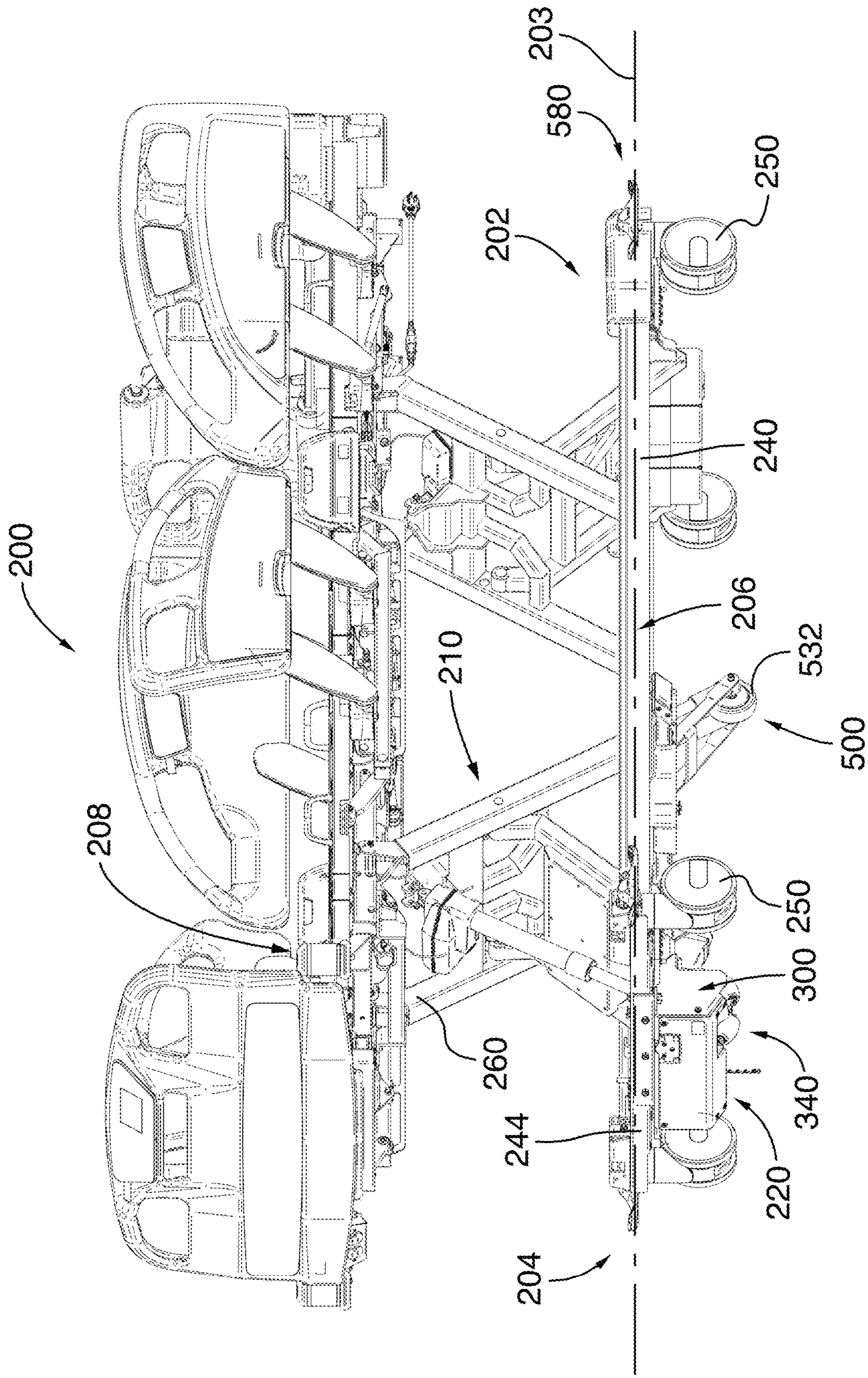
FIG. 2 is a left side perspective view of a hospital bed in a raised configuration, in accordance with one embodiment.
Figure 3:
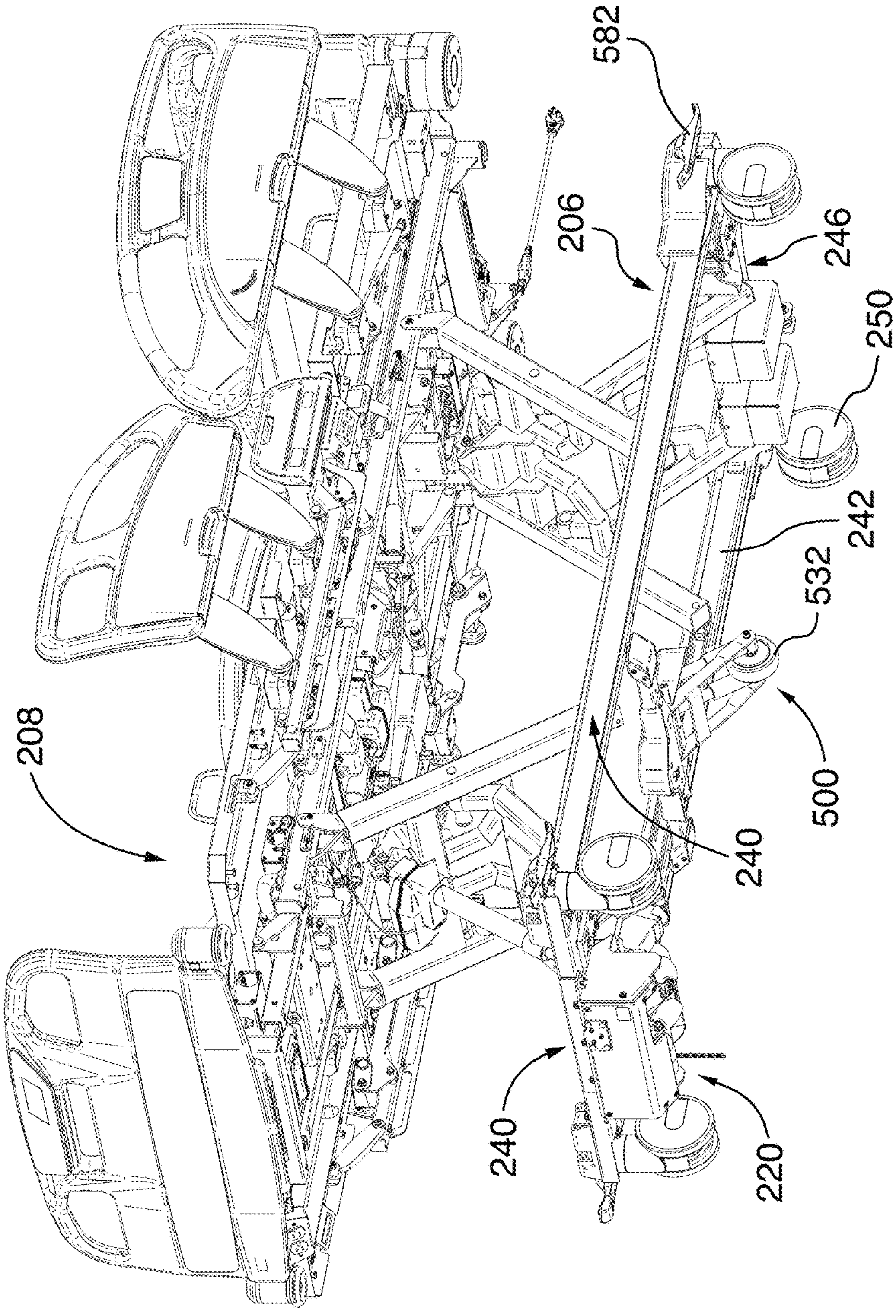
FIG. 3 is a bottom left perspective view of the hospital bed shown in FIG. 2.

In one embodiment, hospital bed 200 presents a number of structural similarities with hospital bed 100 with respect the general components such as a base 206 (which is similar to base 106 of bed 100), a patient support surface 208 (which is similar to patient support surface 108 of bed 100) and an elevation system 210 (which is similar to elevation system 110 of bed 100). In this embodiments, the wheel assembly 220 is mounted to the base 206 of the patient support apparatus 200. Referring more specifically to FIGS. 2 and 3, the base 206 of the patient support apparatus 200 comprises a pair of longitudinal base members 240, 242, a foot transversal base member 244 and a head transversal base member 246, both extending between the longitudinal base members 240, 242, respectively near the foot end 204 and the head end 202. In this illustrated embodiment, the wheel assembly 220 is secured to the foot transversal base member 244, and is substantially aligned with a longitudinal axis 203 of the bed 200, centrally between two spaced-apart casters 250 mounted at the foot end 204 of the patient support apparatus 200. The wheel assembly 220 may also be mounted offset from the longitudinal axis 203 of the bed or even along one of the longitudinal base members 240, 242.

As it should become apparent below, positioning the wheel assembly 220 proximate the foot end 204 while the bed 200 would typically be maneuvered from the opposed head end may improve maneuverability of the bed 200 in easing turns. However, while in the illustrated embodiment, the wheel assembly 220 is mounted at the foot end 204 of the patient support apparatus 200, it will be appreciated that various other arrangements may be considered. For example, the wheel assembly 220 may alternatively be secured to the head transversal base member 246. Additionally, the positioning of the wheel assembly 220 at the proximate foot end 204 or at the head end 202 may advantageously provide space or clearance under the bed 200 (i.e. between the base 206 and the floor), either in a raised or lowered configuration. Such space or clearance may, for instance, allow securely stowing a night table or other medical equipment under the bed 200. In one embodiment, the base 206 is at a vertical distance of 5 inches from the floor. Alternatively, the base 206 could be higher or lower than 5 inches from the floor.

While in some embodiment, it may be advantageous to mount the wheel assembly at the foot end 204 or at the head end 202, in another embodiment, the wheel assembly 220 may also be mounted to an intermediate transversal base member disposed between the foot transversal base member 244 and the head transversal base member 246, for example centrally therebetween. In still a further embodiment, the base 206 may be provided with a single transversal base member to which the wheel assembly 220 may be secured.

As it will be appreciated by the skilled addressee, the wheel assembly 220 can be mounted to the base 206 of the patient support apparatus 200 in a number of ways. As such, securing the wheel assembly using bolts, spot welding, rivets, brazing, soldering, gluing, bonding with an epoxy weld bonding compound, or using nanomaterials or nanoscale sculpting for bonding, or any other means for firmly securing the wheel assembly 220 to the base 206 may be considered.

Figure 4:
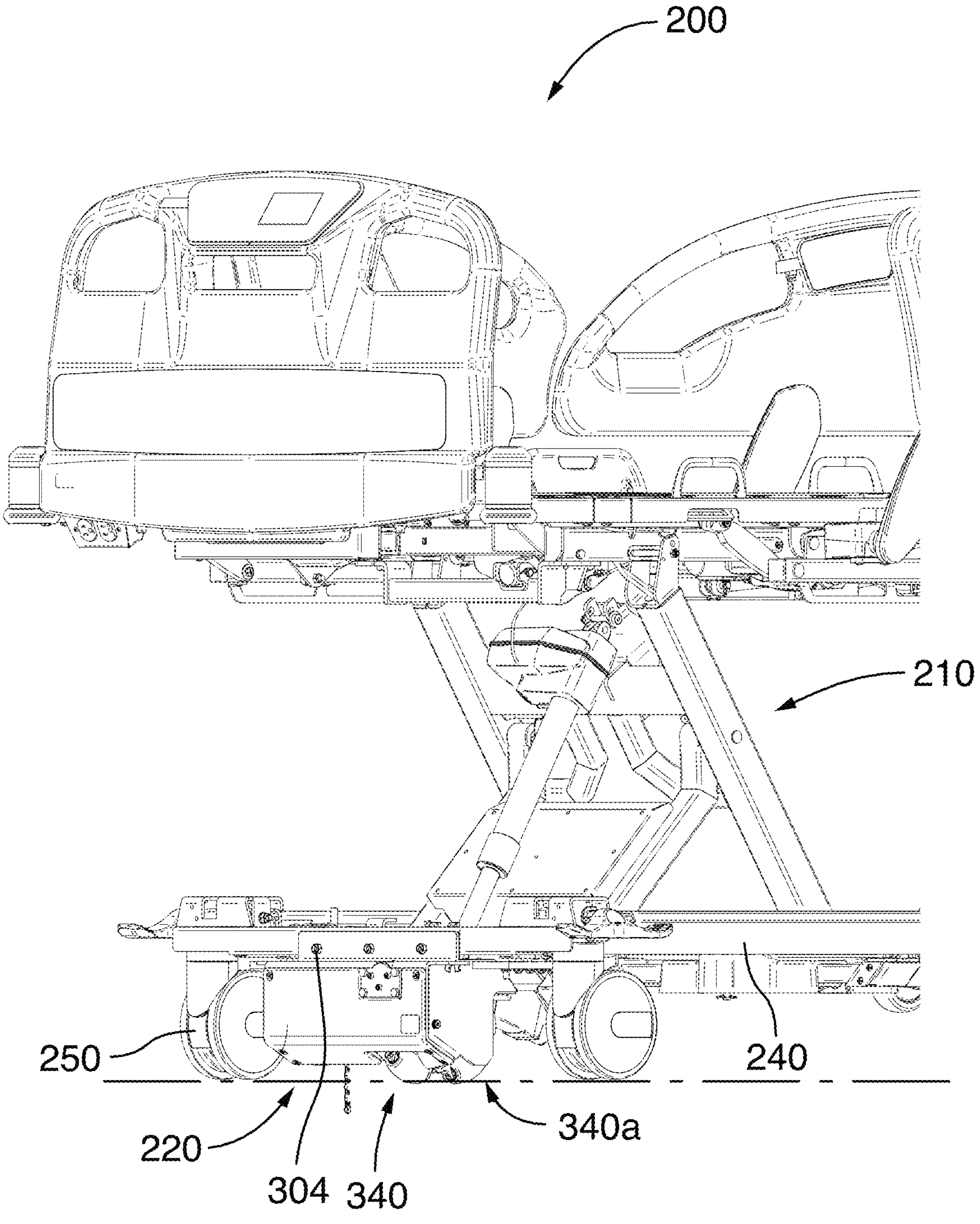
FIG. 4 is an enlarged, partial left perspective of the hospital bed shown in FIG. 2, for better showing an embodiment of a wheel assembly in a deployed position.
Figure 5:
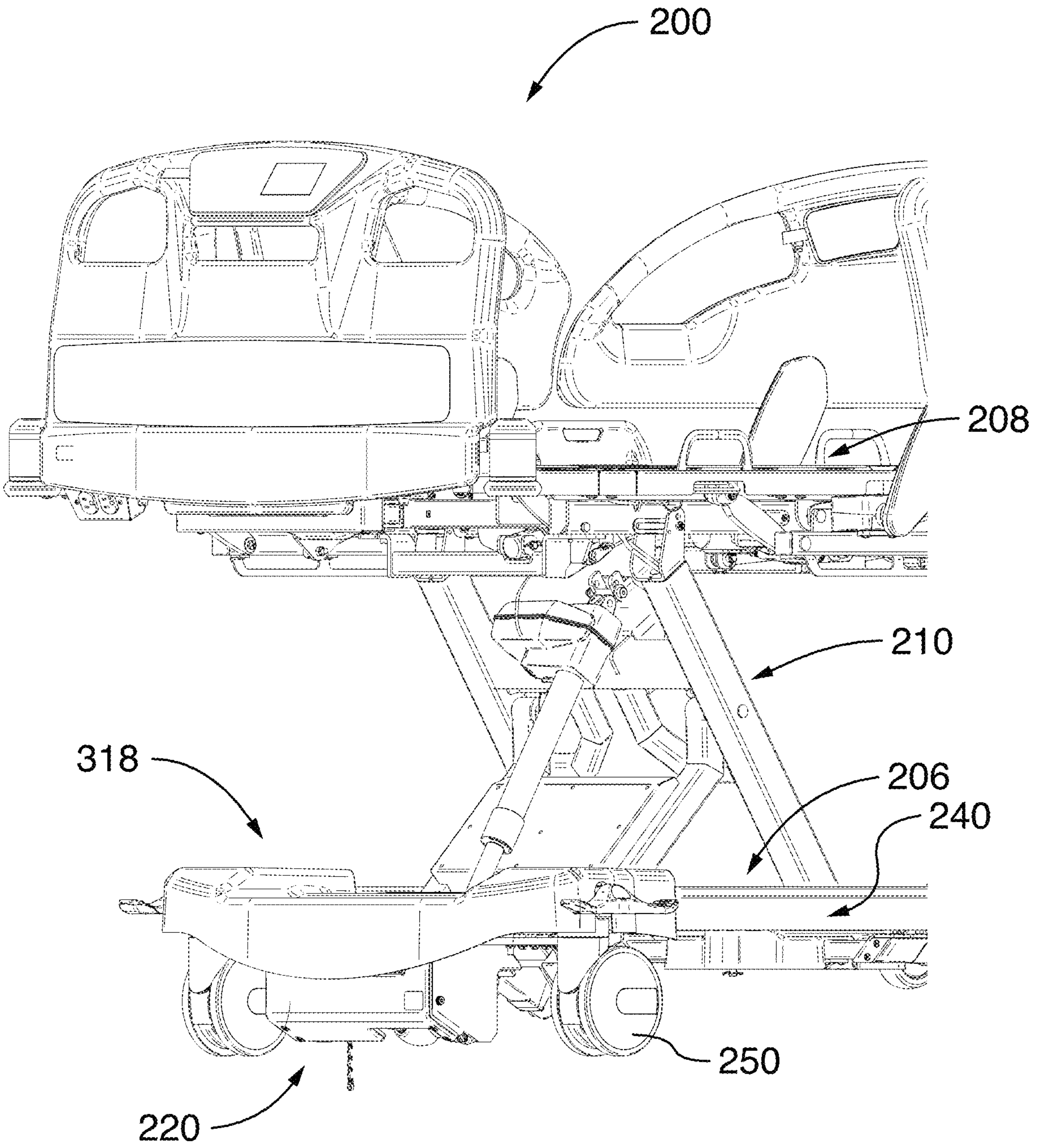
FIG. 5 is another enlarged, partial left perspective view of the hospital bed shown in FIG. 2, for better showing the wheel assembly in a retracted position, and further showing an embodiment of a finishing cover for the wheel assembly.
Figure 6:
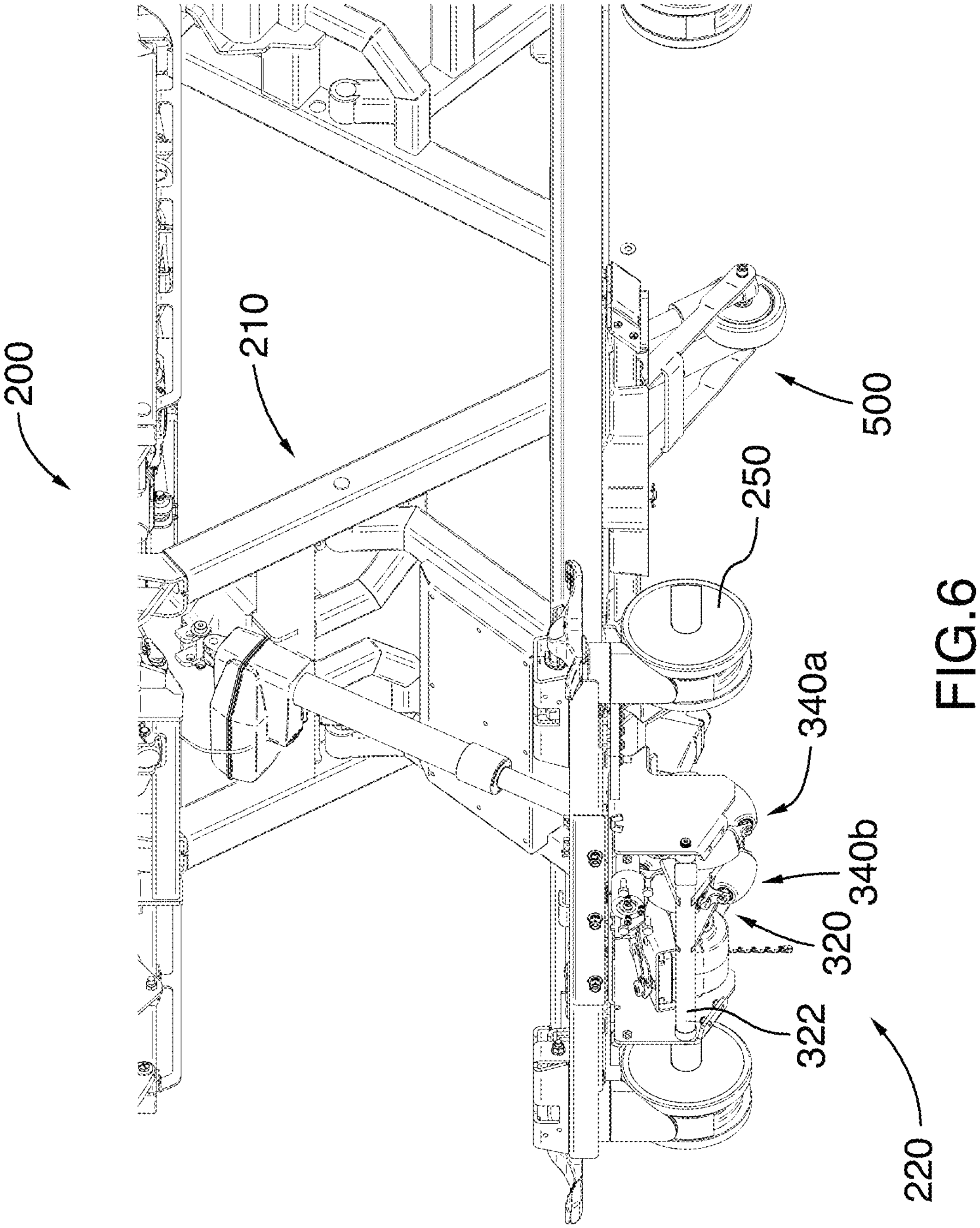
FIG. 6 is an enlarged left perspective view of the wheel assembly shown in FIG. 4, with a front cover of the wheel assembly being removed for better showing the internal components of the wheel assembly in the deployed position.
Figure 7:
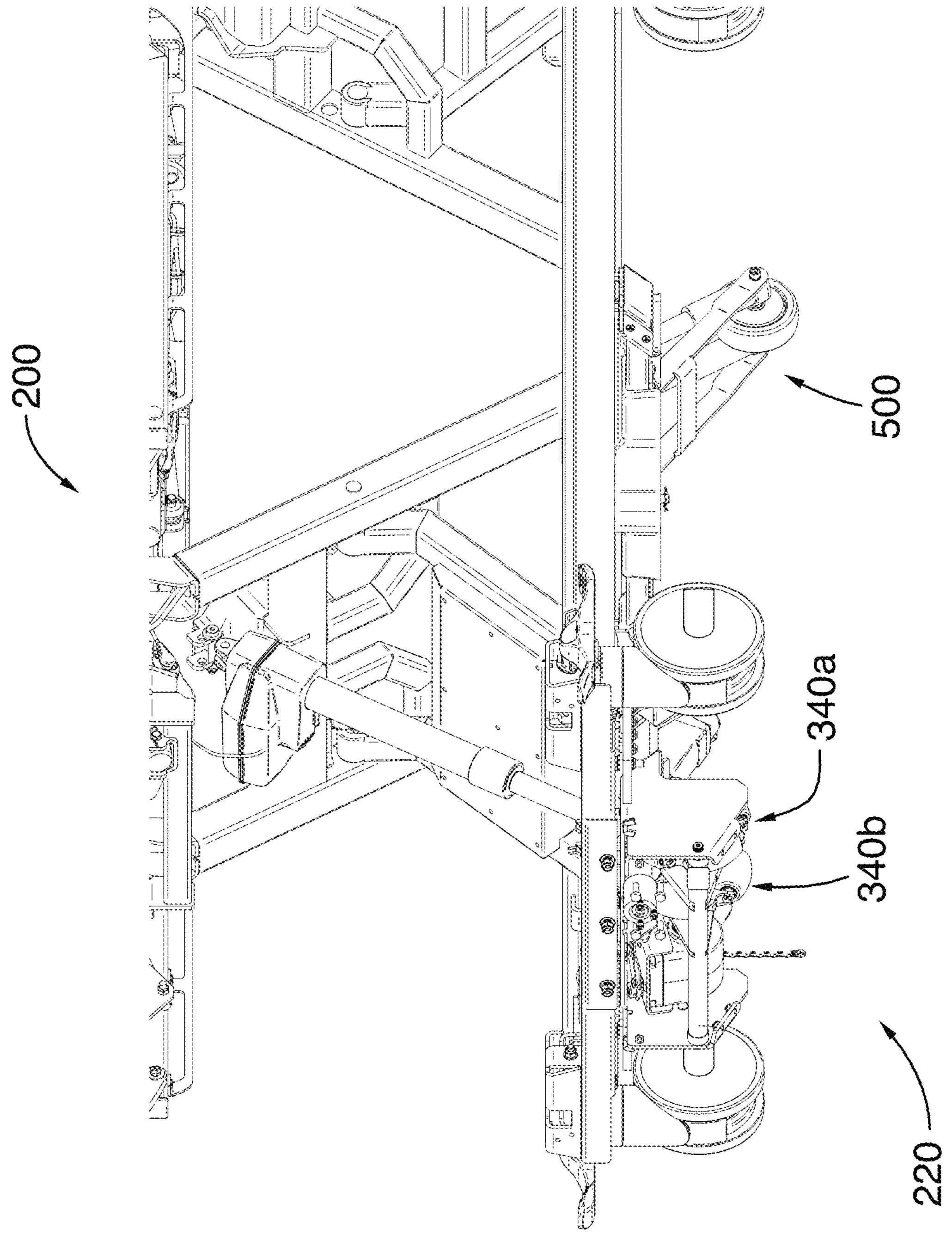
FIG. 7 is an enlarged left perspective view of the wheel assembly shown in FIG. 5, with the finishing cover and the front cover of the wheel assembly removed for better showing the internal components of the wheel assembly in the retracted position.
Figure 8:
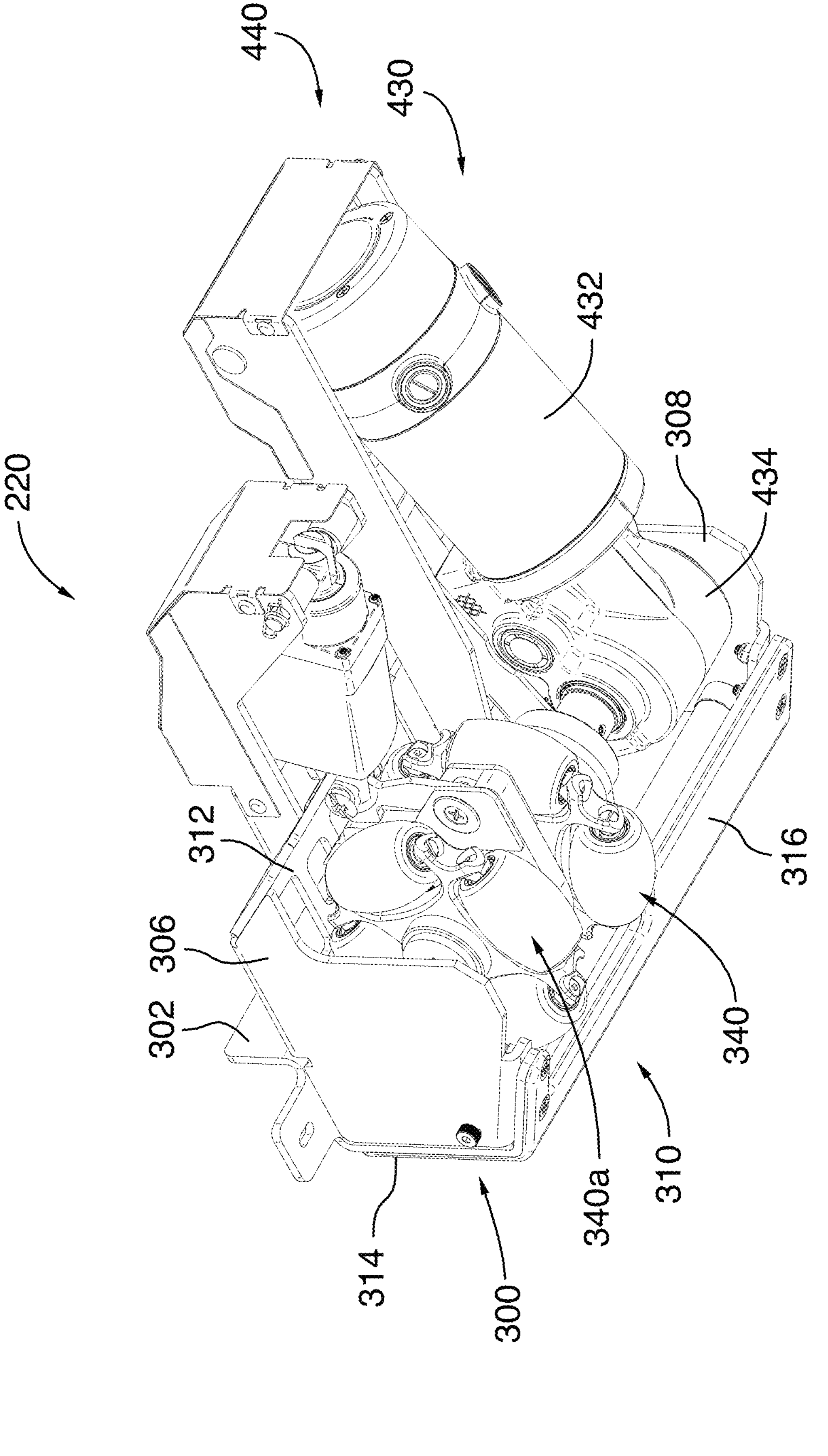
FIG. 8 is a bottom left perspective view of a motorized wheel assembly for a hospital bed, in accordance with one embodiment.
Figure 9:
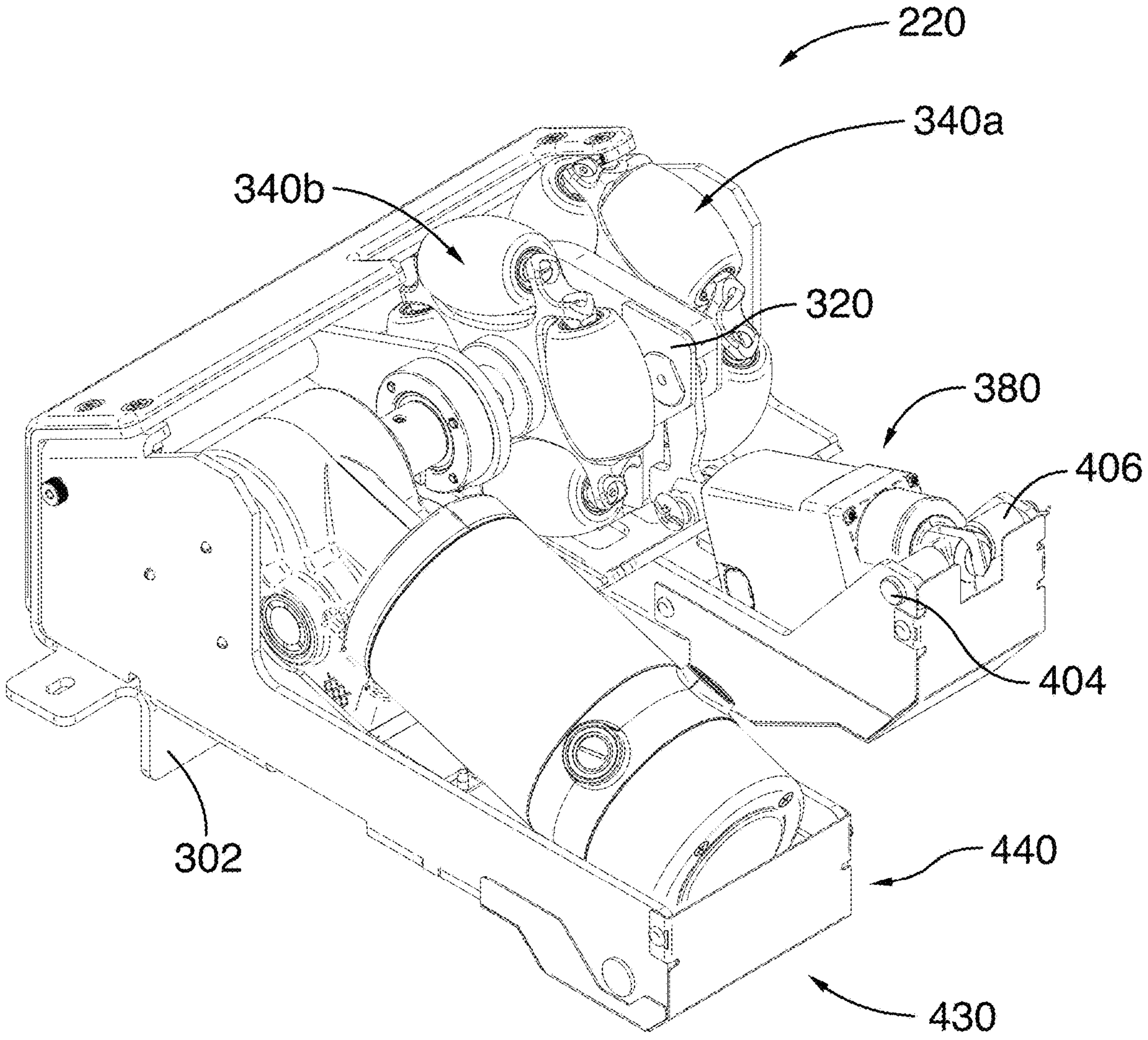
FIG. 9 is an upside down, bottom right perspective view of the motorized wheel assembly shown in FIG. 8.
Figure 10:
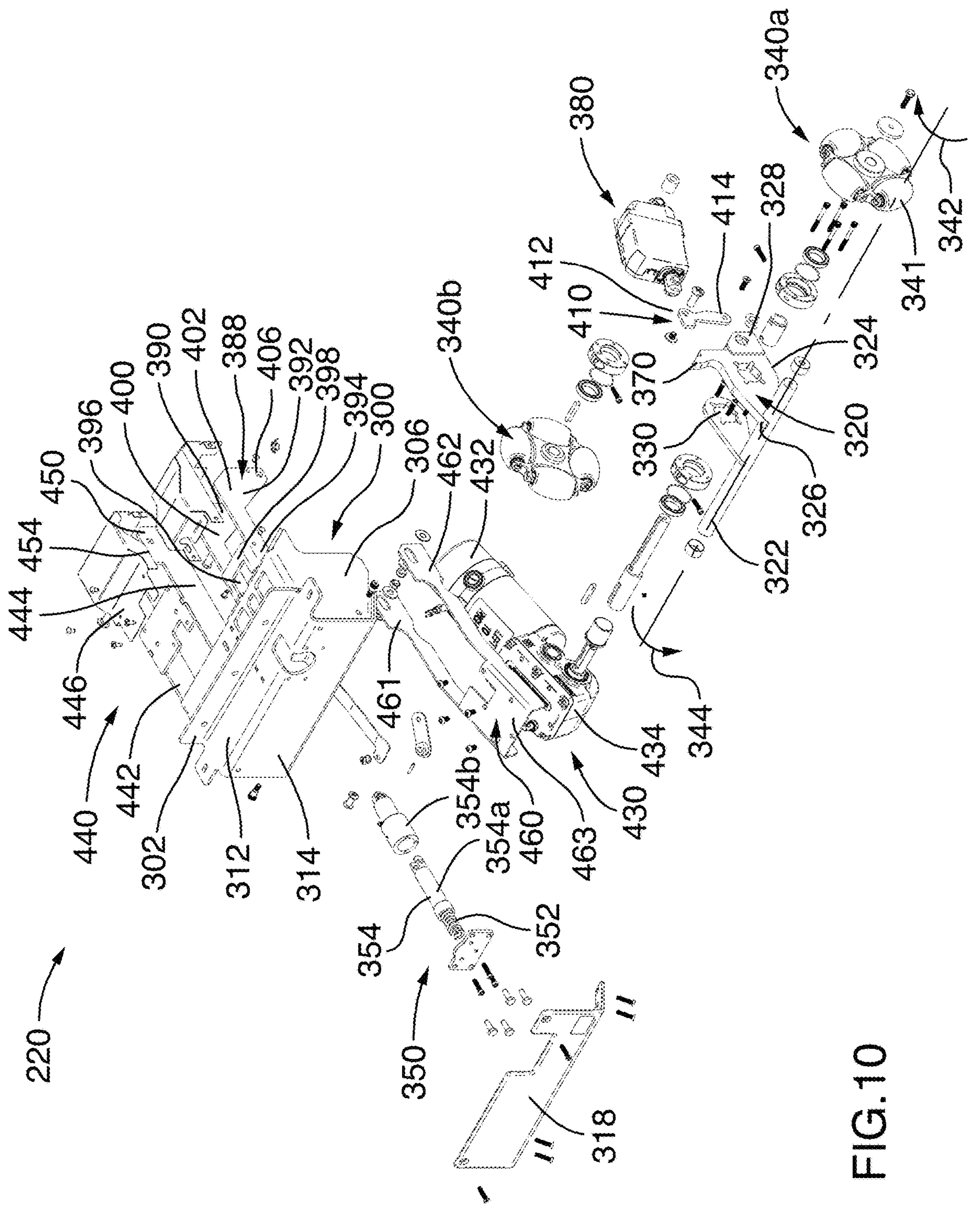
FIG. 10 is a partially exploded perspective view of the motorized wheel assembly shown in FIG. 8.
Figure 11:
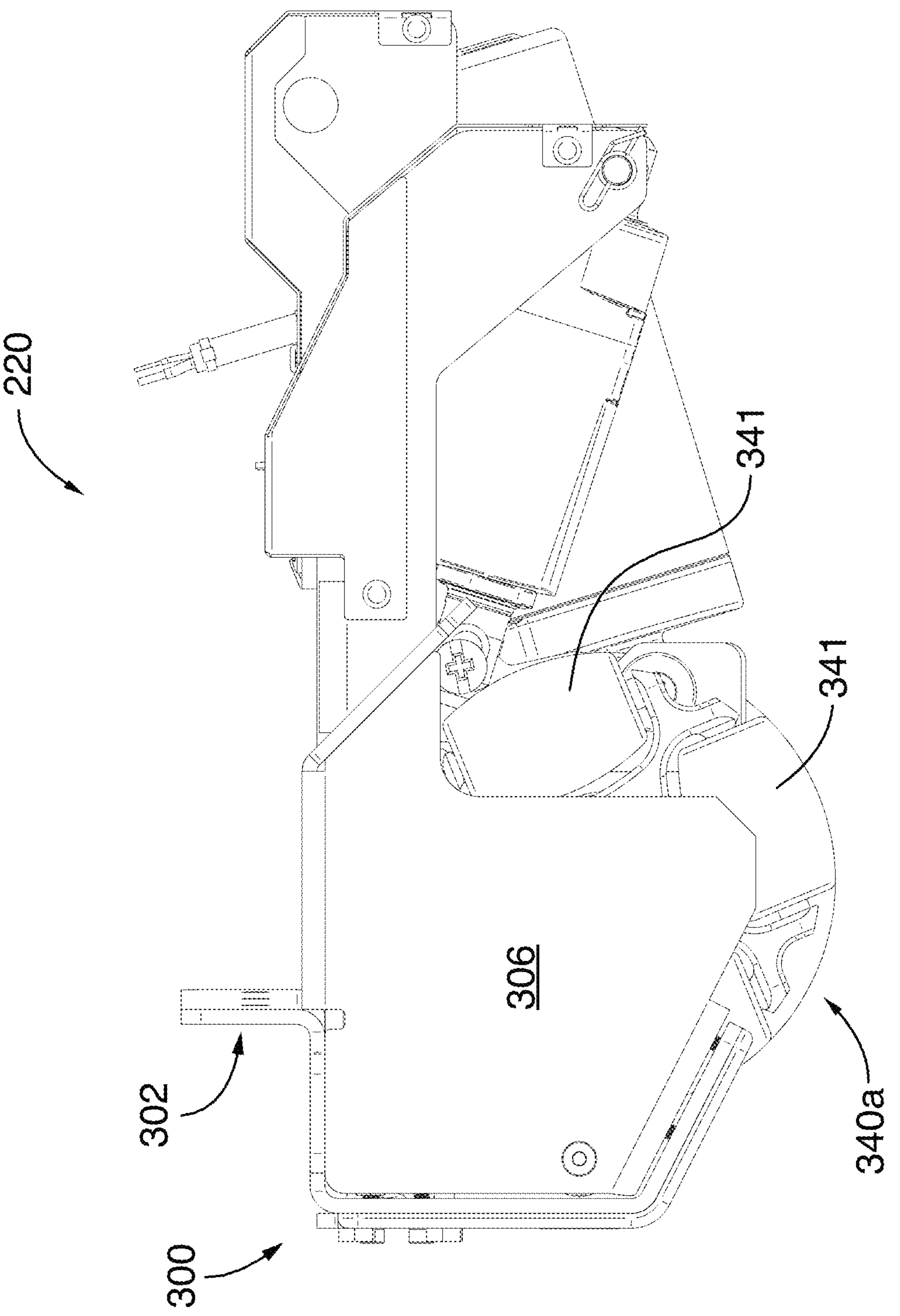
FIG. 11 is a left side view of the motorized wheel assembly shown in FIG. 8, with the wheel in a deployed position.
Figure 12:
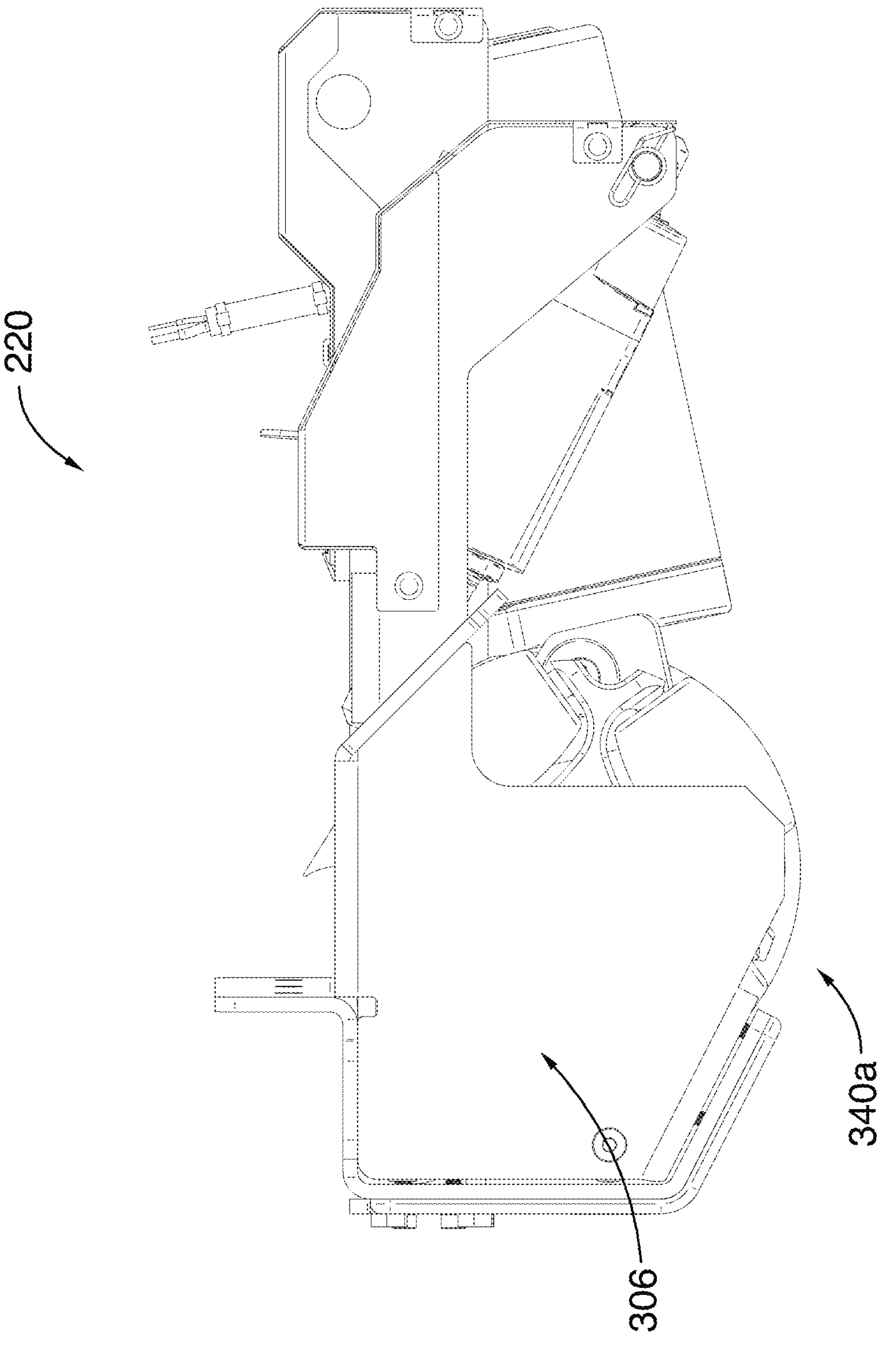
FIG. 12 is a left side view of the motorized wheel assembly shown in FIG. 8, with the wheel in a retracted position.

Turning now more particularly to FIGS. 8 to 10, in the illustrated embodiment, the wheel assembly 220 comprises a housing or casing 300 (which is a fixed portion) for mounting the wheel assembly 220 to the base 206 of the patient support apparatus 200, and a pivoting portion 320 provided with a pair of wheels 340*a*, 340*b*, the pivoting portion 320 being pivotably mounted in the casing 300 for allowing the wheels 340*a*, 340*b* to move between a raised position (i.e. a retracted position, as shown for instance in FIGS. 5 and 7) and a lowered position (i.e. a deployed position, as shown for instance in FIGS. 4 and 6). The wheel assembly 220 further comprises a spring assembly 350 (best shown in FIG. 10) mounted between the fixed portion 300 and the pivoting portion 320, for urging the pivoting portion 320 in a first direction 342 (to thereby bias the wheel 340*a*, 340*b* toward the first deployed position), as well as a linear actuator 380. The linear actuator 380 is mounted to the fixed portion 300 and is operatively coupled to the pivoting portion 320. As it will become apparent below, the linear actuator 380 is actuatable between an extended position to urge the pivoting portion 320 in a second direction 344 toward the raised position (i.e. the retracted position—best shown in FIGS. 5 and 7) and retracted position to release the pivoting portion 320 into the lowered position (i.e. the deployed position—best shown in FIGS. 4 and 6). In the illustrated embodiment, the wheel assembly 220 is further provided with a motor assembly 430 mounted to the fixed portion 330 and operatively coupled to the wheels 340*a*, 340*b* for driving the wheels 340*a*,340*b* along the floor when they are extending in the first deployed position.

Returning to FIGS. 4 to 7, in one embodiment, the fixed portion 300 is provided with a mounting plate 302 securable to the base 206 through bolts 304 (better shown in FIGS. 4 and 5) and two spaced apart side panels 306, 308 extending downwardly therefrom and defining a compartment 310 therebetween. A top panel 312, a front panel 314 and a bottom panel 316 may also be mounted with the side panels 306, 308 for protecting elements mounted inside the compartment 310 from inadvertent shocks that may occur or for ornamental considerations. The fixed portion 300 may also be configured to prevent easy access to the compartment 310 for safety purpose by incorporating a finishing front panel 318 (best shown in FIG. 5), for example. Various arrangements may be considered for the fixed portion 300, as it should be apparent to the skilled addressee.

The wheel assembly 220 also has the pivoting portion 320 pivotally attached to the fixed portion 300. As better shown in FIG. 10, in one embodiment, the pivoting portion 320 is provided with an elongated rotating shaft 322 rotatably mounted between the two side panels 306, 308 (not shown) and a pivoting arm 324 having a first end 326 secured to the elongated rotating shaft 322 and a second distal end 328 projecting perpendicularly to the longitudinal axle of the elongated rotating shaft 322 and parallelly to the longitudinal axis of the bed to which the wheel assembly 220 is mounted.

Still referring to FIG. 10, in one embodiment, the elongated rotating shaft 322 is mounted to each of the side panels 306, 308 (not shown) with a corresponding bearing or support (not shown) enabling rotation of the elongated rotating shaft 322 with respect to the fixed portion 300 secured to the base 206 (not shown) of the bed 200 (not shown). In one embodiment, stop means may be provided within the bearings or supports in order to limit the rotational course of the elongated rotating shaft 322, to thereby limit the pivotal course of the pivoting arm 324, as it should become apparent below. Other arrangements using abutting members provided in the vicinity of the pivoting arm 324 may also be considered to limit the pivotal course of the pivoting arm 324, should it be desired. Other means of limiting the pivotal course of the pivoting arm 324 may be provided by distributing the mass of the rotating shaft 322 differently along the longitudinal axis of the rotating shaft 322, changing its position of the axis of rotation or modifying its shape (i.e., rotational inertia).

As better shown in FIG. 10, the second distal end 328 of the pivoting arm 324 is provided with a wheel mounting portion 330 adapted for receiving an axle of a wheel 340 therethrough, as detailed below.

Still referring to FIGS. 8 to 10, the wheel assembly 220 further has wheels 340*a*, 340*b* operatively connected to the pivoting portion 320. In the illustrated embodiment, a first wheel 340*a* and a second wheel 340*b* are mounted coaxially, on each side of the second distal end 328 of the pivoting arm

324. The wheels 340*a*, 340*b* are movable together between a first deployed position when the pivoting portion 320 is pivoted in the first direction 342 and a second retracted position when the pivoting portion 320 is pivoted in a second opposed direction 344 (shown in FIG. 10). In the illustrated embodiment, the first and second wheels 340*a*, 340*b* are omnidirectional wheels but other types and any numbers of wheels may be considered, such as mecanum wheels. The illustrated omnidirectional wheels 340*a*, 340*b* are provided with elongated rollers 341 (best shown in FIG. 11) mounted longitudinally and distributed along the periphery of the wheels 340*a*, 340*b* so as to rotate freely in a direction substantially perpendicular or transverse to the main rotation of the wheels 340*a*, 340*b*. Such an arrangement may be of great advantage since it enables to slightly translate the bed 200 laterally in reduced spaces without requiring complex movements. In such a case, the caregiver could simply push or pull the bed 200 laterally, even if the wheels 340*a*, 340*b* are in the deployed position on the ground and the elongated rollers 341 would freely rotate to help such a movement without too much resistance. A person skilled in the art would appreciate that an embodiment with two or more wheels 340*a*, 340*b* may be particularly advantageous for moving and pushing a bed that are designed to receive obese patients (e.g. a bariatric bed) where the weights can range from 360 kg to 460 kg. While in the illustrated embodiment, the bed 200 is provided with two wheels 340*a*, 340*b*, the bed 200 could be provided with a single wheel, or with a different number of wheels, without departing from the scope of the embodiment. Further, various numbers and configurations of rollers 341 could be considered for enabling a lateral displacement of the bed 200, and different manufacturing materials for the elongated rollers 341 may also be considered. For example, elongated rollers 341 could be made of steel, semi-steel iron, nylon, reinforced nylon, polyurethane (PU), rubber and the like.

Having described the pivoting portion 320, the spring assembly 350 will now be described with reference to FIGS. 13 and 14, which are cross-sectional views of the wheel assembly 220.

As stated above, the spring assembly 350 is mounted between the fixed portion 300 and the pivoting portion 320, for urging the pivoting portion 320 in the first direction 342, toward the first deployed position. More specifically, in the illustrated embodiment, the pivoting portion 320 is provided with a pivoting arm 324, as previously described. The second distal end 328 of the pivoting arm 324 is further provided with a projecting member 370 extending upwardly and parallel to the front panel 314 of the fixed portion 300, the spring assembly 350 being mounted between the fixed portion 300 and the projecting member 370, as illustrated in FIG. 13.

In the illustrated embodiment, the spring assembly 350 comprises a linear compression spring 352 mounted in a telescoping tubing 354. The telescoping tubing 354 is rigid but telescopic, and includes a first end 356 secured to the fixed portion 300 of the wheel assembly 220, and a second end 362. The telescoping tubing 354 generally extends in a horizontal plan and perpendicular to the front panel 314 of the fixed portion 300, as best shown in FIG. 13. A first end 358 of the linear compression spring 352 is attached to the first end 356 of the telescoping tubing 354 while a second end 360 of the linear compression spring 352 is attached to the second end 362 of the telescoping tubing 354. Under the spring effect, the telescoping tubing 354 is fully deployed, while the linear compression spring 352 urges against the pivoting portion 320 in the first direction 342.

In the illustrated embodiment, the telescoping tubing 354 may be provided with a first 354*a* and a second tube 354*b* (better shown in FIG. 10) sliding in each other. In another embodiment, the telescoping tubing 354 comprising a first 354*a* and a second tube 354*b* may be configured to pivot along with the pivoting portion 320.

Figure 13:
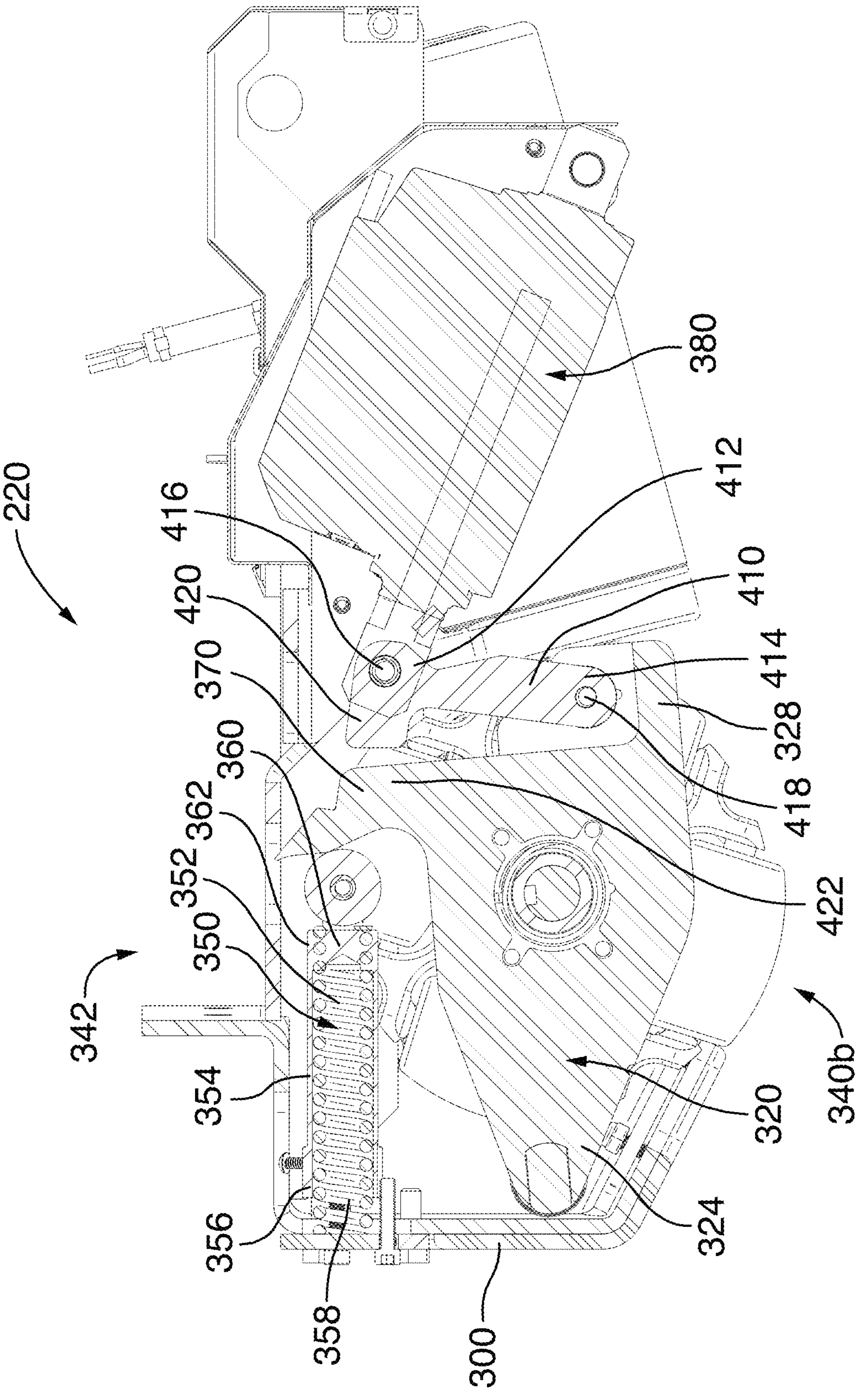
FIG. 13 is a cross-sectional left side view of the motorized wheel assembly shown in FIG. 8, with the wheel in the deployed position.
Figure 14:
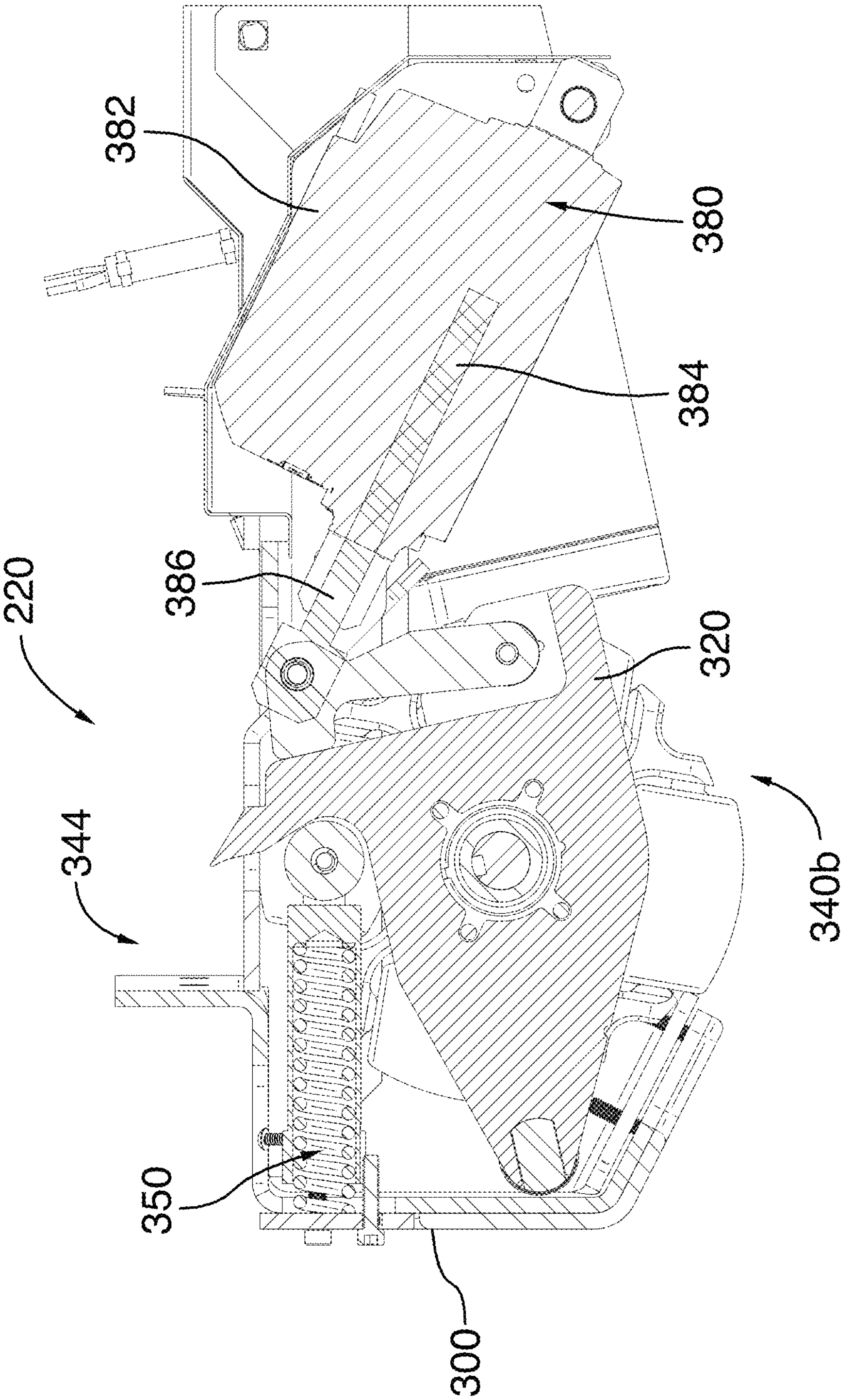
FIG. 14 is a cross-sectional left side view of the motorized wheel assembly shown in FIG. 8, with the wheel in the retracted position.

Still referring to FIGS. 13 and 14, the wheel assembly 220 also includes the linear actuator 380 mounted to the fixed portion 300 and being actuatable between the extended position (shown in FIG. 14) and the retracted position (shown in FIG. 13). As shown, when the linear actuator 380 in the extended position (FIG. 14), the linear actuator 380 pushes the pivoting portion 320 in the second direction 344 against the action of the spring assembly 350 to thereby raise the wheel 340 in the second retracted position.

Conversely, when the linear actuator 380 is in the retracted position (FIG. 13), the linear actuator 380 does not counteract the action of the spring assembly 350 and the wheel 340 is allowed to extend in the first deployed position under the action of the spring assembly 350.

In the illustrated embodiment, the linear actuator 380 is an electrically actuated actuator and includes a body 382 and an elongated rod 384 having a distal end 386. The linear actuator 380 is pivotally mounted to the fixed portion 300, for example through a mounting bracket 388, as better shown in FIG. 10. The mounting bracket 388 has two longitudinal spaced apart members 390, 392 secured at a first end 394, 396 to the mounting plate 302 of the fixed portion 300 and rigidly joined together with a transverse member 398. The second ends 400, 402 of the longitudinal members 390, 392 are each respectively provided with a mounting portion 404, 406 (better shown in FIG. 9) for pivotally mounting the body 382 of the linear actuator 380 thereto.

The distal end 386 of the elongated rod 384 of the linear actuator 380 is further movably supported with respect to the pivoting portion 320. In one embodiment, a support arm 410 as better seen in FIGS. 10 and 13 is movably connected between the distal end 386 of the elongated rod 384 and the second distal end 328 of the pivoting arm 324. In the illustrated embodiment, the support arm 410 has a first end 412 pivotally connected to the distal end 386 of the elongated rod 384 and a second end 414 pivotally connected to the second distal end 328 of the pivoting arm 324.

In one embodiment, a pin arrangement 416, 418 is respectively used for each pivot connection between the support arm 410 and the elongated rod 384.

In a further embodiment, the pivot connection to the distal end 328 of the pivoting arm 324 is located distal from the projecting member 370. In the illustrated embodiment, the pivot connection to the distal end 328 of the pivoting arm 324 is located at the bottom portion thereof, and the linear actuator 380 is supported above the support arm 410.

In one embodiment, the first end 412 of the support arm 410 connected to the distal end 386 of the elongated rod 384 has a surface 420 projecting therefrom and adapted for cooperating with the pivoting portion 320, but only when the linear actuator 380 is actuated in the extended position, as illustrated in FIGS. 13 and 14. In this illustrated embodiment, the second distal end 328 of the pivoting arm 324 is provided with the projecting member 370 previously described. The projecting member 370 has a surface 422 projecting towards the linear actuator 380 and facing the surface 420 of the first end 412 of the support arm 410. When the linear actuator 380 is actuated in the extended position as shown in FIG. 14, the surface 420 of the first end 412 of the support arm 410 is brought into contact with the facing surface 422 of the projecting member 370 and pushes against it to pivot the pivoting portion 320 in the second direction 344 against the action of the spring assembly 350.

In one embodiment, the surfaces 420, 422 are flat surfaces adapted to slide on each other during the pivotal rise of the pivoting portion 320. The skilled addressee will appreciate that the projecting surface 420 may be omitted from the support arm 410 and the end surface of the elongated rod 384 of the linear actuator 380 may be used instead to bring it into contact with the facing surface 422 of the projecting member 370 and push against it to pivot the pivoting portion 320 in the second direction 344 against the action of the spring assembly 350.

Figure 15:
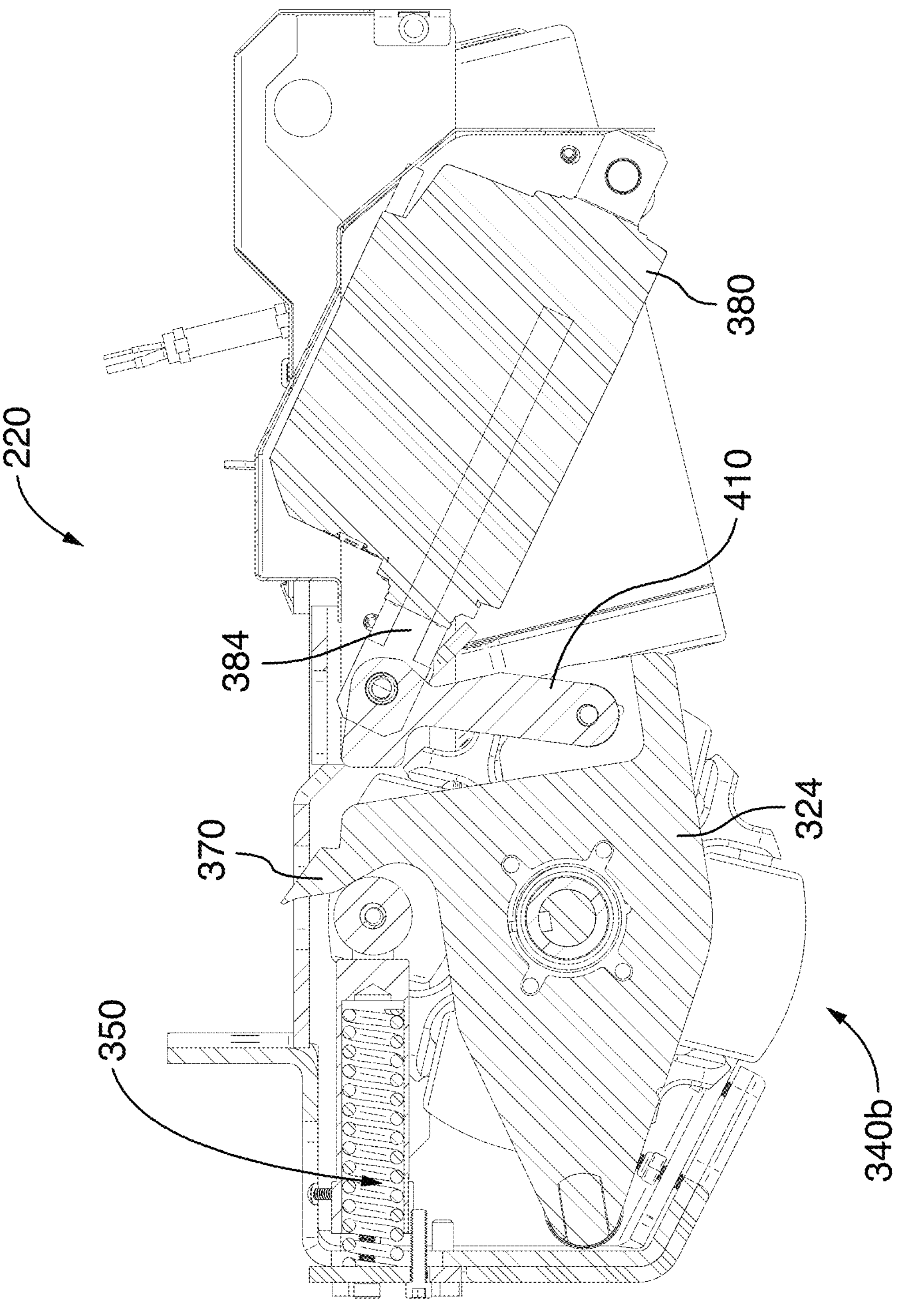
FIG. 15 is a cross-sectional left side view of the motorized wheel assembly shown in FIG. 8, with the wheel in a partially retracted position due to the presence a ground obstacle (not shown) under the wheel.

FIG. 15 shows the wheel 340*b* (and incidentally the wheel 340*a* as well—not shown) partially retracted due to the presence of a ground obstacle (not shown) under the wheel. The pivoting arm 324 of the pivoting portion 320 has been slightly pivoted in the second direction 344. The spring assembly 350 is more compressed due to the pivoting of the projecting element 370. Since the pivoting arm 324 has been slightly pivoted, the longitudinal direction of the linear actuator 380 has also been slightly changed, supported by the supporting arm 410. As it should be noted, this partial retraction of the wheel 340*b* due to the presence of a ground obstacle does not damage the linear actuator 380 since no undesired force is applied to the elongated rod 384.

Figure 16:
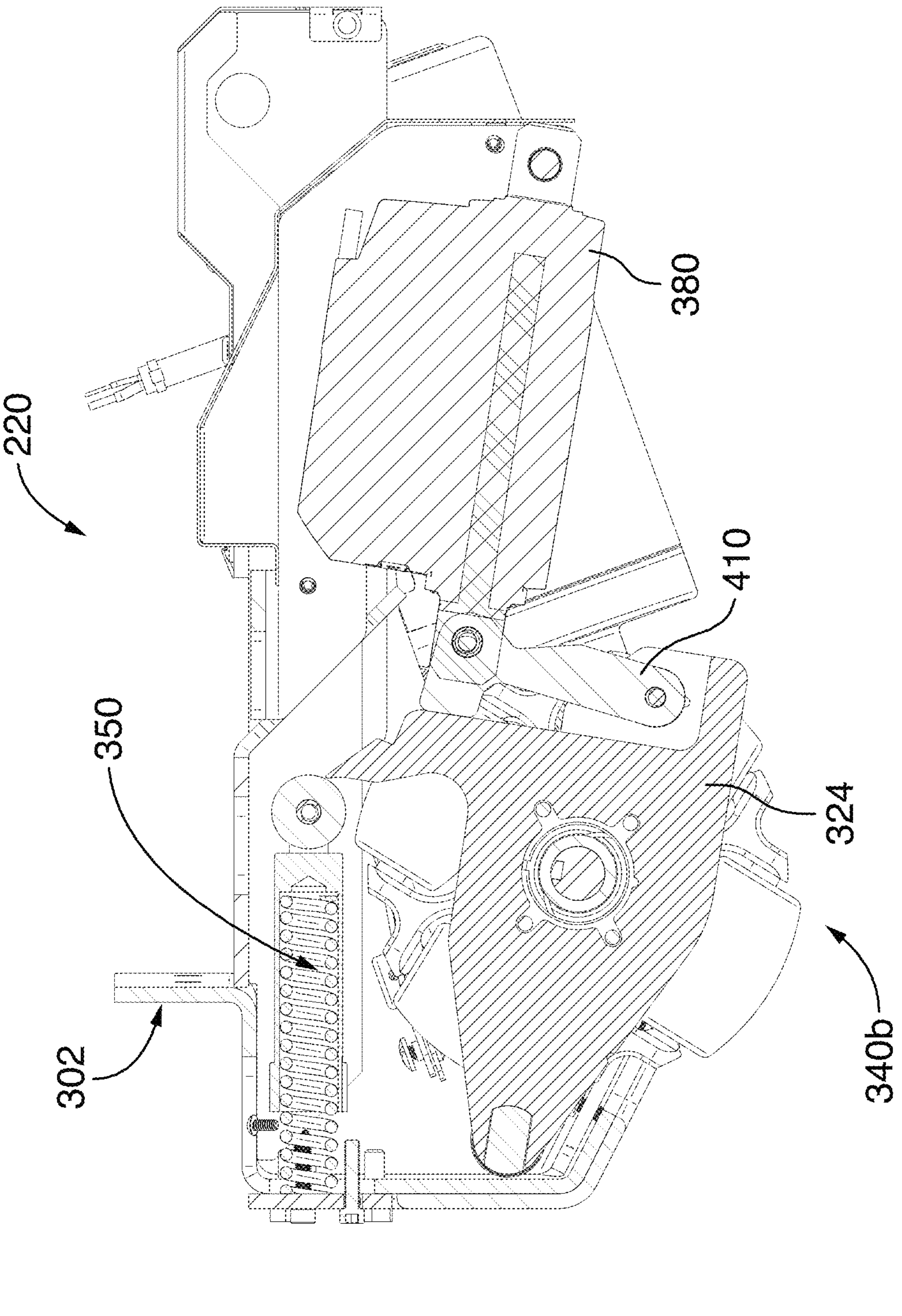
FIG. 16 is a cross-sectional left side view of the motorized wheel assembly shown in FIG. 8, with the wheel in an over-deployed position due to the presence of a ground depression (not shown) under the wheel.

FIG. 16 shows the wheel 340*b* (and incidentally the wheel 340*a* as well—not shown) over-deployed due to the presence of a ground depression (not shown) under the wheel. In this case, the spring assembly 350 urges the pivoting arm 324 in the first direction 342 until the wheel 340 has been over deployed to regain contact with the ground, or until the pivoting arm 324 has reached an abutting position, as described above. Since the pivoting arm 324 has been slightly pivoted, the longitudinal direction of the linear actuator 380 has also been slightly changed, supported by the supporting arm 410. The skilled addressee will appreciate that even when the wheel 340 is over deployed, the distal end 386 of the elongated rod 384 of the linear actuator 380 may still extends at a distance of the projecting member 370.

The skilled addressee will appreciate that this floating mounting arrangement of the linear actuator 380 is of great advantage since it enables to prevent repeated shocks to the elongated rod 384 of the linear actuator 380, which could occur due to floor discontinuities and obstacles.

In another embodiment, the wheel assembly 220 may be motorized to further ease operation of the bed onto which it is mounted, as detailed below. In such an embodiment, the hospital bed 200 is provided with a rechargeable battery that is recharged when the bed is plugged to AC power for operating the bed during its displacement.

Referring again to FIGS. 8 to 10, in one embodiment, the wheel assembly 220 is further provided with a motor assembly 430 operatively connected to the wheels 340*a*, 340*b* (or to a single wheel 340*a* or 340*b*) for driving the wheels 340*a*, 340*b* along the floor when extending in the first deployed position. In the illustrated embodiment, the motor assembly 430 has an electrically actuated motor 432 mounted perpendicularly to the axle of the wheel 340 with corresponding transmission element 434, such as a gear box, as known in the art. In an alternative embodiment, the motor assembly could be coaxial to the wheels 340*a*, 340*b*. In a further embodiment, a motor wheel may be used in place of the wheels 340*a*, 340*b* and motor assembly 430, to provide a more compact assembly.

In a further embodiment, the motor assembly 430 may be provided with a manual lever 460. In embodiments, the manual lever 460 may be provided as one longitudinal member.

In another embodiment, the manual lever 460 may comprise two longitudinal spaced apart members 461, 462 at a first end and rigidly joined together by a transverse member 463 at a second end. The manual lever 460 that may be manually operated by a user to manually disengage the transmission element 434, such as a gear box from the electrically actuated motor 432. When the transmission element is disengaged, the wheels 340*a*, 340*b* are not coupled to the motor assembly 430 and is therefore not prevented from rotating under user force. This may ease operation of the bed 200 in the case the wheels 340*a*, 340*b* can not be powered or retracted due to a battery issue.

The skilled addressee will appreciate that in embodiments, where the wheel assembly 220 is provided with a motor assembly 430 operatively connected to the wheels 340*a*, 340*b* for driving them along the floor, present a great advantage over the prior art given as the ease of operability of such configuration, which also represents low cost maintenance.

In the illustrated embodiment, the motor assembly 430 is pivotally mounted to the fixed portion 300, for example through a mounting bracket 440, as better shown in FIG. 10. The mounting bracket 440 has two longitudinal spaced apart members 442, 444 secured at a first end to the mounting plate 302 of the fixed portion 300 and rigidly joined together with a transverse member 446. The second ends 448 (not shown), 450 of the longitudinal members 442, 444 are each respectively provided with a mounting portion 452 (not shown), 454 for pivotally mounting the motor assembly 430 thereto. As it should be apparent, such a mounting arrangement enables pivotal movement of the motor assembly 430 with respect to the fixed portion 300 when required, typically due to floor discontinuities.

In a further embodiment, the wheel assembly 220 is further provided with a control device (not shown) for driving the motor 432 in response to an operator request, as it will become more apparent upon reading of the following description.

In a further embodiment, the control device is further adapted to selectively move the linear actuator 380 between the retracted position and the extended position to thereby move the wheel 340 between the first deployed position and the second retracted position, as further detailed below. Alternatively, a lever actuatable by foot or hand may be provided to enable an operator to manually raise and lower the wheel 340.

While in the described embodiment the wheel assembly 220 has been described in connection with a motor assembly 430, it will be understood that such a motor assembly 430 is not required. For instance, the wheel assembly 220 previously described may be used as a supplemental non-motorized wheel easing operation of the bed 200 onto which it is mounted, as mentioned above.

It should also be appreciated that the wheel assembly 220 previously described may be mounted on various types of existing hospital beds such the ones illustrated in FIG. 1 and in FIGS. 2 to 7 as a non-limitative examples, or on other types of patient support apparatuses.

The skilled addressee will appreciate that the wheel assembly 220 as described in detail above and the interaction with the floating mounting arrangement of the linear actuator 380 is of great advantage over the prior art since it enables the wheel assembly 220 operability at any given high of the bed 200. Again, the killed addressee will appreciate that positioning the wheel assembly 220 at the proximate foot end or at the head end may advantageously free space under the bed 200, either in a raised or lowered configuration, to securely stow a night table or other medical equipment or systems used for bariatric care under the bed 200.

Referring now to FIGS. 2 and 3 and 17 to 21, an additional wheel assembly 500 according to another embodiment of will now be described. This wheel assembly 500 may be used alone, as an additional wheel (or fifth wheel in a four wheel support apparatus) enabling to improve maneuverability of the patient support apparatus to which it is mounted, as it will become apparent below, or may also be used in combination with the wheel assembly 220 of the first aspect detailed above, as it will also become apparent below.

FIGS. 2 and 3 show a wheel assembly 500 mounted to the base 206 of the patient support apparatus 200 provided with a plurality of casters 250, such a hospital bed for example. In the illustrated embodiment, the wheel assembly 500 is secured to the base 206 with bolts and is substantially positioned on the longitudinal axis of the bed 200, substantially centrally to the bed 200.

The wheel assembly 500 has a supporting structure 502 that is securable to the base 206, and comprises an actuating device 522 mounted to the supporting structure 502, as it will become apparent below.

In one embodiment, the supporting structure 502 has a mounting plate 504 (better shown in FIG. 17) that can be secured to one of the transversal base members of the base 206 previously described, for example an intermediate transversal base member.

Figure 17:
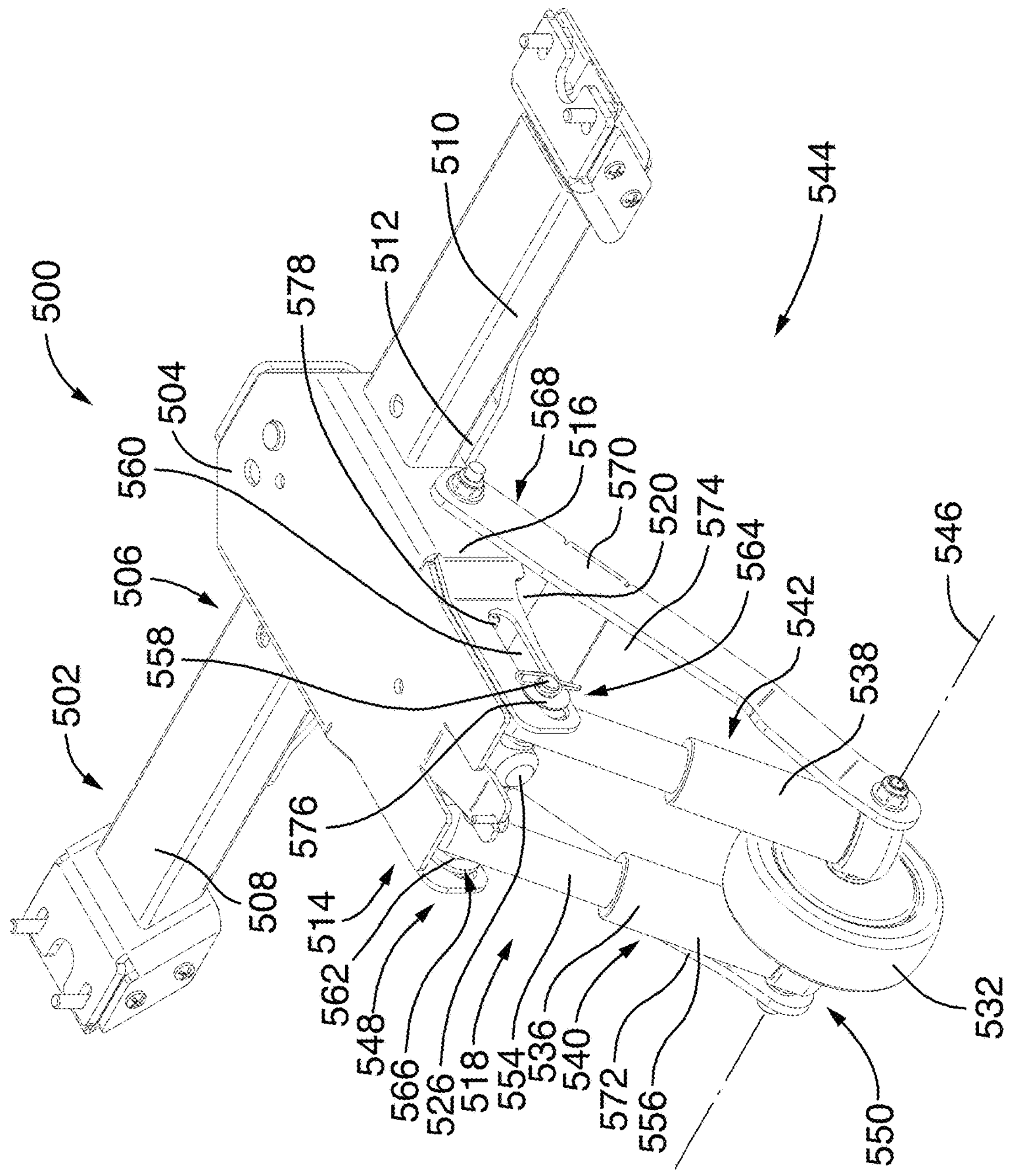
FIG. 17 is a top right perspective view of a wheel assembly for a patient support apparatus, in accordance with one embodiment.

In another embodiment, as better shown in FIG. 17, the supporting structure 502 is provided with an elongated transverse member 506 securable to the longitudinal base members 240, 242 therealong and therebetween and the mounting plate 504. The elongated transverse member 506 has a first and a second elongated bars 508, 510 extending coaxially from either side of the mounting plate 504 to which they are secured. A reinforcement bar 512 is secured to each of the first and a second elongated bars 508, 510, for example below the mounting plate 504, to reinforce rigidity of the assembly. Various other arrangements may be considered. For example, the wheel assembly 500 may alternatively be secured to the foot transversal base member 244 or the head transversal base member 246. The wheel assembly 500 may also be mounted offset from the longitudinal axis of the bed 200 or even along one of the longitudinal base members 240, 242. A bolts arrangement is used to secured the mounting plate 504, the first and a second elongated bars 508, 510 and the reinforcement bar 512 together and to the base 206. Other techniques such as welding or any other means for firmly securing the wheel assembly 500 to the base 206 may be considered but bolts arrangements may be preferred to ease eventual maintenance of the wheel assembly 500.

As better illustrated in FIG. 17, in one embodiment, the supporting structure 502 is further provided with two spaced apart flanges 514, 516 extending downwardly from the mounting plate 504 and defining a compartment 518 therebetween. A bottom panel 520 may also be mounted with the flanges 514, 516 for protecting elements mounted inside the compartment 518 from inadvertent shocks that may occur, as it will become apparent below. Various arrangements may be considered for the supporting structure 502, as it should be apparent to the skilled addressee.

Figure 18:
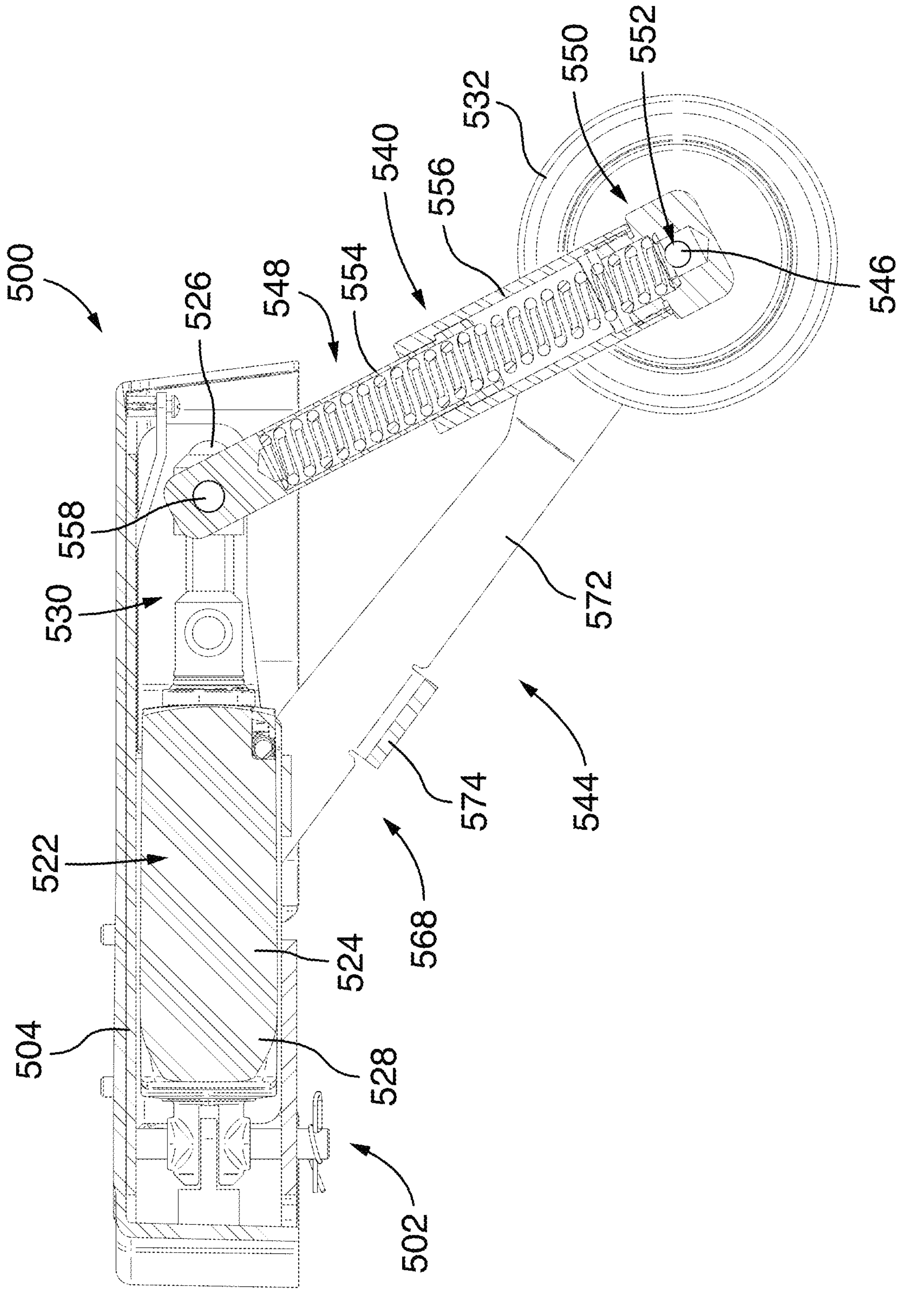
FIG. 18 is a cross-sectional left side view of the wheel assembly shown in FIG. 17, with the wheel in a deployed position.
Figure 19:
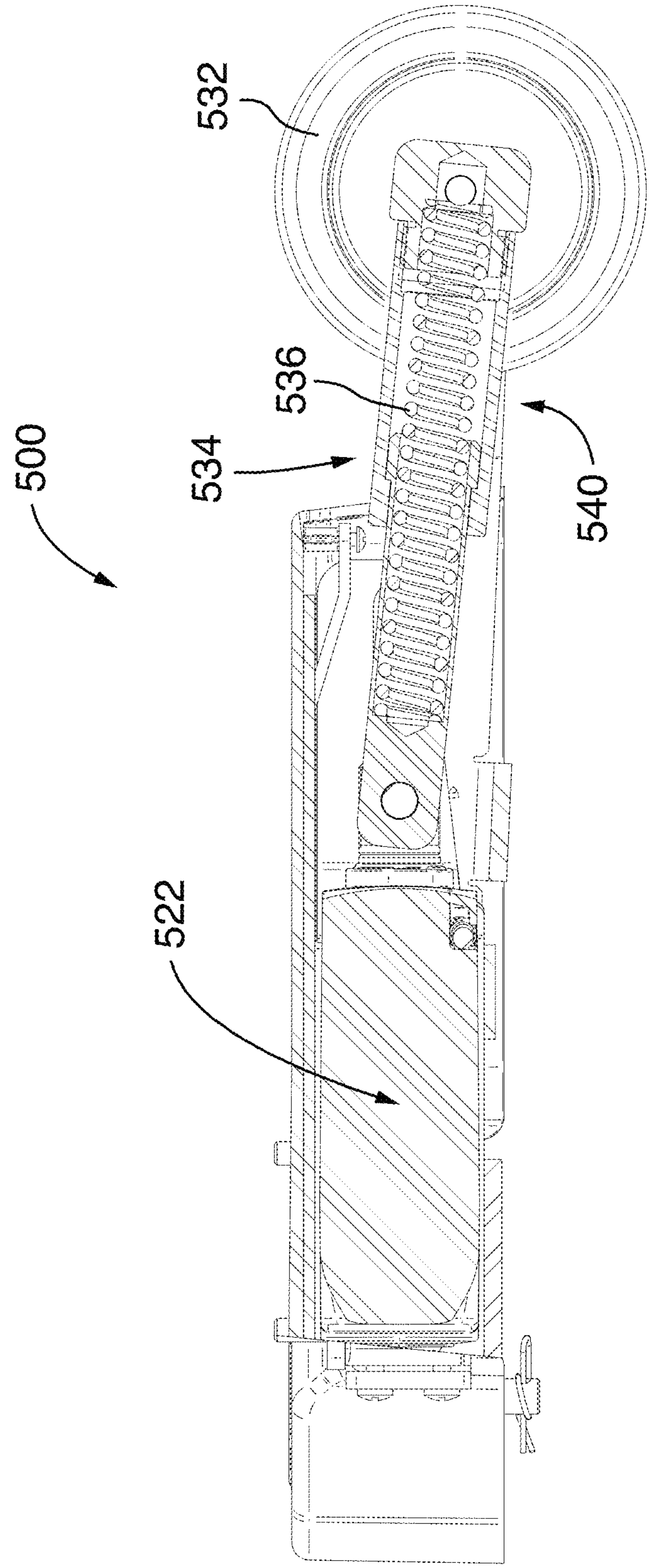
FIG. 19 is a cross-sectional left side view of the wheel assembly shown in FIG. 17, with the wheel in a retracted position.

Referring now to FIGS. 17 to 19, the wheel assembly 500 has an actuating device 522 mounted to the supporting structure 502. In this illustrated embodiment, the actuating device 522 is secured to the mounting plate 504, inside the compartment 518 defined between the flanges 514, 516. As better shown in FIG. 18, in one embodiment, the actuating device 522 has a linear actuator 524 provided with a distal end 526 and is mounted substantially horizontally. The linear actuator 524 has a body 528 secured to the supporting structure 502 and an elongated rod 530 extending substantially horizontally, parallelly to the longitudinal axis of the patient support apparatus 200. The linear actuator 524 is actuatable between a retracted position and an extended position, as detailed below. In one embodiment, the linear actuator 524 is electrically actuated.

The wheel assembly 500 also has a wheel 532 operatively connected to the distal end 526 of the linear actuator 524, as detailed thereinafter. The wheel 532 is movable between a first deployed position when the linear actuator 524 extends in the extended position, as shown in FIG. 18, and a second raised or retracted position when the linear actuator 524 extends in the retracted position, as shown in FIG. 19. When the wheel assembly 500 is connected to the base 206 of the patient support apparatus 200, the first deployed position of the wheel 532 is in contact with the floor and the second retracted position is spaced apart or away from the floor.

In the illustrated embodiment, the wheel 532 is a conventional wheel but other types of wheels could be used for a specific application to improve maneuverability of the bed. For example, an omnidirectional wheel or a mecanum wheel may alternatively be used. Two wheels coaxially mounted could also be used.

The wheel assembly 500 is provided with a spring assembly 534 (shown in FIG. 19) operatively mounted between the supporting structure 502 and the wheel 532 for urging the wheel 532 in the first deployed position. In one embodiment, the spring assembly 534 is provided with at least one linear compression spring mounted in a telescopic tubing.

In a further embodiment described below, the spring assembly 534 has a first and a second linear compression springs 536, 538, each being mounted in a respective telescoping tubing 540, 542.

Still referring to FIGS. 17 to 19, in accordance with one embodiment, the wheel assembly 500 is further provided with an intermediate connecting structure 544 pivotally mounted between an axle 546 of the wheel 532 and the supporting structure 502 for operatively connecting the wheel 532 to the supporting structure 502 and to the distal end 526 of the linear actuator 524. The intermediate connecting structure 544 enables to mount the first and the second linear compression springs 536, 538, on either side of the wheel 532. The intermediate connecting structure 544 includes a first mounting arrangement 548 for mounting a first end of each of the first and second linear compression springs 536, 538 to the supporting structure 502 and a second mounting arrangement 550 for mounting a second opposed end of each of the first and second linear compression springs 536, 538 to the axle 546 of the wheel 532.

In the illustrated embodiment, the second mounting arrangement 550 has an elongated pin 552 mounted through the axle 546 of the wheel 532 and protruding on either side thereof. The elongated pin 552 is mounted to enable rotation of the wheel 532 therearound. The first and the second telescoping tubings 540, 542 associated with a respective one of the first and second linear compression springs 536, 538 are pivotally attached thereto through their respective first ends. Each of the first and second telescoping tubings 540, 542 are provided with an upper tube 554 and a lower tube 556 adapted to slide in each other to thereby allows a change in the overall length of the corresponding telescoping tubings 540, 542, as it will become apparent below. The first mounting arrangement 548 has an elongated transverse pin 558 mounted through the distal end 526 of the elongated rod 530 of the linear actuator 524 and protruding on either side thereof. In the illustrated embodiment, the elongated transverse pin 558 extends perpendicularly to the elongated rod 530, in the horizontal plane. The first and second telescoping tubings 540, 542 are respectively attached to the elongated transverse pin 558 through their respective second ends, on either side of the distal end 526 of the linear actuator 524. The first mounting arrangement 548 is also provided with a first and a second elongated slot 560, 562 provided on a respective one of the flanges 514, 516 defining the compartment 518 in which the linear actuator 524 is mounted. In one embodiment, the first and second elongated slots 560, 562 are parallel to each other in a facing relationship. The first and second elongated slots 560, 562 also extend in the longitudinal direction of the elongated rod 530 of the linear actuator 524.

As better shown in FIG. 17, the elongated transverse pin 558 of the first mounting arrangement 548 protrudes outwardly from the first and second elongated slots 560, 562 and is slidably retained therein with corresponding clips 564, 566 or other attaching means. When the elongated rod 530 of the linear actuator 524 is extended or retracted, the elongated transverse pin 558 slidably travels along the first and second slots 560, 562.

Still referring to FIGS. 17 and 18, the intermediate connecting structure 544 is further provided with a linking device 568 pivotally attached between the elongated pin 552 extending through the wheel 532 and the supporting structure 502. In the illustrated embodiment, the linking device 568 has a first and a second elongated rigid links 570, 572 parallel to each other, each being attached between a corresponding side of the wheel 532 and a corresponding side of the compartment 518. The linking device 568 may also have a transverse member 574 secured between the first and second elongated rigid links 570, 572 to provide more rigidity to the arrangement.

As it should now be apparent, when the linear actuator 524 is in the extended position as illustrated in FIGS. 17 and 18, the elongated transverse pin 558 mounted to the distal end 526 of the elongated rod 530 of the linear actuator 524 extends at a distal end 576 of the first and second elongated slots 560, 562. The spring assembly 534 urges the wheel 532 outwards and downwards while the wheel 532 is retained to the supporting structure 502 with the pivoting linking device 568. With this arrangement, the wheel 532 is urged downwardly on the floor with the linear compression springs 536, 538, even in the presence of discontinuities in the floor such as bumps or depressions.

When the linear actuator 524 is retracted in the retracted position, the retraction of the distal end 526 of the elongated rod 530 of the linear actuator 524 slidably drives the associated transverse pin 558 in the first and second elongated slots 560, 562, towards an end 578 opposed to the distal end 576 thereof, as illustrated in FIG. 19. The first and second elongated rigid links 570, 572 are also pivoted upwardly to a substantially horizontal position, which drives the wheel 532 upwardly, out of contact with the floor. In this position, the first and second linear compressions springs 536, 538 extend in an uncompressed state.

Figure 20:
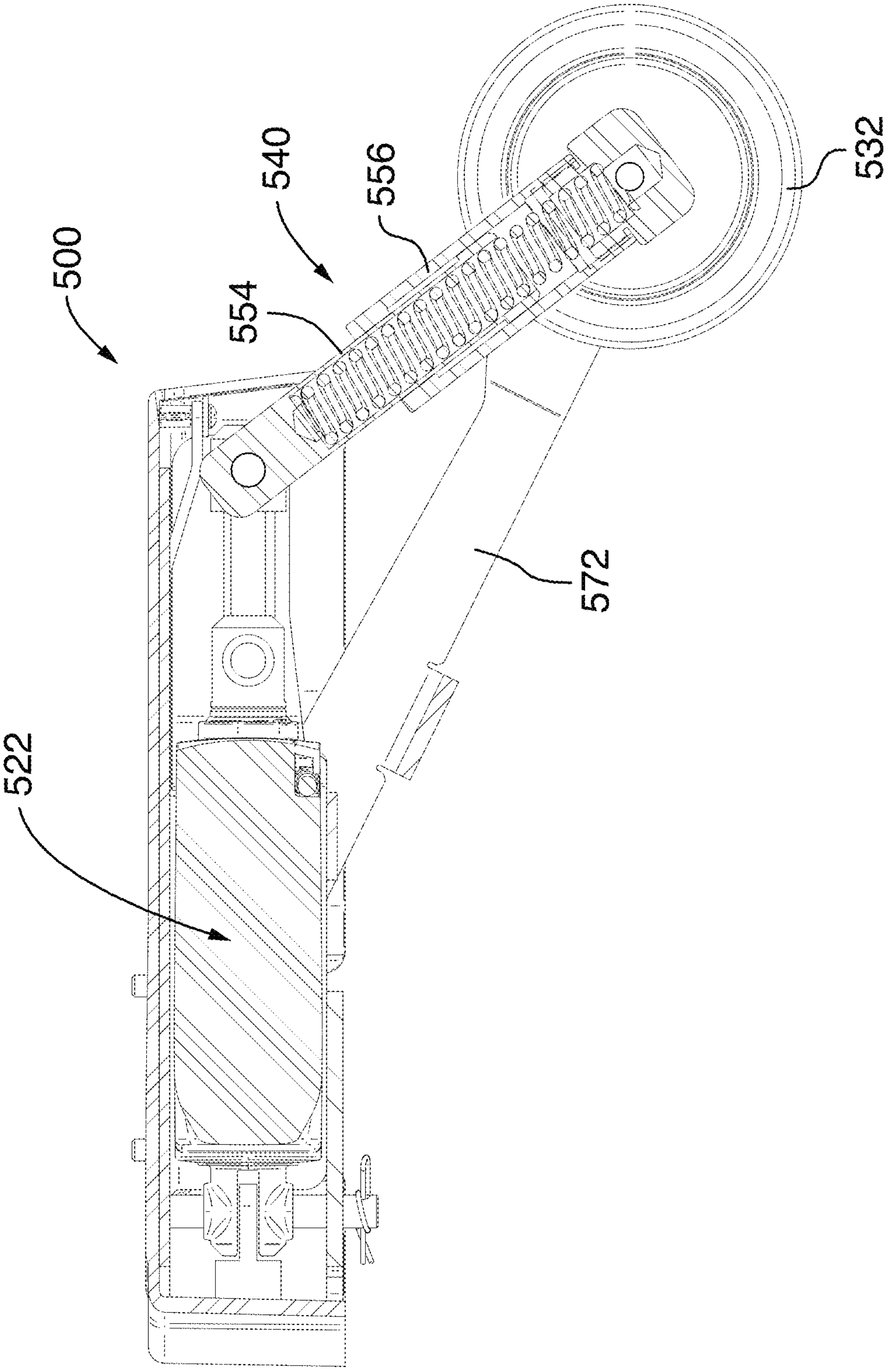
FIG. 20 is a cross-sectional left side view of the wheel assembly shown in FIG. 17, with the wheel in a partially retracted position due to the presence of a ground obstacle (not shown) under the wheel.

FIG. 20 illustrates the wheel assembly 500 when the wheel 532 extends in the first deployed position and when there is a bump or obstacle under the wheel 532. As illustrated, the first and second elongated rigid links 570, 572 enable to keep the wheel 532 in contact with the floor (not shown) while the first and second linear compression springs 536, 538 are more compressed inside their corresponding telescopic tubings 540, 542. As illustrated, the upper tube 554 and the lower tube 556 of each telescoping tubing 540, 542 are more retracted in each other and define a shorter length than a nominal length where there is no obstacle under the wheel 532 (shown in FIG. 18).

Figure 21:
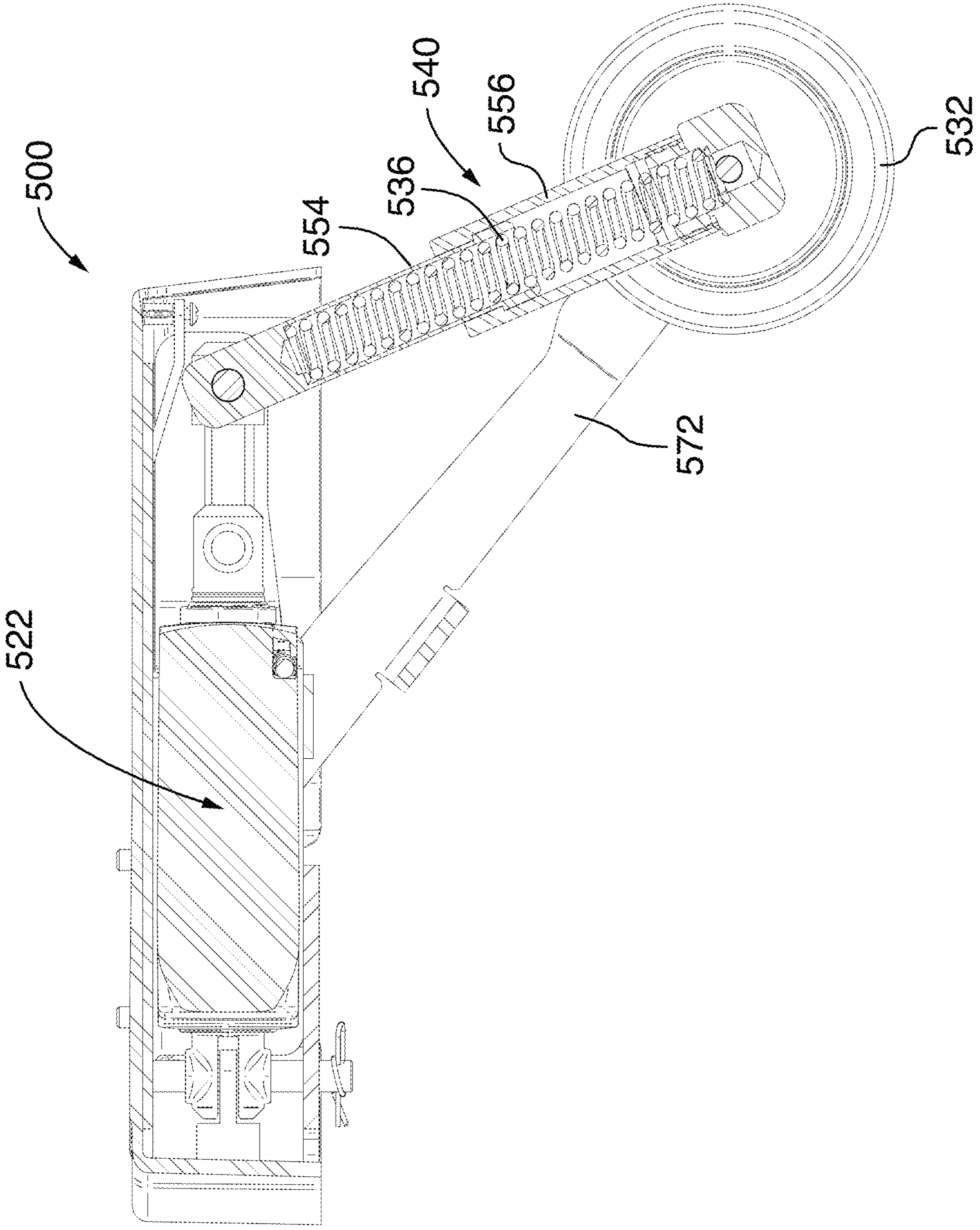
FIG. 21 is a cross-sectional left side view of the wheel assembly shown in FIG. 17, with the wheel in an over-deployed position due to the presence a ground depression (not shown) under the wheel.

FIG. 21 illustrates the wheel assembly 500 when the wheel 532 extends in the first deployed position and when there is a depression or hole under the wheel 532. As illustrated, the first and second elongated rigid links 570, 572 pivot downwardly and enable to keep the wheel 532 in contact with the floor while the first and second linear compression springs 536, 538 are less compressed inside their corresponding telescopic tubings 540, 542.

In an alternative embodiment (not illustrated), the linear actuator 524 of the actuating device 522 may be replaced by a cable arrangement having a retracted position and a released position, and operating substantially similarly to the linear actuator 524 described above. For example, the cable may have a distal end directly operatively connected to the axle 546 of the wheel 532 while being mounted on a pulley located above the wheel 532, to thereby pull substantially vertically on the wheel 532 against the action of the spring assembly 534.

In a further embodiment, the wheel assembly 500 is further provided with a control device (not shown) operatively connected to the actuating device 522, the control device being actuatable by an operator for selectively moving the actuating device 522 between the retracted position and the extended position to thereby move the wheel 532 between the first deployed position and the second retracted position, as it will more detailed below.

While the previously described additional wheel assembly 500 is mainly devised, in one embodiment, to be used as a non-motorized wheel, the skilled addressee will appreciate that it can also be envisaged to provide propelling means for driving the wheel 532. In this case, a motor assembly may conveniently be operatively connected to the wheel 532, for example through a mounting bracket attached to the supporting structure 502. A motor wheel may also be considered to propel the wheel assembly 500.

It should now be appreciated that the wheel assembly 500 previously described may be mounted on various types of existing hospital beds such the one illustrated in FIG. 1 as a non-limitative example, or other types of patient support apparatuses.

Accordingly, in a further embodiment, referring again to FIGS. 2 and 3, there is shown a hospital bed 200 including a frame 260, a base 206 having a plurality of casters 250 for supporting the frame 260 on the floor and an additional wheel assembly 500 connected to the base 206, as described above with reference to FIGS. 17 to 21. The wheel assembly 500 has a supporting structure 502 secured to the base 206. The wheel assembly 500 also has an actuating device 522 mounted to the supporting structure 502 and having a distal end 526, the actuating device 522 being actuatable between a retracted position and an extended position, as better shown in FIGS. 18 and 19. The wheel assembly 500 also has a wheel 532 operatively connected to the distal end 526 of the actuating device 522, the wheel 532 being movable between a first deployed position in contact with the floor when the actuating device 522 extends in the extending position, and a second raised or retracted position spaced apart from the floor when the actuating device 522 extends in the retracted position. The wheel assembly 500 is further provided with a spring assembly 534 operatively mounted between the supporting structure 502 and the wheel 532 for urging the wheel 532 in the first deployed position. The wheel assembly 500 further has a control device (not shown) operatively connected to the actuating device 522, the control device being actuatable by an operator for selectively moving the actuating device 522 between the retracted position and the extended position to thereby move the wheel 532 between the first deployed position and the second retracted position.

The skilled addressee will appreciate that having the wheel assembly 500 in the center of the hospital bed 200 or other patient support apparatus has a great advantage over the prior art beds, as it may function as a pivotal point and its operation may facilitate turning the hospital 360 degrees and perform maneuvers in restraint spaces. Such positioning of the wheel assembly 500 also improves maneuverability of the hospital bed.

Figure 32A:
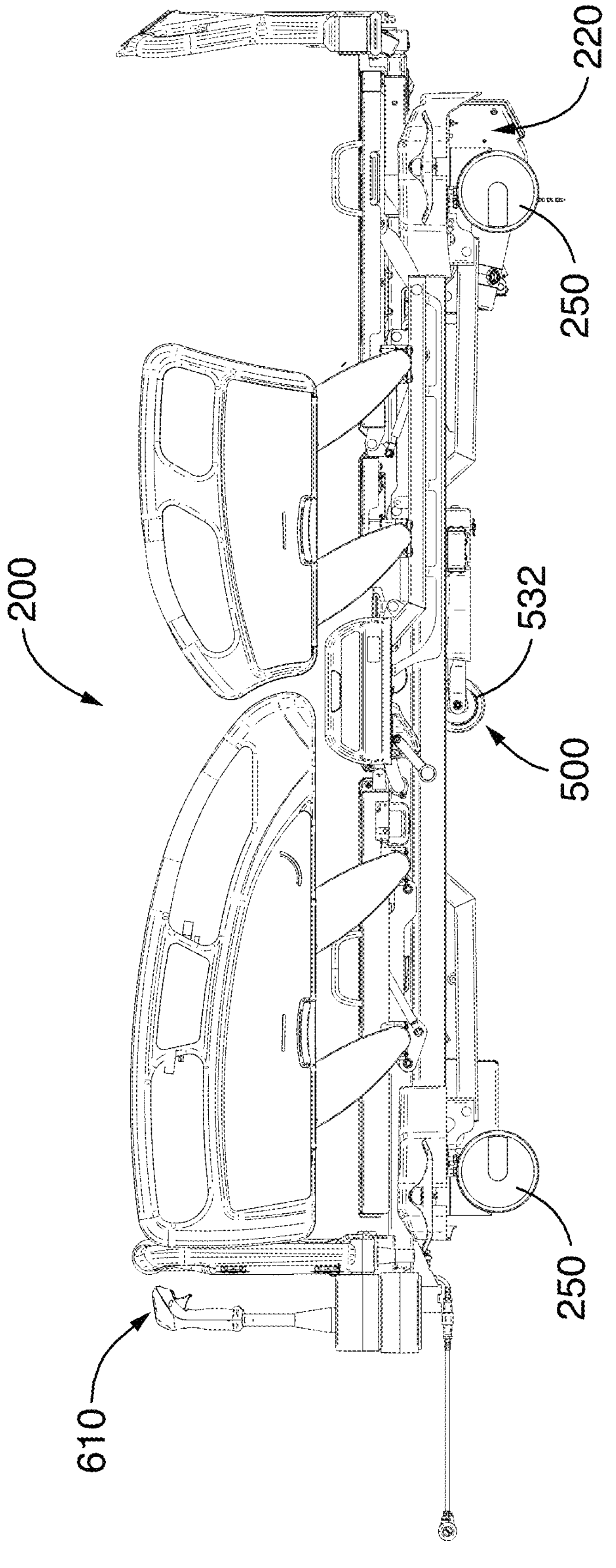
FIG. 32A is a side perspective view of a hospital bed in a lowered configuration, showing the wheel assembly for a patient support apparatus, wherein enough clearance is provided for stowing a night table under the hospital bed, in accordance with one embodiment.
Figure 32B:
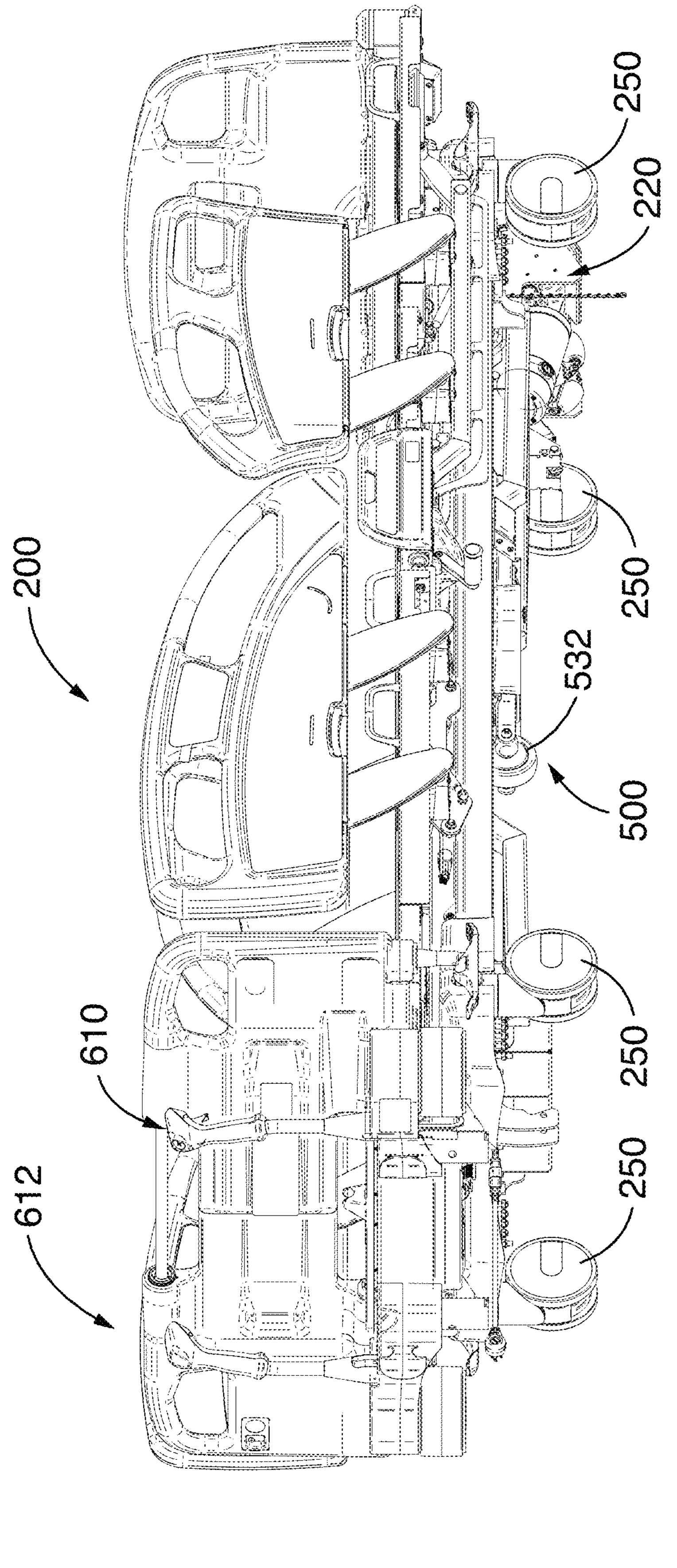
FIG. 32B is a side-front perspective view of the hospital bed shown in FIG. 32A.

Additionally, the wheel assembly 500 is operable in either in a raised or lowered configuration of the hospital bed 200, while advantageously allows for free space under the bed 200 to securely stow a night table or other medical equipment, even when even when the hospital bed 200 is lowered to its lowermost position, as better seen in FIGS. 3, 32A and 32B.

According to yet another embodiment and referring back to FIGS. 2 and 3, the hospital bed 200 may be provided with a wheel assembly 220 and an additional wheel assembly 500. The wheel assembly 220 is motorized and mounted at the foot end 204 while the wheel assembly 500 is non-motorized and mounted between the foot end 204 and the head end 202, substantially on the longitudinal axis of the bed 200.

The skilled addressee would appreciate that a hospital bed 200 or other patient support may be provided by a combination of one or more wheel assemblies 220 (motorized or non-motorized) as described in detail above and a wheel assembly 500, as better seen in FIGS. 3, 32A and 32B.

As mentioned above, a control device may be used to operate the wheel assembly 220 or the wheel assembly 500. In the case both the wheel assembly 220 and the wheel assembly 500 are mounted on the bed 200, a single control device may be used. Alternatively, two distinct control devices may be considered to provide independent control. Furthermore, for both the wheel assembly 220 and the wheel assembly 500, it may be considered to provide an automatic control or a manual control such as a handle or a pedal to raise and deploy the wheel 340 of the wheel assembly 220 and the wheel 532 of the wheel assembly 500 upon a request from an operator. A control button provided on a control interface may also be provided for raising and lowering the wheels.

The control device may also be provided in a touchscreen, in a handle of the hospital bed or it may be mounted in the frame or chassis of the hospital bed.

Referring again to FIGS. 2 and 3, an exemplary control device using a foot actuated lever for raising and lowering the wheels will now be described. The bed 200 is further provided with a braking system 580 for braking the casters 250. Various mechanisms could be used. In the illustrated embodiment, each of the four casters 250 is provided with a foot actuatable lever 582 that can be set in a release or free position where the corresponding caster 250 is free to rotate both in the longitudinal direction of the bed 200 and vertically for direction purposes, or a brake position where at least one of the casters 250 is prevented from rotating. Each of the foot actuatable levers 582 may be operated independently. In one embodiment, the operation of a single one of the foot actuatable levers 582 controls the position of all of the foot actuatable levers 582.

In yet another embodiment, each of the foot actuated levers 582 may further have a third drive or steer position. In this steer position, each of the casters 250 is unbraked and free to rotate in the longitudinal direction of the bed 200, while being prevented from freely rotating around its vertical axis. When the lever 582 is operated in this steer position, the wheel 340 of the wheel assembly 220 and the wheel 532 of the wheel assembly 500 are driven in the lowered deployed position to be ready for use, as further detailed below. In an alternative embodiment, the wheel 340 of the wheel assembly 220 and the wheel 532 of the wheel assembly 500 are controllably driven in the lowered deployed position when the casters 250 are not in the brake position. The three-position operation may however be preferred since it may ease manipulation of the hospital bed 200 for manually adjusting displacement inside a room in the release position without the wheel 340 of the wheel assembly 220 and the wheel 532 of the wheel assembly 500 deployed on the floor. In one embodiment, once the hospital bed 200 has been propelled to its final location, the caregiver or operator can use the release or the brake position and the wheel 340 of the wheel assembly 220 and the wheel 532 of the wheel assembly 500 will be placed in their respective retracted position. As it should become apparent, in one embodiment, the motor 432 driving the wheel 340 of the wheel assembly 220 may only be operated when the wheel 340 is deployed on the floor and the brake system 580 is not in the brake position. Furthermore, the motor 432 driving the wheel 340 of the wheel assembly 220 may also be prevented from operating by the controller when the hospital bed 200 is connected to an electrical plug.

Figure 22:
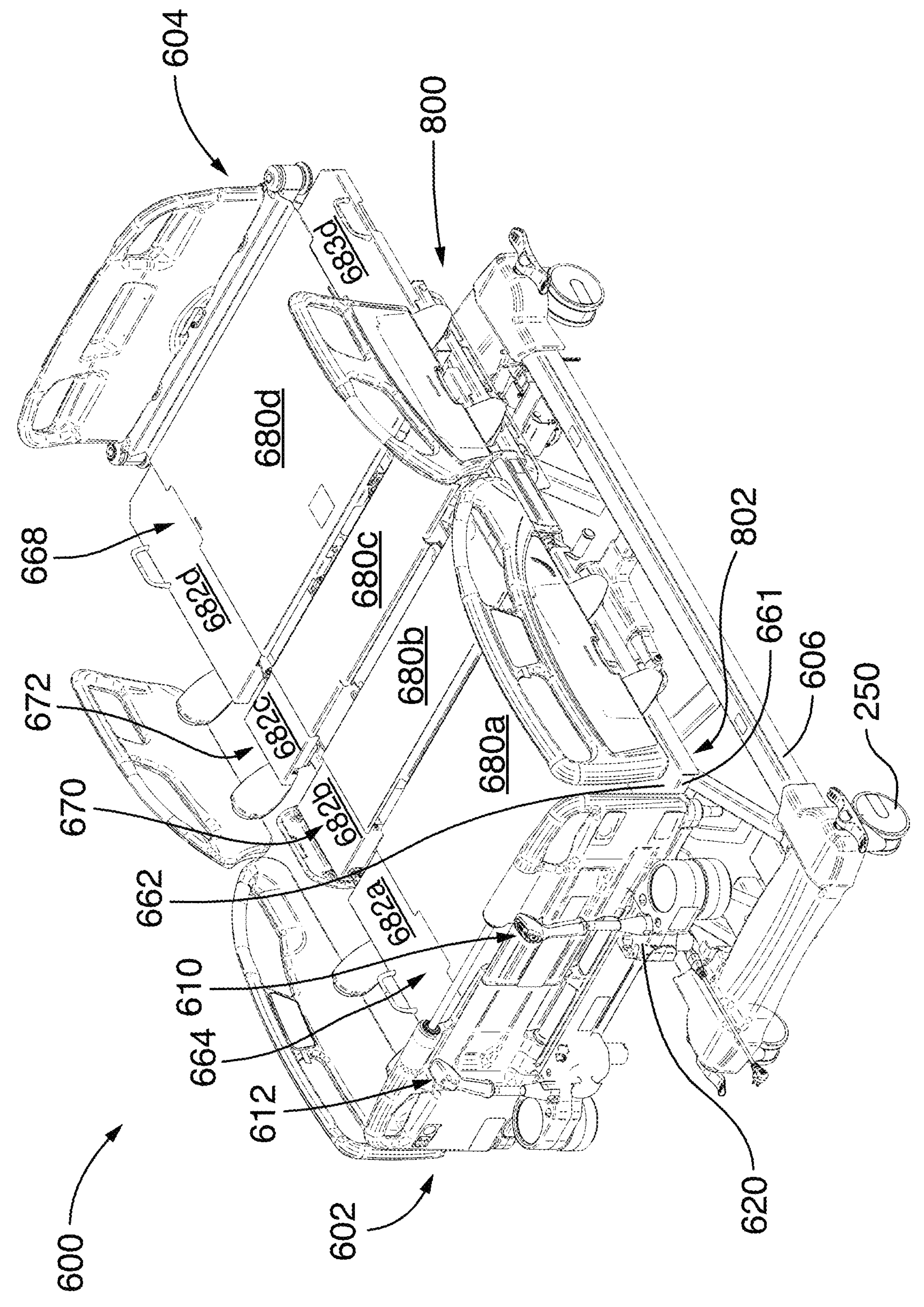
FIG. 22 is a top right perspective a hospital bed provided with control handles, in accordance with one embodiment, the control handles being in a deployed operative position.
Figure 23:
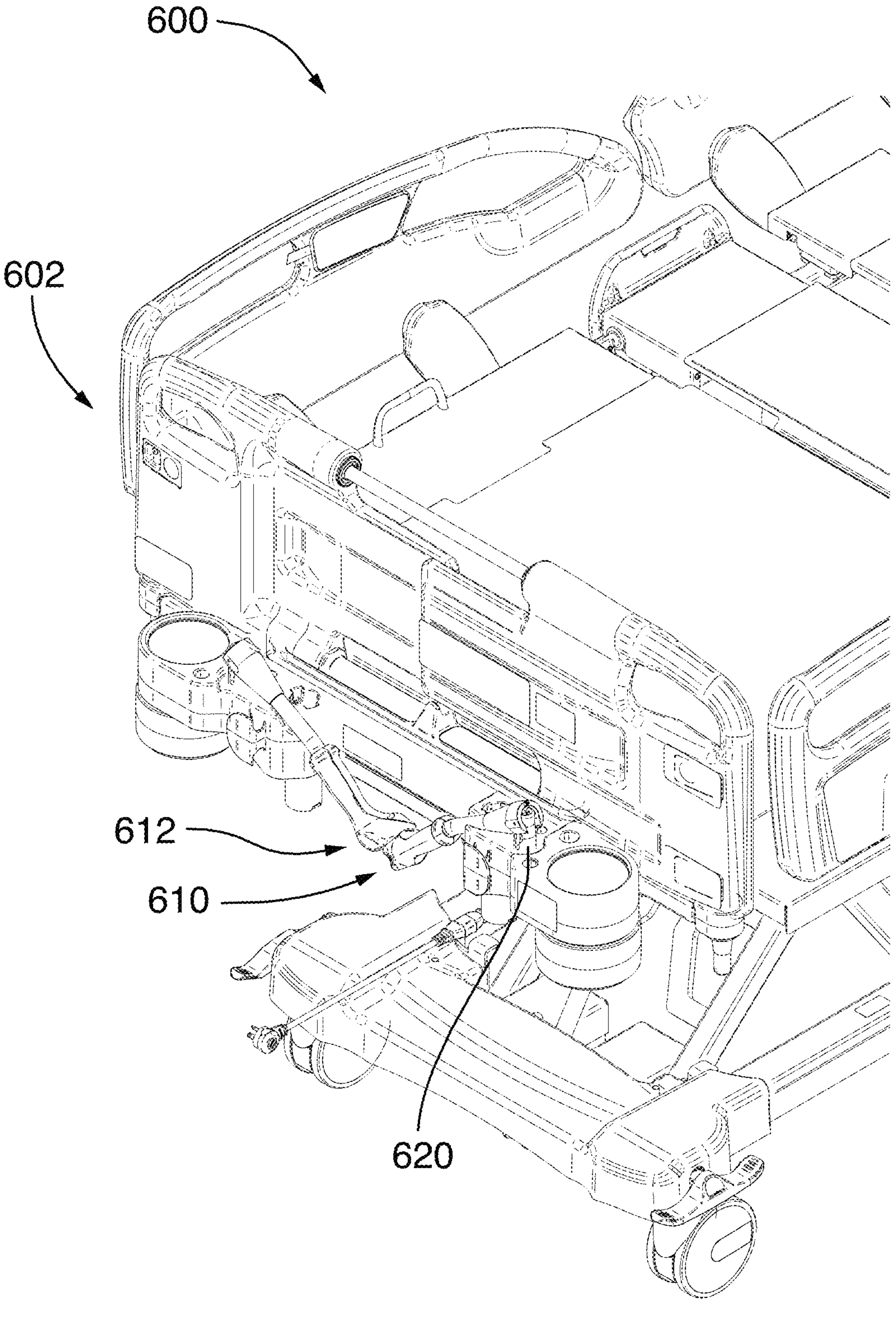
FIG. 23 is a partial, top right perspective view of the hospital bed shown in FIG. 22, for better showing the head end of the hospital bed, the control handles being in a stowed inactive position.
Figure 24:
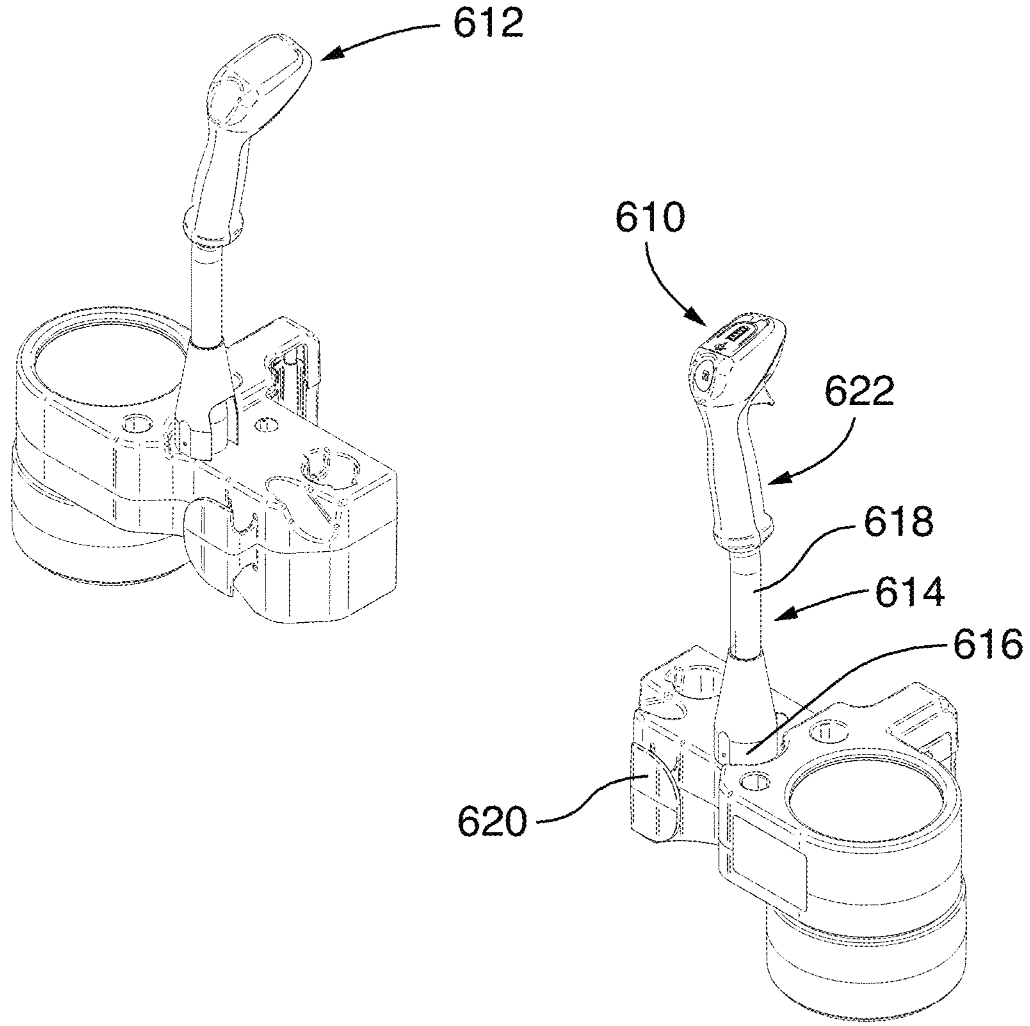
FIG. 24 is a top right perspective view of the control handles, in accordance with one embodiment.

Referring now to FIGS. 22 to 24, control handles 610, 612 for a motorized bed 600 will now be described in accordance with one embodiment. In the illustrated embodiment, the two handles 610, 612 are provided at the head end 602 of the motorized hospital bed 600, opposite the foot end 604 to which a motorized wheel assembly is mounted (e.g. motorized wheel assembly 220). Other configurations may be used. As it will be apparent below, in one embodiment, a single one of the handles 610, 612 is provided with necessary controls for ease of operation but two handles 610, 612 are nevertheless provided to help the operator to push the hospital bed 600 more conveniently. The control handle 610 has an elongated post 614 having a proximal end 616 and a distal end 618 and a connecting element 620 for connecting the proximal end 616 of the elongated post 614 to the hospital bed 600. The connecting element 620 is configured to enable moving the elongated post 614 between a substantially vertically deployed operative position, as shown in FIG. 22, and a stowed inactive position, as shown in FIG. 23. The control handle 610 also has a handle member 622 secured to the distal end 618 of the elongated post 614.

Still referring to FIG. 22, in embodiments, the motorized wheel assembly 220 may be mounted on a support apparatus 200, such as a hospital bed or a bariatric bed 600 comprising a frame 661 connected to a base 606 having a plurality of casters 250 positioned at each corner of the foot end 604 and the head end 602, a patient support surface 662, wherein the width of the patient support surface 662 is adjustable.

In the illustrated embodiment, the patient support surface 662 includes a plurality of body support panels which are distinct from each other and are adapted to be angled relative to each other. Specifically, the patient support surface 662 includes an upper body support panel or backrest 664, a lower body support panel 668, and first and second core support panels 670, 672 located between the backrest 664 and the lower body support panel 668. More specifically, a first core support panel 670 is located adjacent the backrest 664 and a second core support panel 672 is located adjacent the lower body support panel 668. Specifically, each one of the backrest 664, the lower body support panel 668 and the first and the second core support panels 670, 672 includes a central panel section 680*a*-680*d* and a pair of opposite side panel sections 682*a*-682*d* and 683*a*-683*d* (only side panel section 683*d* being numbered), which are selectively movable towards and away from the central panel sections 680*a*-680*d* to thereby respectively decrease or increase the width of the bed 600.

Alternatively, each one of the backrest 664, the lower body support panel 668 and the first and second core support panels 670, 6722 could instead include a single side panel section (e.g. the backrest 664 would include only one of side panel section 682*a* or 683*a*).

In embodiments, the side panel sections 682*a*-682*d* and 683*a*-683*d* are movably connected to the frame 661 via one or more elongated slide members (not shown) which are slidably received in a corresponding elongated sleeve (not shown) disposed transversely to the bed 600 and secured to the frame 661. In one embodiment, the slide members (not shown) may be provided with rollers (not shown) to facilitate their movement within the sleeve (not shown).

It will be appreciated that the support apparatus 200, such as a hospital bed or a bariatric bed 600 is generally similar to the bed illustrated and disclosed in International PCT Application No. PCT/IB2018/058586, the specification of which is incorporated herein by reference.

Figure 25:
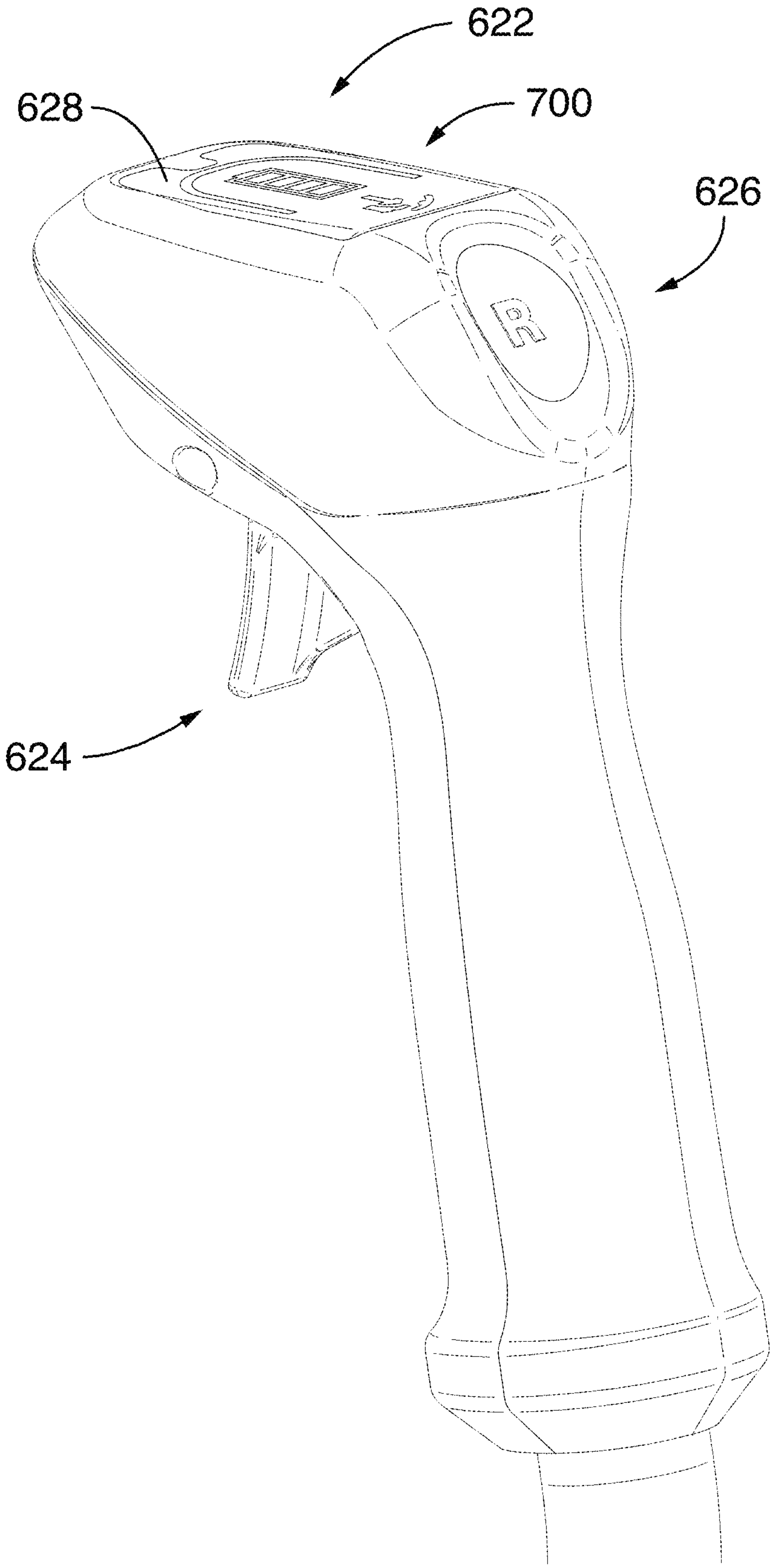
FIG. 25 is a front left perspective view of a handle member of a control handle, according to one embodiment.
Figure 26:
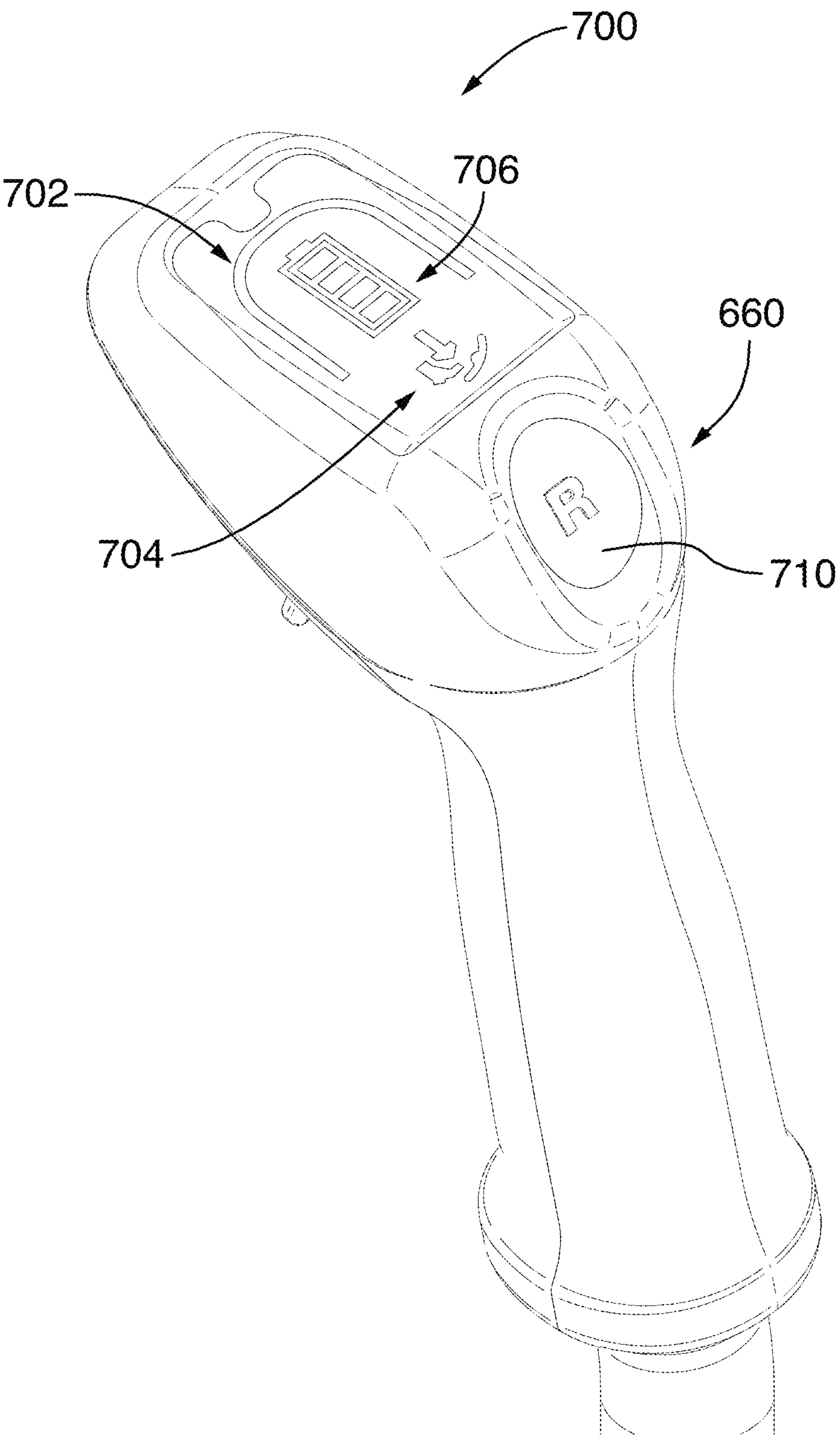
FIG. 26 is a top left perspective view of the handle member shown in FIG. 25.

Referring now to FIG. 25, the handle member 622 is provided with an actuatable trigger 624 for controlling propelling of the motorized bed 600 when the elongated post 614 extends in the deployed operative position, as described in more details below. The handle member 622 extends substantially vertically to provide an ergonomic grip to the operator which facilitate operation of the hospital bed 600. The trigger 624 is placed on the handle member 622 may be actuated with a finger, such as with the index finger, similarly to a joystick. In one embodiment, the handle members 622 of each handle 610, 612 are slightly inclined towards each other to provide a more ergonomic grip, regardless of the height of the operator of the hospital bed 600.

For example, an inclination of the handle members 622 towards each other from about 4 to 15 degrees may be preferred to obtain a more ergonomic grip. An inclination of about 11 degrees may be most preferable.

In one embodiment, the trigger 624 may be configured to provide different mechanically actuated control positions in order to facilitate the maintaining, the increasing or the reducing of the speed of the propelling bed 600. The speed changes and varies in linear fashion. The skilled addressee would appreciate that such mechanically actuated control positions and the sensibility of the trigger 624 may be programmed into the trigger, or may be adjusted by the user by calibrating the handle members 622, for instance by using a calibrating interface as better seen in FIGS. 30D and 30E. The speed may have a direct or indirect correlation to the pressure that a user exerts on the trigger 624. In a direct correlation, when pressure is applied to the trigger, the bed 600 is propelled. Excreting more pressure on the trigger may increase the speed of the propelled bed 600. Releasing the pressure on the trigger or excreting less pressure on the trigger decreases the speed of the bed 600. In an indirect correlation it would be the opposite, wherein releasing the trigger 624 may increase the speed of the bed 600.

As detailed above, the position of the wheels may be controlled through the use of a user actuatable lever. In a further embodiment, the vertically deployed operative position of the elongated post 614 may be monitored, either as a condition for the position of the wheels either for further monitoring and control. For example, a position sensor (not shown) may be mounted within the connecting element 620. In one embodiment, the controller prevents any action of the motor assembly until the elongated post 614 is not in the operative deployed position.

The handle member 622 is further provided with a user interface 700 mounted thereto, the user interface 700 being configured for providing bed information to the operator when the elongated post 614 extends in the deployed operative position, as detailed below. In one embodiment, the user interface 700 is inactivated in the stowed inactive position of the elongated post 614. In a further embodiment, the user interface 700 is provided on the uppermost portion 626 of the handle member 622, the uppermost portion 626 having an uppermost surface 628 extending in a substantially horizontal plane in order to be easily visible to the operator driving the bed 600. User interface comprises LEDs that can be on/off to provide information to the user. The user interface 700 may also be configured to communicate with a patient surveillance station (not shown) and/or sound an alarm in the case of an emergency.

In a further embodiment, two similar active handles can be provided. A switch proximate the handles, for example at the head end of the bed, may be used to select which handle is the active control handle. Only the active handle would have the LEDs turned on. The bed may be operable with only the one active handle, the other handle becoming passive.

The handle members 622 may be further provided with a backwards direction control 710 having a specific LED, such as "R", which would light up showing that backwards direction control 710 has been activated. The backwards direction control may be activated by a user by simply using the user's thumb finger. The skilled addressee would appreciate that the motorized bed 600 can easily be controlled by a user with only one hand.

Referring now to FIGS. 22 to 25, a control system 800 for a motorized bed 600 according to one embodiment will now be described. The control system 800 has a control handle 610 connected to the hospital bed 600, as previously described. The control handle 610 has a trigger 624 actuatable between a rest position and a fully actuated position. The trigger 624 further has a first predetermined position between the rest position and the fully actuated position. In one embodiment, the first predetermined position is closer to the rest position than to the fully actuated position. The control system 800 also has a controller 802 operatively connected to the control handle 610 and to the motorized wheel assembly 220 mounted on the hospital bed 600. In one embodiment, the controller 802 is mounted on the bed 600, proximate to the head end 602 of the bed 600 to which the control handle 610 is mounted. In a further embodiment, the controller 802 is embedded under the patient support surface 662 supported by the frame 661.

The controller 802 is configured to propel the hospital bed 600 when the trigger 624 may be activated between a first predetermined position and a fully activated position, the controller 802 propelling the hospital bed 600 at a variable speed according to a current position of the trigger 624, or according to mechanically actuated control positions, as mentioned above. The controller 802 is further configured for preventing propelling of the hospital bed 600 when the trigger 624 is activated below the first predetermined position, i.e. between the rest position and the first predetermined position. As it should be apparent to the skilled addressee, this configuration is advantageous to prevent the hospital bed 600 from moving in case of undesired contact with the trigger 624. Moreover, unwanted electrical noise that may affect the controller 802 may also be reduced. The first predetermined position may be defined with a mechanical arrangement or a mechanically actuated control position in the trigger 624, as detailed below, but could also be implemented by software, either preprogrammed into the controller or adjusted by the user by interacting with the user interface.

Figure 27:
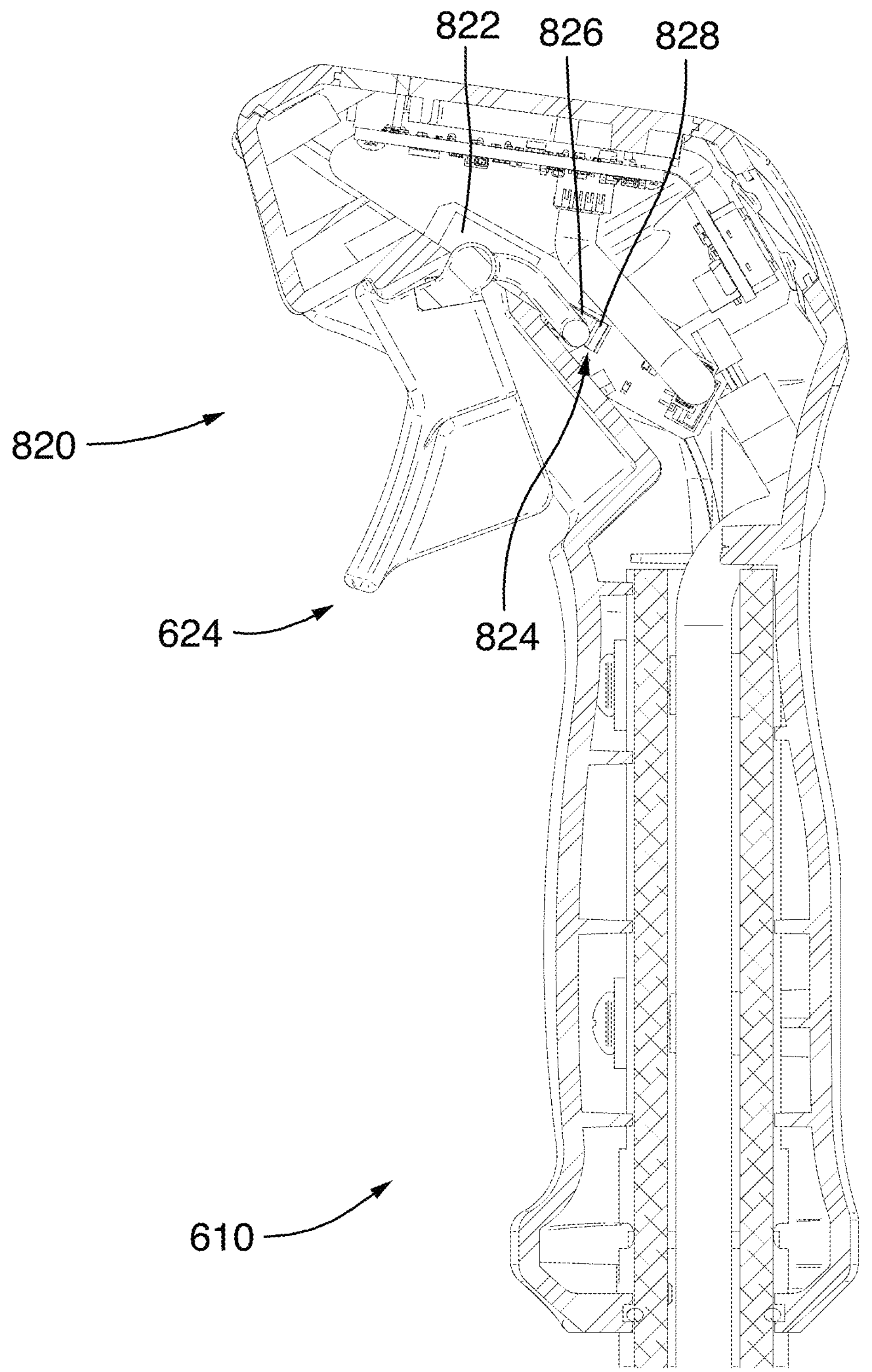
FIG. 27 is a cross-sectional side view of a top portion of the handle member shown in FIG. 25.
Figure 28:
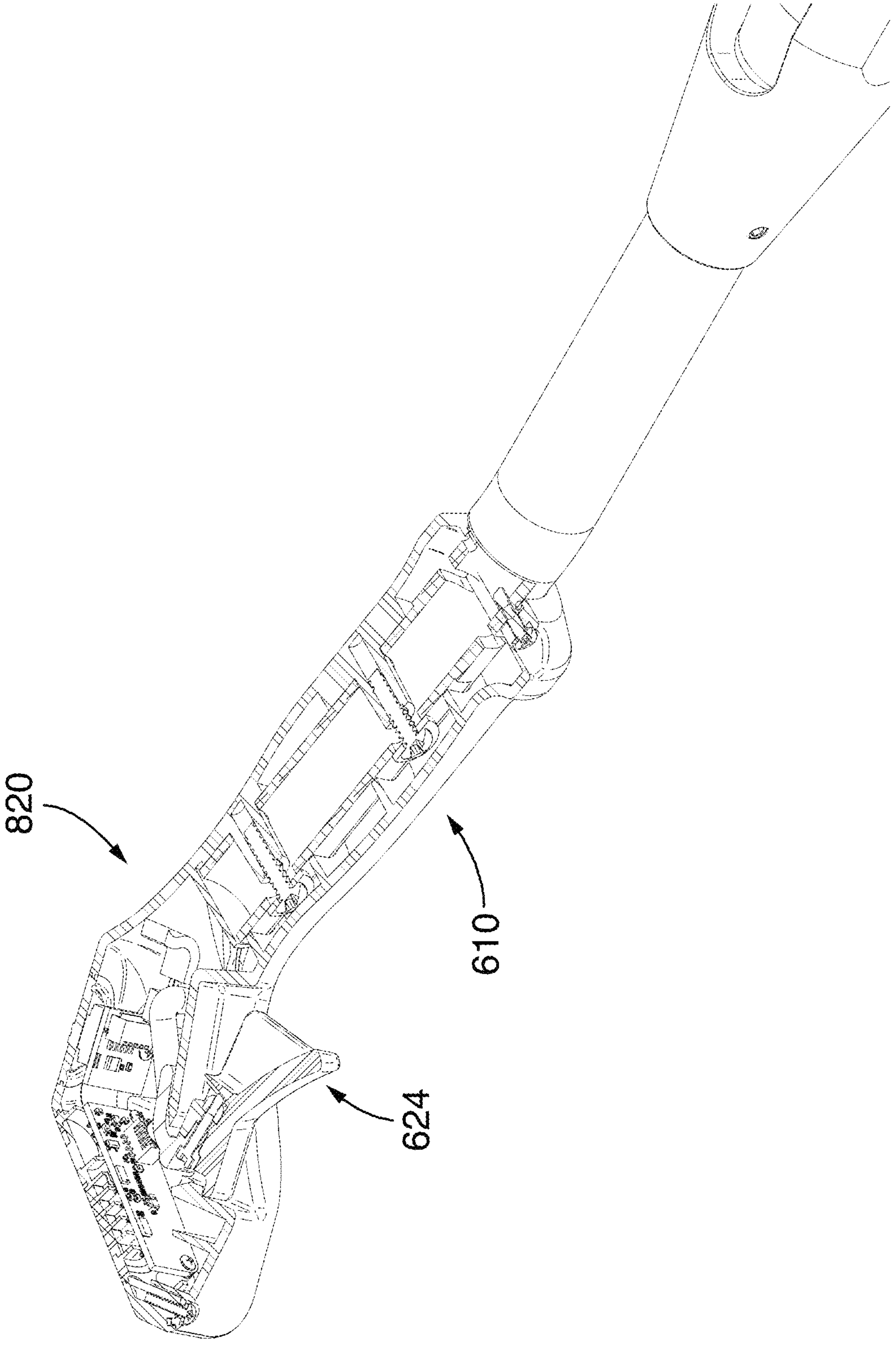
FIG. 28 is a cross-sectional side perspective view of the top portion of the handle member shown in FIG. 25.
Figure 29:
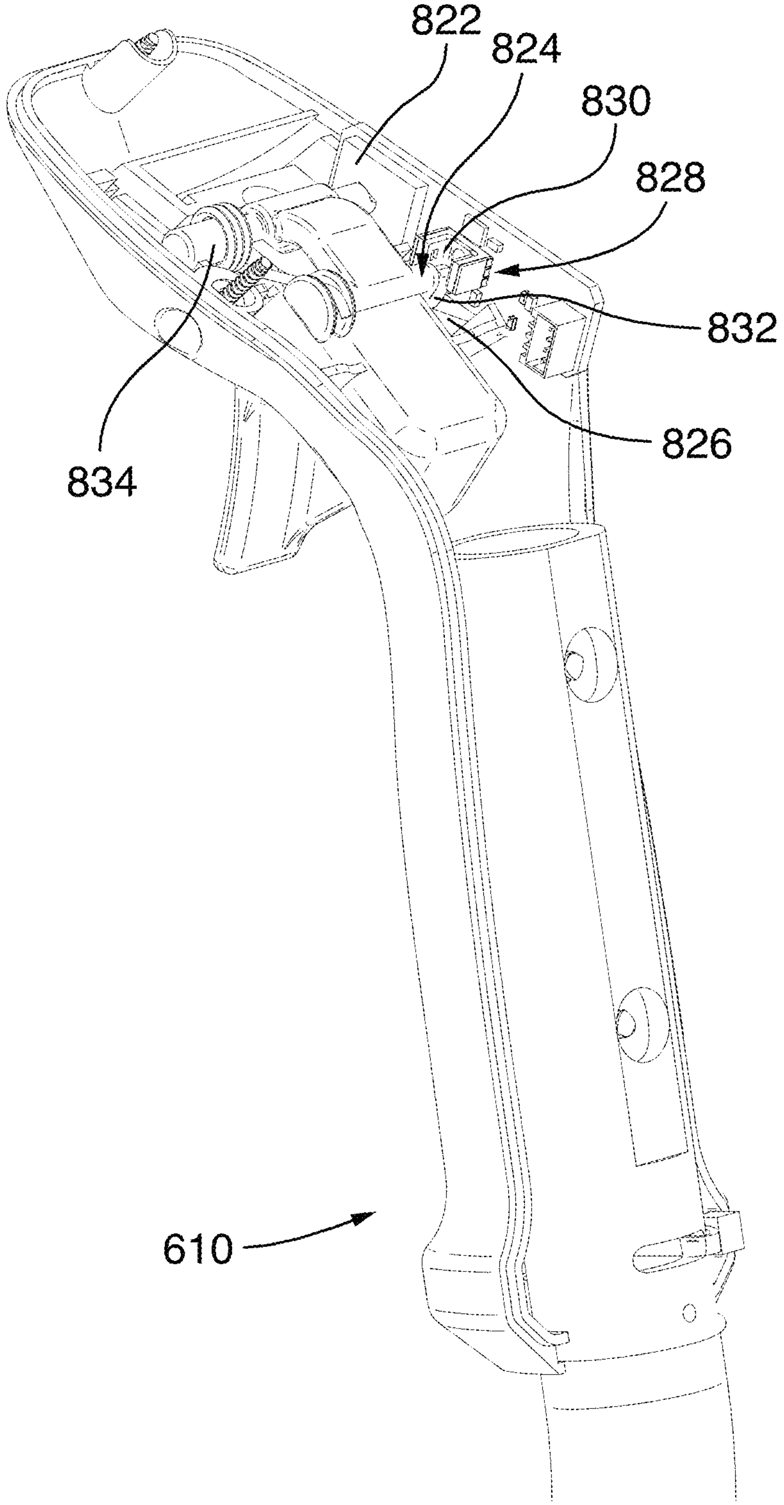
FIG. 29 is a cross-sectional top perspective view of the top portion of the handle member shown in FIG. 25, with the uppermost portion removed.

Referring now to FIGS. 27 to 29, a control 820 for a handle 610 of a hospital bed 600 according to one embodiment will now be described. In this embodiment, the control handle 610 is similar to the one previously described with reference to FIGS. 22 to 25. The control 820 for a handle 610 of a bed 600 has a trigger 624 operatively mounted with the control handle 610, the trigger 624 being actuatable between a rest position and a fully actuated position. The control 820 for a handle 610 of a bed 600 also has a position sensor 822 connected to the trigger 624 for sensing the current position thereof and providing an output representative of the current position of the trigger 624. In one embodiment, the trigger 624 is pivotally connected to the control handle 610 and the position sensor 822 is an angular position sensor 822 adapted for detecting a current pivoted position of the trigger 624. In a further embodiment, the trigger 624 is mounted to the control handle 610 through a return spring 834 to return the trigger 624 in its rest position when actuation from the operator has stopped.

Figure 31A:
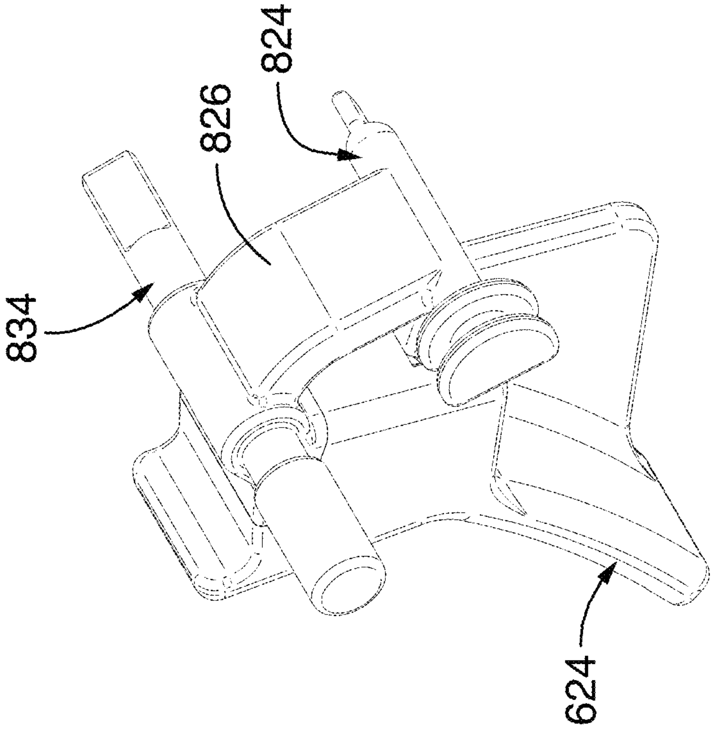
FIG. 31A is a closed-up top front view of projecting member mechanism that is activated when the trigger of the control handle is pulled.
Figure 31B:
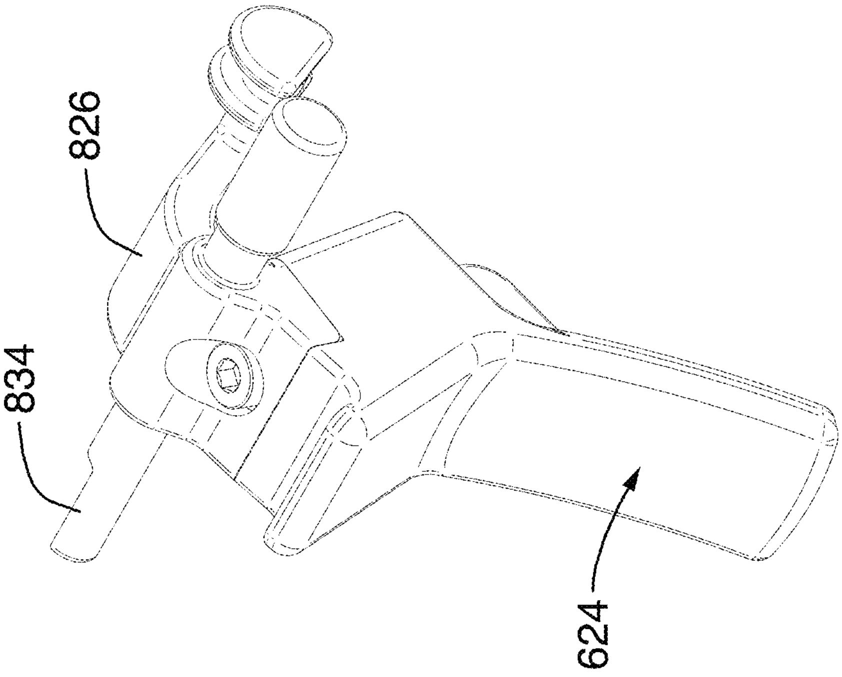
FIG. 31B is a closed-up top back view of the projecting member mechanism of FIG. 31A.

The control 820 for a handle 610 also has a shutter 824 secured to the trigger 624, the shutter 824 comprising a projecting member 826 moving with the trigger 624, better shown in FIGS. 31A and 31B. In one embodiment, the shutter 824 is integral to the trigger 624 and is molded therewith from a single piece. The control 820 for a handle 610 is further provided with an optical sensor 828 having an optical path 830, as better shown in FIG. 29. The optical sensor 828 is mounted within the handle 610 proximate a distal end 832 of the projecting member 826 of the shutter 824 such that the distal end 832 extends away of the optical path 830 when the trigger 624 extends in the rest position. The distal end 832 of the projecting member 826 further extends through the optical path 830 when the trigger 624 is actuated from at least a first predetermined actuated position until the fully actuated position to thereby interrupt the optical path 830. In other words, when the trigger 624 is actuated between the rest position and the first predetermined position, the distal end 832 of the projecting member 826 extends away of the optical path 830 and does not interrupt the optical path 830 of the optical sensor 828. The optical sensor 828 provides an output representative of a current state of the optical path 830, i.e. an interrupted state and an uninterrupted state. This output is used by the controller of the bed to prevent propelling of the bed when the trigger is operated but has not reached the first predetermined position as detailed below.

The control 820 for a handle 610 further has a controller (not shown) for controlling a component of the hospital bed 600 according to the output of the position sensor 822 and the output of the optical sensor 828. As it should now be understood, such control 820 for a handle 610 may be used for propelling a bed 600 provided with a wheel assembly 220 that is motorized similar to the one described therein. In this case, in one embodiment, the level of depression of the trigger 624 is proportional to the voltage delivered to the motor 432 driving the wheel 340 of the wheel assembly 220, and the speed of the hospital bed 600 is controlled by the operator according to operation of the trigger 624. The skilled addressee would appreciate that the level of depression of the trigger 624 may be directly or indirectly correlated to the voltage delivered to the motor 432. Pressing on the trigger may increase or decrease the voltage delivered to the motor 432, depending of the preferred configuration of the operator.

In the illustrated embodiment, the trigger 624 is mounted as a pivot with respect to the handle member 622 but it should be mentioned that other arrangements may be used. For example, the trigger 624 may move between the rest position and the fully actuated position according to a translation of the trigger 624 inside the handle member 622. In this case, the projecting member 826 and the optical sensor 828 are configured accordingly.

In a further embodiment, the control 820 for a handle 610 previously described may also be used for controlling other components of the hospital bed 600. For example, the control 820 may be configured with a handle having inputs devised to move the various portions of the deck such as the backrest portion thereof as a non-limitative example. The first predetermined voltage acting as a threshold before operating movements of the bed 600 may reduce discomfort to the patient that may be caused due to inadvertent contact with the trigger. All of the portions of the deck could also be controlled through a single handle having the control previously described. In such an embodiment, the user interface may be provided with additional controls for selecting one of the portions to be actuated.

Referring now to FIG. 26 and FIGS. 30A to 30E, a user interface 700 for a control handle 610 of a hospital bed 600 according to one embodiment will now be described. In this embodiment, the user interface 700 is similar to the one previously described with reference to FIG. 25. In a further embodiment, the user interface 700 is designed and configured to operate the wheel assembly 220 of a motorized bed 600, as it should now be apparent to the skilled addressee. The user interface 700 has an operating visual indicator 702 mounted on the handle member 622 for indicating a current status of the bed 600, the current status being one of an inactive status, a propelled forward status and a propelled backward status, as better shown in FIGS. 30A and 30B. In this illustrated embodiment, the operating visual indicator 702 has an inverted U-shape and is provided with a plurality of LEDs (not shown) mounted side by side. In the illustrated embodiment, the LEDs are turned off for indicating an inactive status of the bed 600. The LEDs are further turned on in a first color for indicating the propelled forward status of the bed 600 and in a second color for indicating the propelled backward status of the bed 600. In still a further embodiment, when the bed 600 is propelled, either backward or forward, the corresponding LEDs are sequentially turned on and off according to a predetermined sequence representative of the forward or backward movement. In other words, when the bed 600 is propelled forwards, generally speaking, when a LED is just turned off, the adjacent LED in the forward direction is just turned on, providing a visual effect representative of the forward movement. Similarly, when the bed 600 is propelled backwards, generally speaking, when a LED is just turned off, the adjacent LED in the backward direction is just turned on, providing a visual effect representative of the backward movement.

The user interface 700 is further provided with at least one additional visual indicator 704 for indicating at least one initial condition to be executed by the operator. In the illustrated embodiment and as previously described above, the braking system 580 has first to be deactivated for enabling propelling of the bed 600. The additional visual indicator 704 thus illustrates a braking foot actuated lever, as a means to inform the operator of the action to be performed or having being performed as required with corresponding colors or visual information. Various colors and flashing effects can be used according to information provided on labels affixed on the hospital bed 600 proximate the control handle 610 to provide the operator with information on the operation of the hospital bed 600.

In a further embodiment, the user interface 700 is also provided with a battery level visual indicator 706 for indicating the remaining level of the battery to the operator. In the case the battery level would not be sufficient for the desired propelled trip, the operator is clearly informed before beginning the trip. Moreover, while driving the hospital bed 600 from one location to another, the operator is still well aware of the evolution of the battery level in real time, without having to check this information at a location not visible from the control handles 610. Several other specific visual indicators may also be added to the user interface 700, as required by a specific application, in order to visually provide all the necessary information to the operator at the point of operation of the handle 610, even during displacement of the bed 600.

Figure 30A:
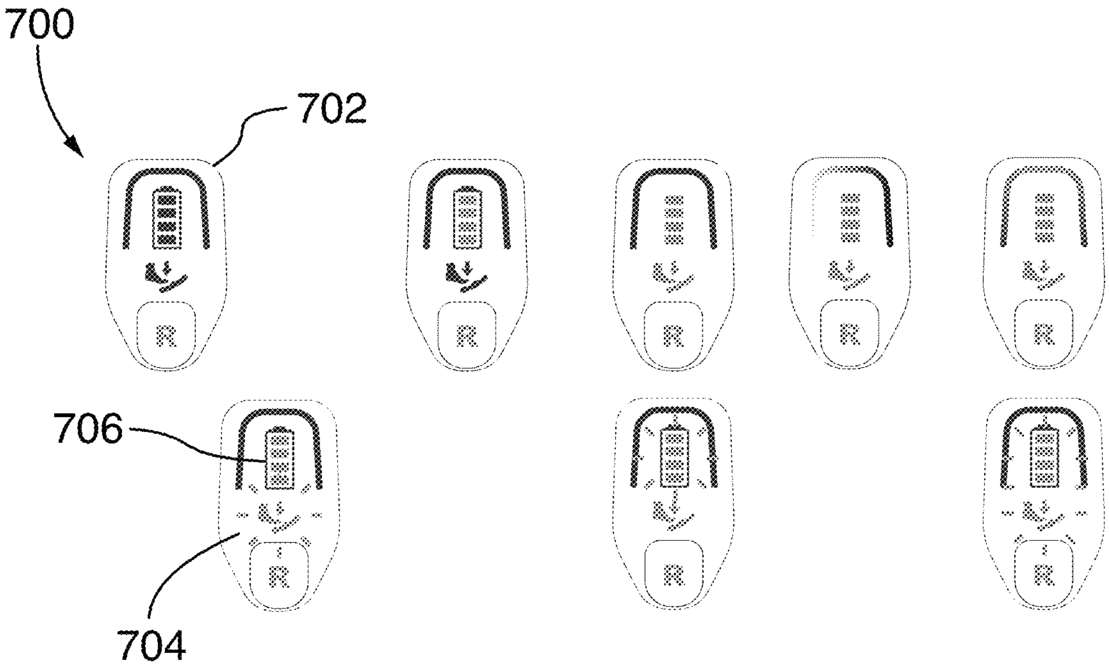
FIG. 30A is a user interface for a handle member of a control handle shown in FIGS. 25 and 26, in distinct visual states, in accordance with one embodiment.
Figure 30B:
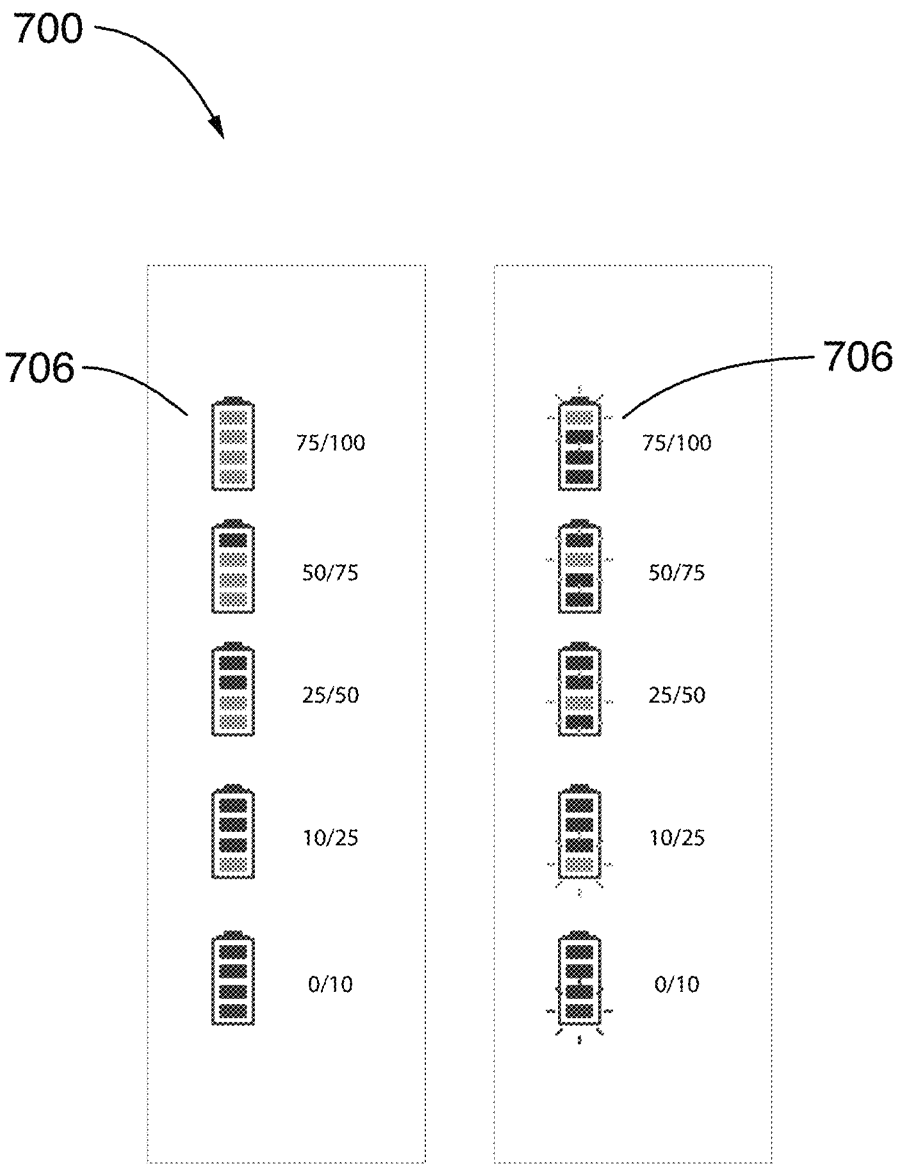
FIG. 30B illustrates an information label for the user interface shown in FIG. 30A, in accordance with one embodiment.
Figure 30C:
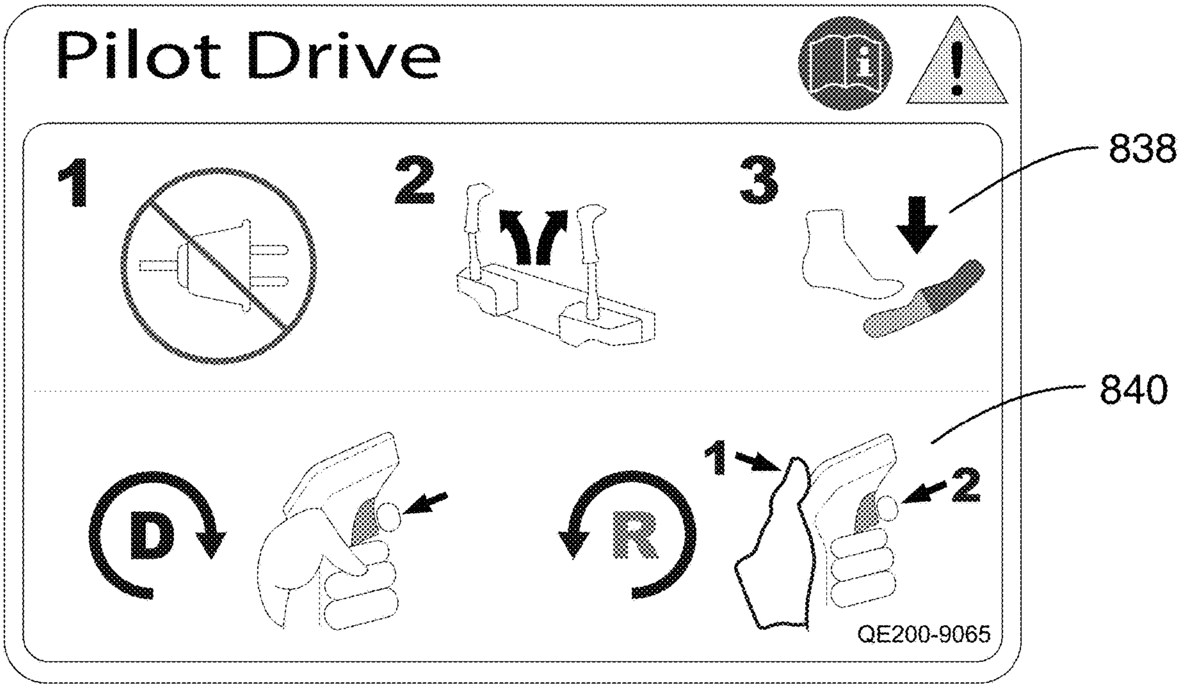
FIG. 30C illustrates an additional information label for the user interface shown in FIG. 30A, in accordance with a further embodiment.

FIG. 30C shows two distinct informative labels 838, 840 affixed on the bed proximate the control handles 610 and illustrating the sequence of operations to perform to drive the hospital bed 600, according to one embodiment: the hospital bed 600 has to be unplugged from the wall power plug; the control handle 610 has to be deployed; and the braking system 580 has to be removed. In one embodiment, the operations may be performed in any order. At that point, the hospital bed 600 is ready to be moved with the motorized wheel assembly 220, according to the operator request.

Referring back to FIGS. 25 and 26, in one embodiment, each of the visual indicators 702, 704, 706 of the user interface 700 is provided on the substantially horizontal uppermost surface 628 of the uppermost portion 626 of the handle member 622 to be easily visible to the operator driving the hospital bed 600. In a further embodiment, the uppermost portion 626 of the handle member 622 further has a downward inclined surface 660 directed towards the operator, for example at 10 to 45 degrees. The user interface 700 further has a backwards direction control 710 located on the downward inclined surface 660. In this embodiment, actuation of the trigger 624 of the control handle 610 without actuation of the backwards direction control 710 will drive the hospital bed 600 forwards while actuation of the trigger 624 of the control handle 610 with the backwards direction control 710 actuated first will drive the hospital bed 600 in the backwards direction. In one embodiment, the controller limits the maximum speed of the hospital bed 600 in the backwards direction.

Figure 30D:
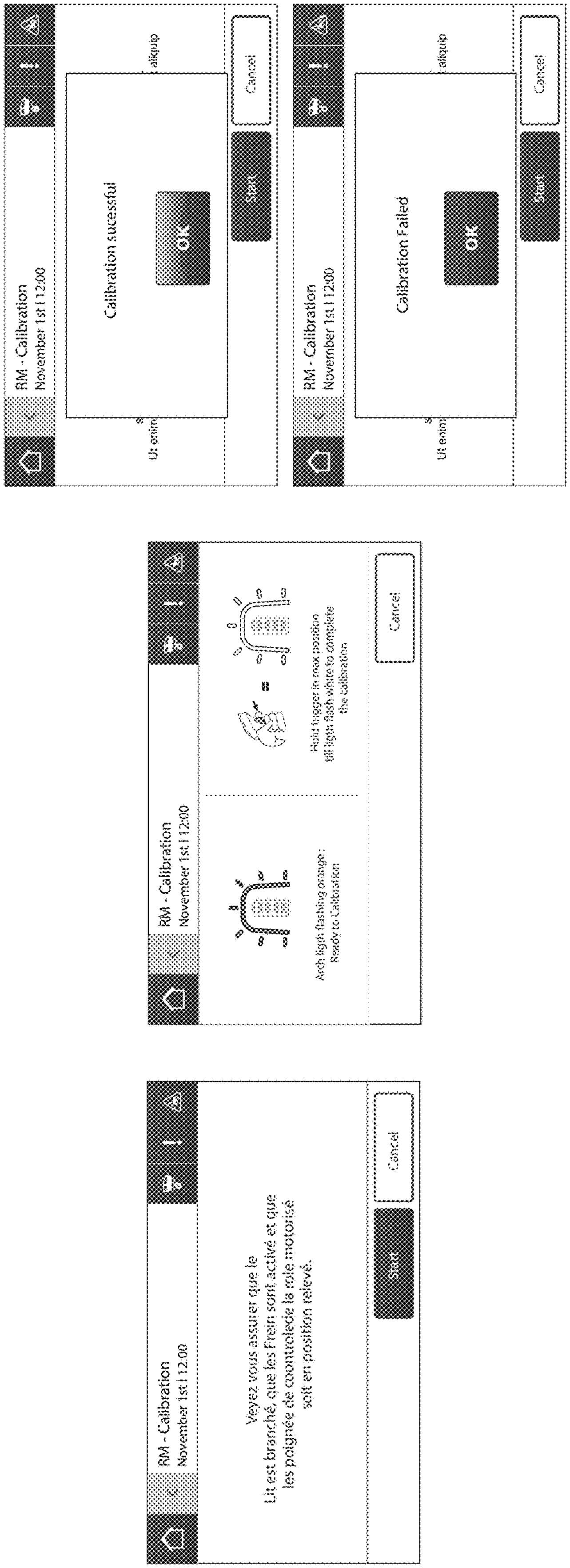
FIG. 30D illustrates a calibration user interface for the calibration of the trigger of the control handle, in accordance with one embodiment.
Figure 30E:
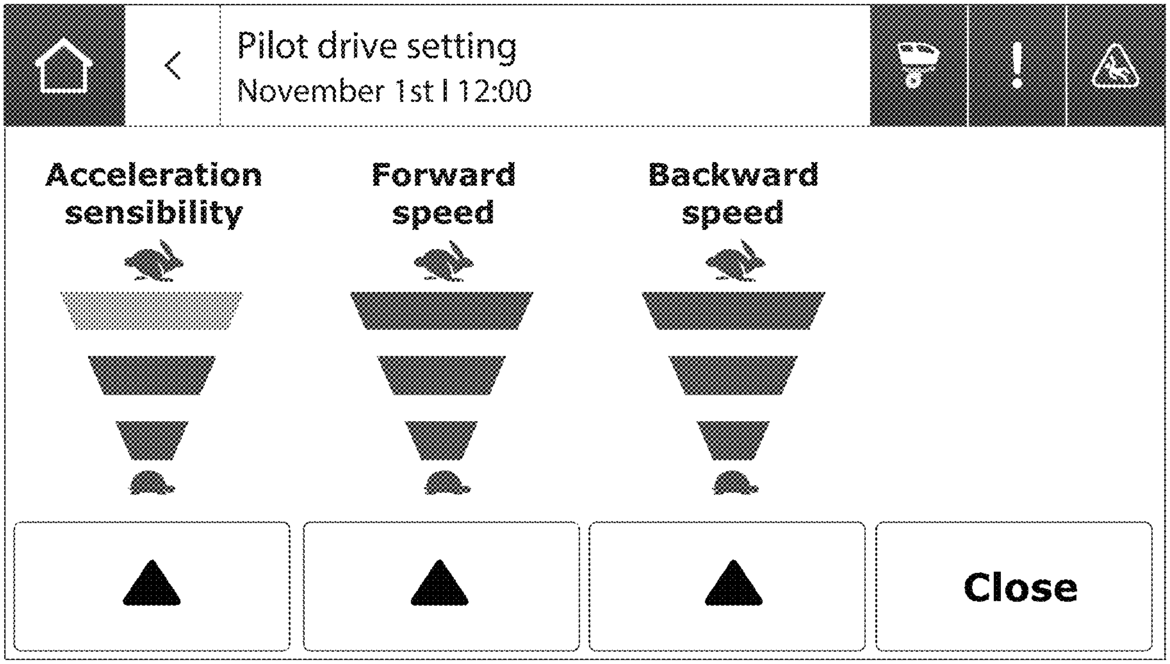
FIG. 30E illustrates a user interface used for adjusting the acceleration sensibility and speed of the motorized wheel assembly, in accordance with one embodiment.

Referring to FIGS. 30D and 30E, there is shown a display menu of an interface used for adjusting parameters of the motorized wheel. As it should now be apparent, speed varies linearly between the first predetermined position of the trigger 624 to the maximum position thereof. When user varies the position of the trigger, a new current speed is determined according to the position of the trigger and speed changes linearly between two trigger positions.

In this embodiment, the maximum speed and acceleration at which the bed can be propelled may be adjusted by the user. Indeed, a nominal linear acceleration, a nominal forward maximum speed and a nominal backward maximum speed are predetermined and used by the controller to propel the bed according to the user input. In the illustrated example, both the forward and backward speeds can be adjusted between three levels, which substantially correspond to 33%, 67% and 100% of the nominal maximum speeds respectively. The skilled addressee would appreciate that other forward and backwards levels may also be preferred, and such interface may be configured to provide for such adjustments as so desired.

In one example, the nominal forward maximum speed may be 0.8 m/s while the nominal backward maximum speed may be 0.4 m/s. Each user can then easily select the maximum speed at which the bed will be moved. Acceleration sensitivity may also be adjusted by the user. In this case, the linear acceleration is chosen such that the maximum speed will be attained after an initial period of time, 10 seconds for example, in the case the user operates the trigger to its maximum position. This may improve the patient comfort in reducing jerks and sudden movements. Other acceleration profiles may also be used as well as the initial period of acceleration. Once the trigger has been operated for more than the initial period of time, the maximum speed may be attained with the trigger operated to the maximum position.

As it should be understood, in a preferred configuration, when the user releases the trigger 624, the bed should be stopped. In order to prevent sudden stops that may be uncomfortable for the patient, a controlled stop may be implemented. For example, a linear deceleration ramp may be implemented so as to slow the wheel gradually and provide the controlled stop. In one embodiment, the controller controls the motor propelling the wheel so as to stop the bed after a braking distance of 1 meter maximum, in accordance with the nominal maximum speed that has been selected previously. In a further embodiment, the slope of the ground may be taken into consideration for the controlled stop of the bed. In the case the ground is inclined downwardly, a longer braking distance may be used to prevent slipping of the wheel on the ground and therefore provide a more effective stop of the bed. In such an embodiment, an inclinometer or accelerometer mounted on the bed may be used for monitoring the slope of the ground.

Referring now to FIGS. 30D and 30E, the trigger 624 of the control handle may be calibrated, according to one embodiment. For that purpose, a trigger calibration procedure is provided though the illustrated display displayed on the control screen of the bed. The user is asked to operate the trigger 624 to its maximum position. This enables to define the 0 value and the maximum value of the position sensor of the trigger 624. Such an arrangement is advantageous since it enables to provide an accurate control of the speed of the bed according to the nominal maximum speed selected and independently of slight mechanical and electrical variations that can be generated during manufacturing of the control handle.

The embodiments described above are intended to be exemplary only. The scope of the invention is therefore intended to be limited solely by the appended claims.

The invention claimed is:

1. A wheel assembly connectable to a base of a patient support apparatus having a plurality of casters, said wheel assembly comprising:

a fixed portion securable to the base;

a pivoting portion pivotally attached to the fixed portion;

a wheel operatively connected to the pivoting portion, the wheel being movable between a first deployed position when the pivoting portion is pivoted in a first direction and a second retracted position when the pivoting portion is pivoted in a second opposed direction;

a spring assembly mounted between the fixed portion and the pivoting portion for urging the pivoting portion in the first direction, urging the wheel in the first deployed position; and an actuator operatively coupled to the fixed portion and to the pivoting portion, the actuator being actuatable between an actuator retracted position and an actuator extended position, the actuator being actuated to the actuator extended position to urge the pivoting portion in the second direction against an action of the spring assembly to thereby raise the wheel in the second retracted position, wherein the actuator allows the action of the spring assembly to urge the pivoting portion in the first direction.

2. The wheel assembly of claim 1, wherein, when connected to the base of the patient support apparatus, the first deployed position of the wheel is in contact with the floor and the second retracted position is spaced apart from the floor.

3. The wheel assembly of claim 1, further comprising a motor assembly operatively connected to the wheel for driving the wheel along the floor when extending in the first deployed position.

4. The wheel assembly of claim 3, wherein the motor assembly is mounted perpendicularly to an axle of the wheel such that an axis of rotation of the motor is perpendicular to the axle of the wheel.

5. The wheel assembly of claim 3, further comprising a control device for driving the motor in response to an operator request.

6. The wheel assembly of claim 1, wherein the wheel is a motor wheel having an integrated motor.

7. The wheel assembly of any one of claims 1 to 5, wherein the fixed portion comprises a mounting plate securable to the base and two spaced apart flanges extending therefrom and defining a compartment therebetween, the pivoting portion comprising an elongated rotating shaft rotatably mounted between the two flanges and a pivoting arm having a first end secured to the elongated rotating shaft and a second distal end, the second distal end having a wheel mounting portion adapted for receiving an axle of the wheel therethrough.

8. The wheel assembly of claim 7, wherein the second distal end of the pivoting arm further comprises a projecting member, the spring assembly being mounted between the fixed portion and the projecting member.

9. The wheel assembly of any one of claims 1 to 5, wherein the actuator comprises a linear actuator, the linear actuator being mounted to push against the projecting member when actuated in the extended position.

10. The wheel assembly of claim 1, wherein the spring assembly comprises a telescopic tubing and a linear compression spring mounted therewith, the telescopic tubing being secured to the fixed portion.

11. The wheel assembly of claim 1, wherein the actuator has a body and an elongated rod having a distal end, the body being pivotally mounted to the fixed portion, the distal end of the elongated rod being further provided with a support arm having a first end pivotally connected thereto and a second end pivotally connected to the pivoting portion for movably supporting the actuator.

12. The wheel assembly of claim 11, wherein the first end of the support arm connected to the distal end of the elongated rod has a surface projecting therefrom, and is adapted for cooperating with the pivoting portion only when the actuator is actuated in the extended position.

13. The wheel assembly of claim 1, wherein the wheel comprises at least one omnidirectional wheel or a mecanum wheel.

14. A patient support apparatus comprising:

a frame;

the base having the plurality of casters for supporting the frame on a floor;

at least one wheel assembly according to claim 1 connected to the base, the wheel of the at least one wheel assembly being configured to be in contact with the floor in the first deployed position, the wheel of the at least one wheel assembly being configured to be spaced apart from the floor in the second retracted position.

15. The patient support apparatus of claim 14, wherein the at least one wheel assembly includes a first wheel assembly and a second wheel assembly.

16. The patient support apparatus of claim 14 or 15, wherein the first and second wheel assemblies are connected to the base at a head end or a foot end of the patient support apparatus, to provide free space under the patient support apparatus when in a raised or in a lowered configuration of the patient support apparatus.

17. The patient support apparatus of claim 16, wherein the free space allows to securely stow medical equipment under said patient support apparatus.

18. The patient support apparatus of claim 14 or 15, wherein one of the at least one wheel assembly further comprises a motor assembly operatively connected to the wheel for driving the wheel along the floor when in the first deployed position.

19. The patient support apparatus of claim 18, further comprising a control device for driving the motor in response to an operator request.

20. The patient support apparatus of claim 14 or 15, wherein the wheel of the at least one wheel assembly comprises at least one omnidirectional wheel or a mecanum wheel.

21. The patient support apparatus of claim 14, wherein:

the wheel of the at least one wheel is a first wheel; and the patient support apparatus further comprises a non-motorized wheel assembly connected to the base, the non-motorized wheel assembly including a second wheel movable between a deployed position in contact with the floor and a raised position spaced apart from the floor, the non-motorized wheel assembly being disposed centrally to the patient support apparatus along a longitudinal direction of the patient support apparatus.

22. The patient support apparatus of claim 21, wherein the non-motorized wheel assembly comprises:

a supporting structure securable to the base;

a second actuator mounted to the supporting structure and having a distal end, the second actuator being actuatable between a second actuator retracted position and a second actuator extended position;

the second wheel operatively connected to the distal end of the second actuator, the second wheel being movable between the deployed position when the second actuator is in the second actuator extended position, and the raised position when the second actuator is in the second actuator retracted position; and a spring assembly operatively mounted between the supporting structure and the second wheel for urging the second wheel in the deployed position.

23. The patient support apparatus of claim 22, wherein the supporting structure comprises an elongated transverse member securable to the base and a mounting plate secured to the elongated transverse member, the second actuator being mounted to the mounting plate.

24. The patient support apparatus of claim 22, wherein the second actuator comprises a linear actuator.

25. The patient support apparatus of claim 24, wherein the linear actuator has a body secured to the support structure and an elongated rod extending substantially horizontally in a longitudinal direction of the patient support apparatus.

26. The patient support apparatus of claim 22, further comprising an intermediate connecting structure pivotally mounted between an axle of the second wheel and the supporting structure for operatively connecting the second wheel to the supporting structure.

27. The patient support apparatus of claim 22, wherein the spring assembly of the non-motorized wheel assembly comprises at least one linear compression spring.

28. The patient support apparatus of claim 22, wherein the spring assembly of the non-motorized wheel assembly comprises a first and a second linear compression springs, a first mounting arrangement for mounting a first end of each of the first and second linear compression springs to the supporting structure and a second mounting arrangement for mounting a second opposed end of each of the first and second linear compression springs to an axle of the second wheel.

29. The patient support apparatus of claim 22, further comprising a control device operatively connected to the second actuator, the control device being actuatable by an operator for selectively moving the second actuator between the second actuator retracted position and the second actuator extended position to thereby move the second wheel between the deployed position and the raised position.

30. The patient support apparatus of any one of claims 22 and 23 to 29, wherein the wheel comprises at least one omnidirectional wheel or a mecanum wheel.

31. The patient support apparatus of claim 21, wherein the non-motorized wheel assembly is centrally mounted onto the base enabling the patient support apparatus to pivot clockwise and anticlockwise.

32. The patient support apparatus of claim 31, wherein the raised position of the second wheel allows for further securely stowing medical equipment under said patient support apparatus.

33. The patient support apparatus of claim 32, wherein the wheel assembly is operable when the patient support apparatus is in a raised or in a lowered configuration.

34. The patient support apparatus of claim 21, wherein:

the second wheel is moved to the deployed position when the first wheel of the at least one wheel assembly is moved to the first deployed position; and the second wheel is moved to the retracted position when the first wheel of the at least one wheel assembly is moved to the second retracted position.

* * * * *